United States Patent
Luecking et al.

(10) Patent No.: US 12,180,873 B2
(45) Date of Patent: Dec. 31, 2024

(54) EXHAUST GAS AFTERTREATMENT SYSTEM

(71) Applicant: CUMMINS EMISSION SOLUTIONS INC., Columbus, IN (US)

(72) Inventors: Alphonse R. Luecking, Cedar Falls, IA (US); Thomas Osgood Roe, Stoughton, WI (US); Peter C. Christianson, Waunakee, WI (US); Tyler J. Haverland, Platteville, WI (US); Ken Hummel, Barneveld, WI (US); Timothy C. Clementz, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 18/035,344

(22) PCT Filed: Nov. 5, 2021

(86) PCT No.: PCT/US2021/058204
§ 371 (c)(1),
(2) Date: May 4, 2023

(87) PCT Pub. No.: WO2022/098969
PCT Pub. Date: May 12, 2022

(65) Prior Publication Data
US 2023/0392534 A1    Dec. 7, 2023

Related U.S. Application Data

(60) Provisional application No. 63/110,617, filed on Nov. 6, 2020.

(51) Int. Cl.
*F01N 3/28* (2006.01)
*B01D 53/94* (2006.01)

(52) U.S. Cl.
CPC ........... *F01N 3/28* (2013.01); *B01D 53/9418* (2013.01); *B01D 53/944* (2013.01);
(Continued)

(58) Field of Classification Search
None
See application file for complete search history.

(56) References Cited

U.S. PATENT DOCUMENTS 3,675,398 A     7/1972   Giarrizzo
7,470,312 B2 *  12/2008  Ohya ................... F01N 3/0211
                                                      55/385.3
(Continued)

FOREIGN PATENT DOCUMENTS

CN     101802356 A     8/2010
CN     103443414 A     12/2013
(Continued)

OTHER PUBLICATIONS

International Search Report and Written Opinion in PCT Application No. PCT/US2021/058204 issued Feb. 2, 2022.
(Continued)

*Primary Examiner* — Jelitza M Perez
(74) *Attorney, Agent, or Firm* — Foley & Lardner LLP

(57) ABSTRACT

An exhaust gas aftertreatment system includes an introduction housing, a transfer housing, a distributing housing, and a first aftertreatment component. The introduction housing is configured to receive an exhaust gas and a treatment fluid. The transfer housing is coupled to the introduction housing and configured to receive the exhaust gas and the treatment fluid from the introduction housing. The distributing housing is coupled to the transfer housing and configured to receive the exhaust gas and the treatment fluid from the transfer housing. The distributing housing includes a distributing housing first panel and a distributing housing first (Continued)

panel opening. The distributing housing first panel opening extends through the distributing housing first panel. The first aftertreatment component is configured to receive at least a portion of the exhaust gas and the treatment fluid from the distributing housing.

24 Claims, 23 Drawing Sheets

(52) U.S. Cl.
CPC .. *B01D 2257/404* (2013.01); *B01D 2257/502* (2013.01); *B01D 2257/702* (2013.01); *F01N 2610/1453* (2013.01)

(56) References Cited

U.S. PATENT DOCUMENTS

| | | | |
|---|---|---|---|
| 2012/0227390 A1* | 9/2012 | Wikaryasz | ............ F01N 3/2066 60/324 |
| 2014/0150433 A1* | 6/2014 | Van Niekerk | ............. F02C 7/00 60/722 |
| 2014/0175238 A1 | 6/2014 | Roozenboom et al. | |
| 2014/0248186 A1 | 9/2014 | Denis et al. | |
| 2016/0047285 A1 | 2/2016 | Alcini et al. | |
| 2017/0074141 A1 | 3/2017 | Mitchell et al. | |
| 2017/0234196 A1 | 8/2017 | Ulrey et al. | |
| 2018/0187588 A1 | 7/2018 | Chatterjee et al. | |
| 2019/0107025 A1 | 4/2019 | Brinkmeyer | |
| 2020/0300145 A1* | 9/2020 | Chenoweth | ........... F01N 13/017 |

FOREIGN PATENT DOCUMENTS

| | | |
|---|---|---|
| EP | 1 262 643 A1 | 12/2002 |
| WO | WO-2007/131035 A1 | 11/2007 |
| WO | WO-2013/188728 A1 | 12/2013 |
| WO | WO-2019/078886 A1 | 4/2019 |
| WO | WO-2019/194784 A1 | 10/2019 |

OTHER PUBLICATIONS

First Office Action in Chinese Patent Application No. 2021800722487 issued Sep. 13, 2023.

Extended European Search Report issued for European Patent Application No. 21890127.0 issued Jun. 12, 2024.

Second Office Action in Chinese Patent Application No. 2021800722487 issued Mar. 15, 2024.

* cited by examiner

EXHAUST GAS AFTERTREATMENT SYSTEM

CROSS-REFERENCE TO RELATED PATENT APPLICATION

This application is a National phase of PCT Application No. PCT/US2021/058204, filed Nov. 5, 2021, which claims the benefit of U.S. Provisional Patent Application No. 63/110,617, filed Nov. 6, 2020. The contents of these applications are incorporated herein by reference in their entireties.

TECHNICAL FIELD

The present disclosure relates generally to an exhaust gas aftertreatment system for an internal combustion engine.

BACKGROUND

For an internal combustion engine system, it may be desirable to treat exhaust gas produced by a combustion of fuel by an internal combustion engine. The exhaust gas can be treated using an aftertreatment system. One approach that can be implemented in an aftertreatment system is to pass the exhaust gas through an aftertreatment component. However, the aftertreatment component may require replacement and/or servicing after a certain amount of time. When it is difficult or impossible to replace and/or service the aftertreatment component, the entire aftertreatment system, or a portion thereof that includes the aftertreatment component, is typically removed and replaced. This significantly increases costs associated with operating the aftertreatment system over a prolonged period of time, and leads to increased waste. Furthermore, it is often difficult or impossible to repurpose the aftertreatment system from treating exhaust gas in one manner to treating exhaust gas in a different manner. This may make the aftertreatment system undesirable.

SUMMARY

In one embodiment, an exhaust gas aftertreatment system includes an introduction housing, a transfer housing, a distributing housing, and a first aftertreatment component. The introduction housing is configured to receive an exhaust gas and a treatment fluid. The transfer housing is coupled to the introduction housing and configured to receive the exhaust gas and the treatment fluid from the introduction housing. The distributing housing is coupled to the transfer housing and configured to receive the exhaust gas and the treatment fluid from the transfer housing. The distributing housing includes a distributing housing first panel and a distributing housing first panel opening. The distributing housing first panel opening extends through the distributing housing first panel. The first aftertreatment component is configured to receive at least a portion of the exhaust gas and the treatment fluid from the distributing housing. The first aftertreatment component includes a first casing, a first aftertreatment component first flange, and a first substrate. The first casing extends through the distributing housing first panel opening. The first aftertreatment component first flange is configured to be fastened to the distributing housing first panel at least partially around the distributing housing first panel opening. At least a portion of the first substrate is positioned within the first casing.

In another embodiment, An exhaust gas aftertreatment system includes a distributing housing, a first aftertreatment component, and a second aftertreatment component. The distributing housing is configured to receive an exhaust gas and a treatment fluid. The distributing housing includes a distributing housing first panel and a distributing housing second panel. The first aftertreatment component is configured to receive a first portion of the exhaust gas and the treatment fluid from the distributing housing. The first aftertreatment component includes a first aftertreatment component first flange and a first substrate. The first aftertreatment component first flange is configured to be fastened to the distributing housing first panel. The first substrate is configured to facilitate treatment of the first portion of the exhaust gas. The first substrate is centered on a first component axis. The second aftertreatment component is configured to receive a second portion of the exhaust gas and the treatment fluid from the distributing housing. The second aftertreatment component includes a second aftertreatment component first flange and a second substrate. The second aftertreatment component first flange is configured to be fastened to the distributing housing second panel. The second substrate is configured to facilitate treatment of the second portion of the exhaust gas. The second substrate is centered on a second component axis. The distributing housing second panel is offset relative to the distributing housing first panel in a direction parallel to the first component axis.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
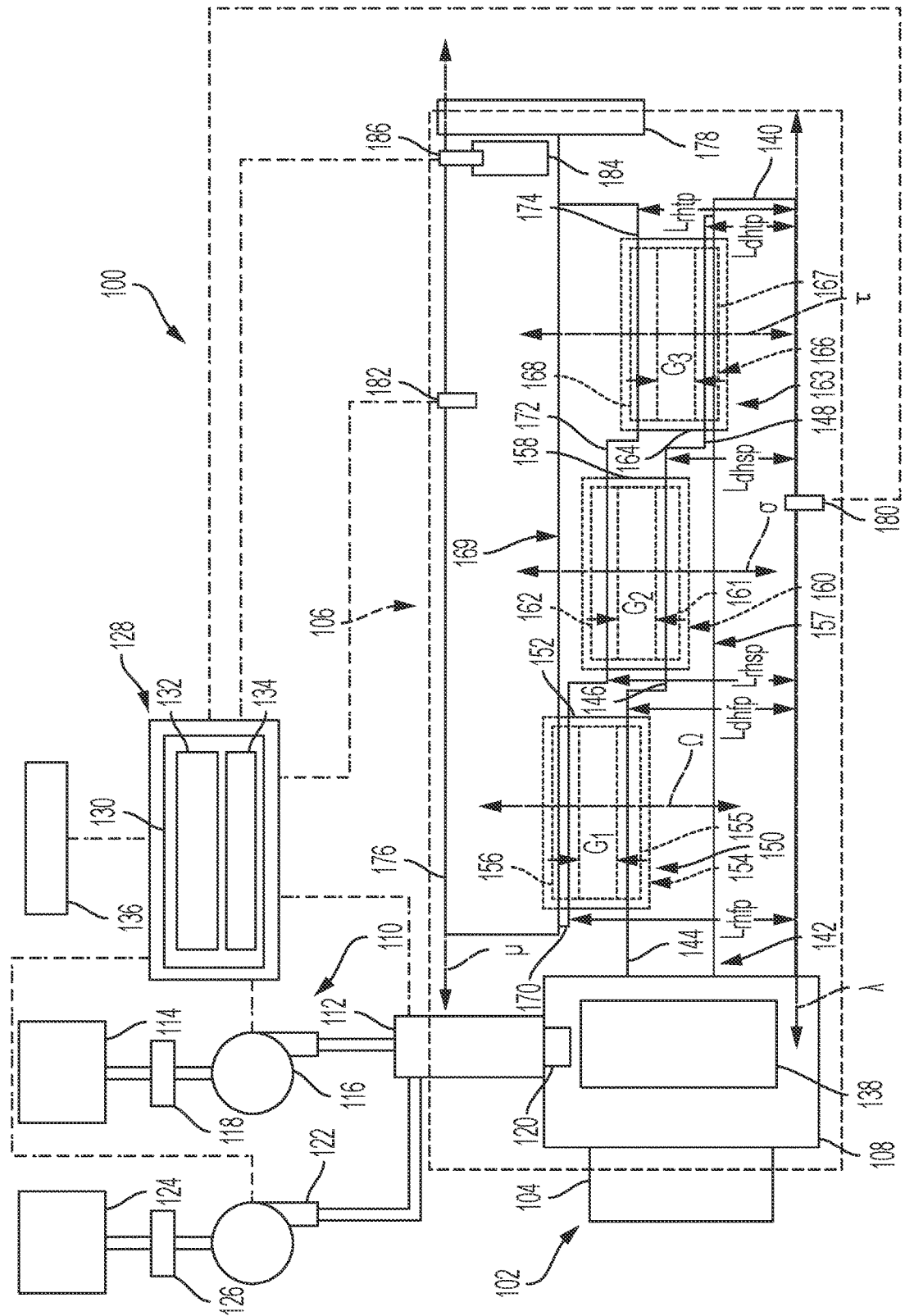
FIG. 1 is a schematic diagram of an example exhaust gas aftertreatment system including a housing assembly.
Figure 2:
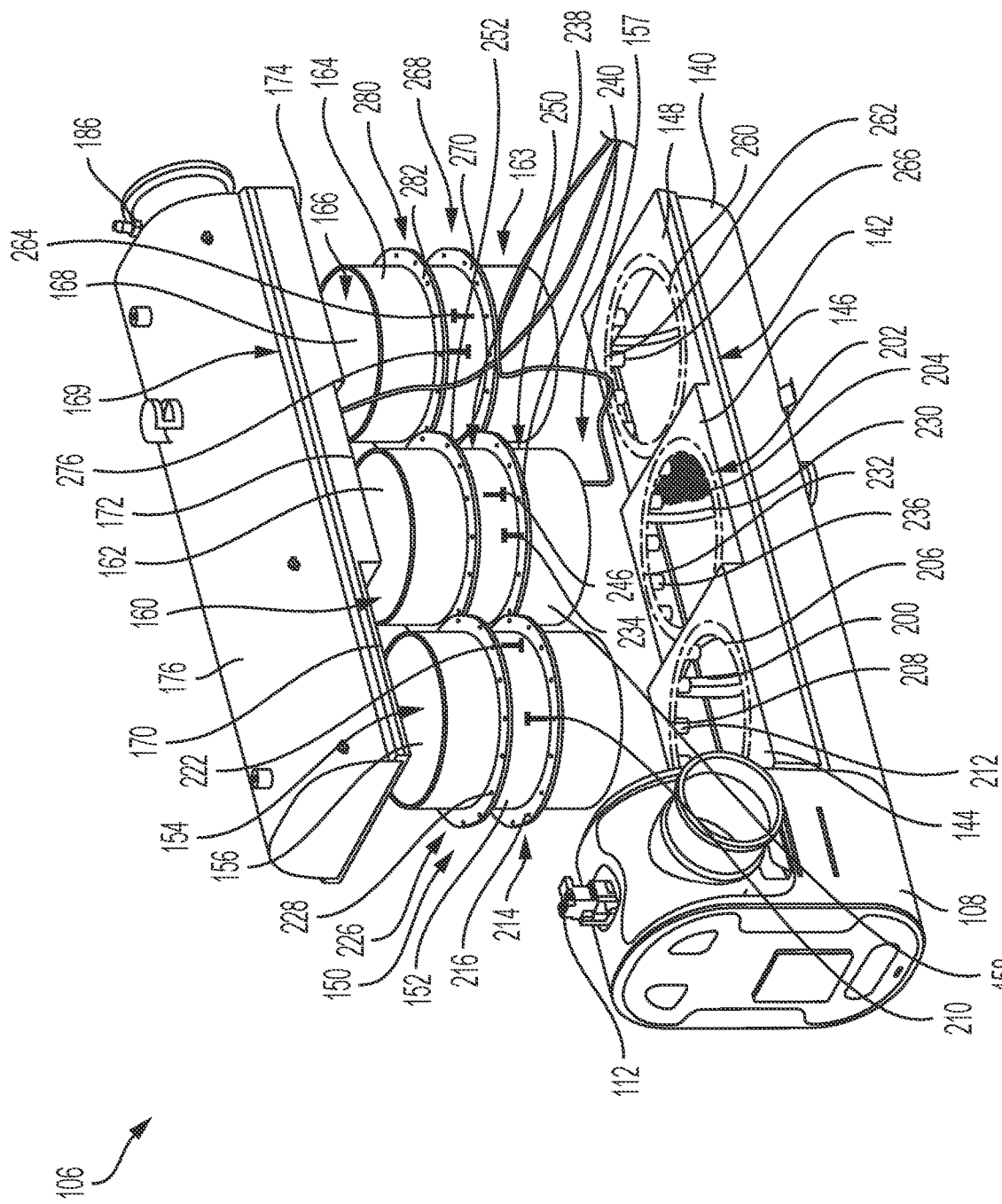
FIG. 2 is a perspective exploded view of an example housing assembly for an exhaust gas aftertreatment system.
Figure 3:
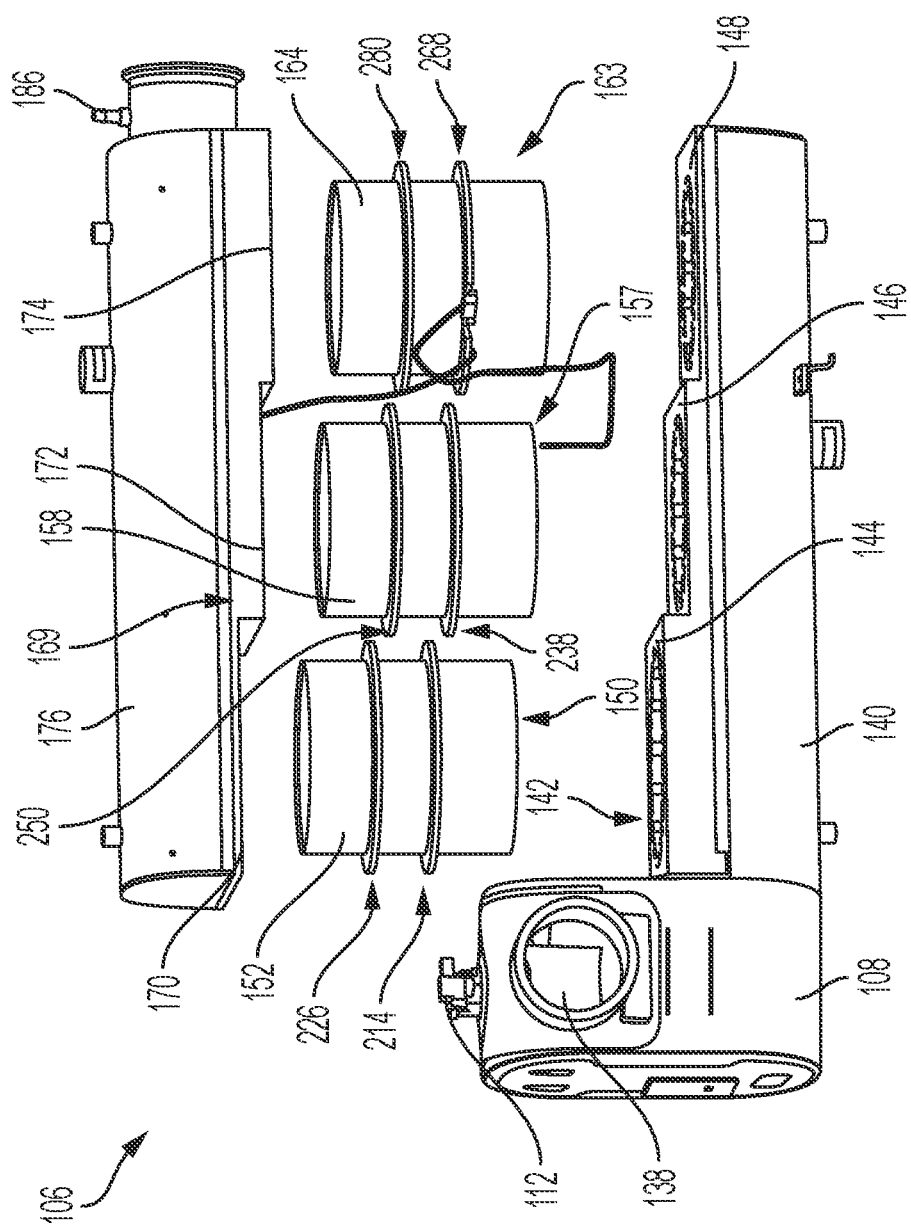
FIG. 3 is another perspective exploded view of the housing assembly shown in FIG. 2.
Figure 4:
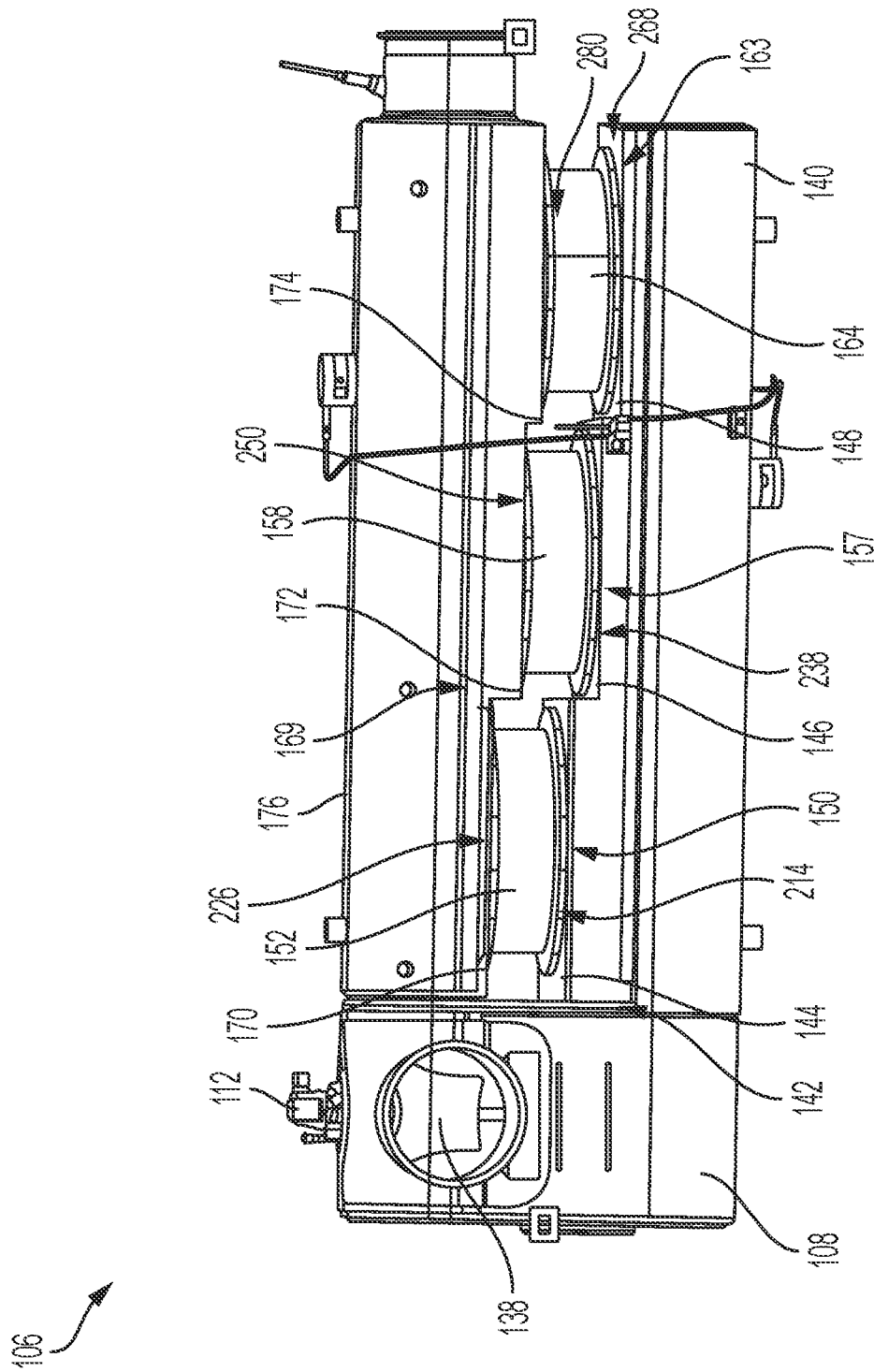
FIG. 4 is a front view of the housing assembly shown in FIG. 2.
Figure 5:
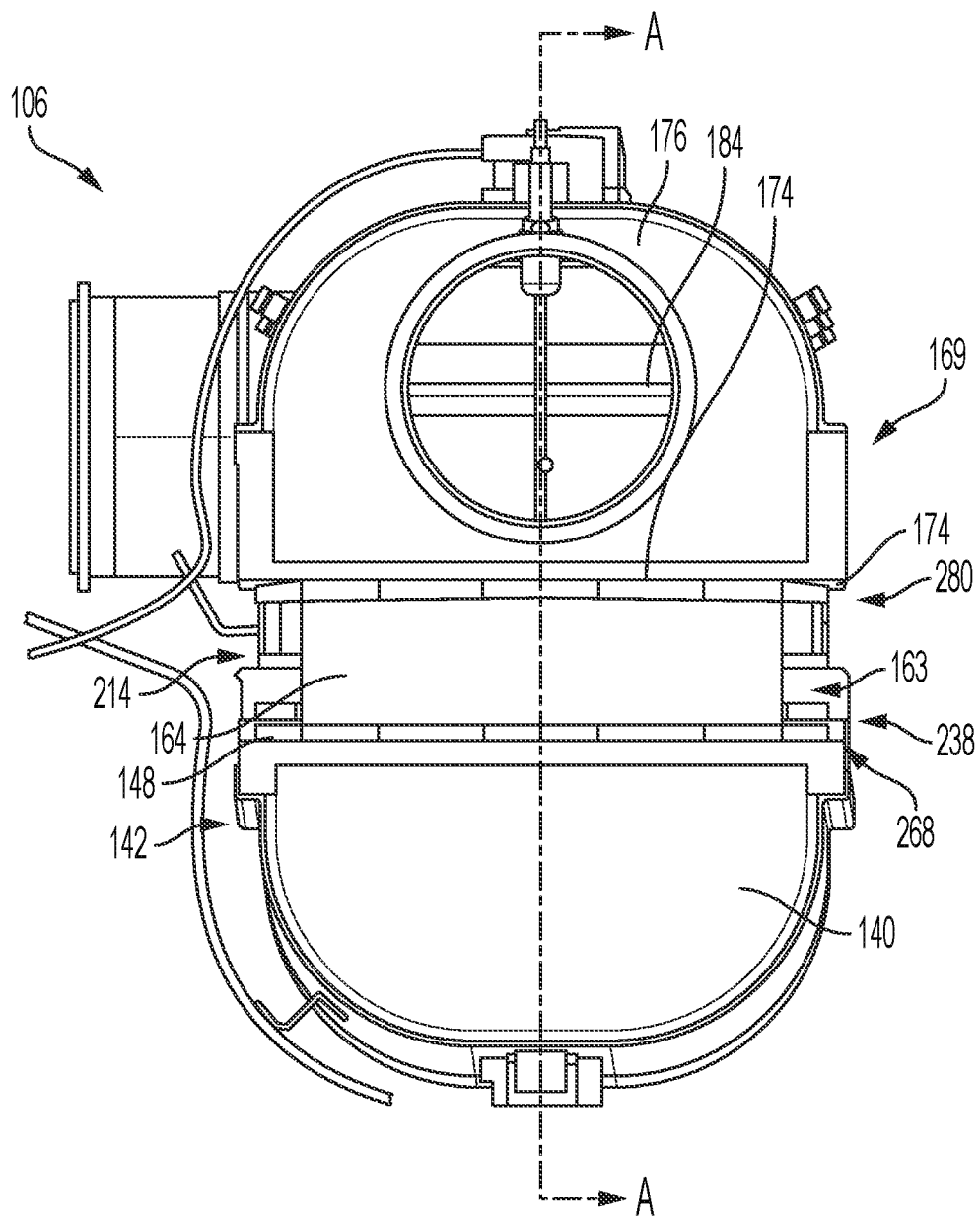
FIG. 5 is a side view of the housing assembly shown in FIG. 2.
Figure 6:
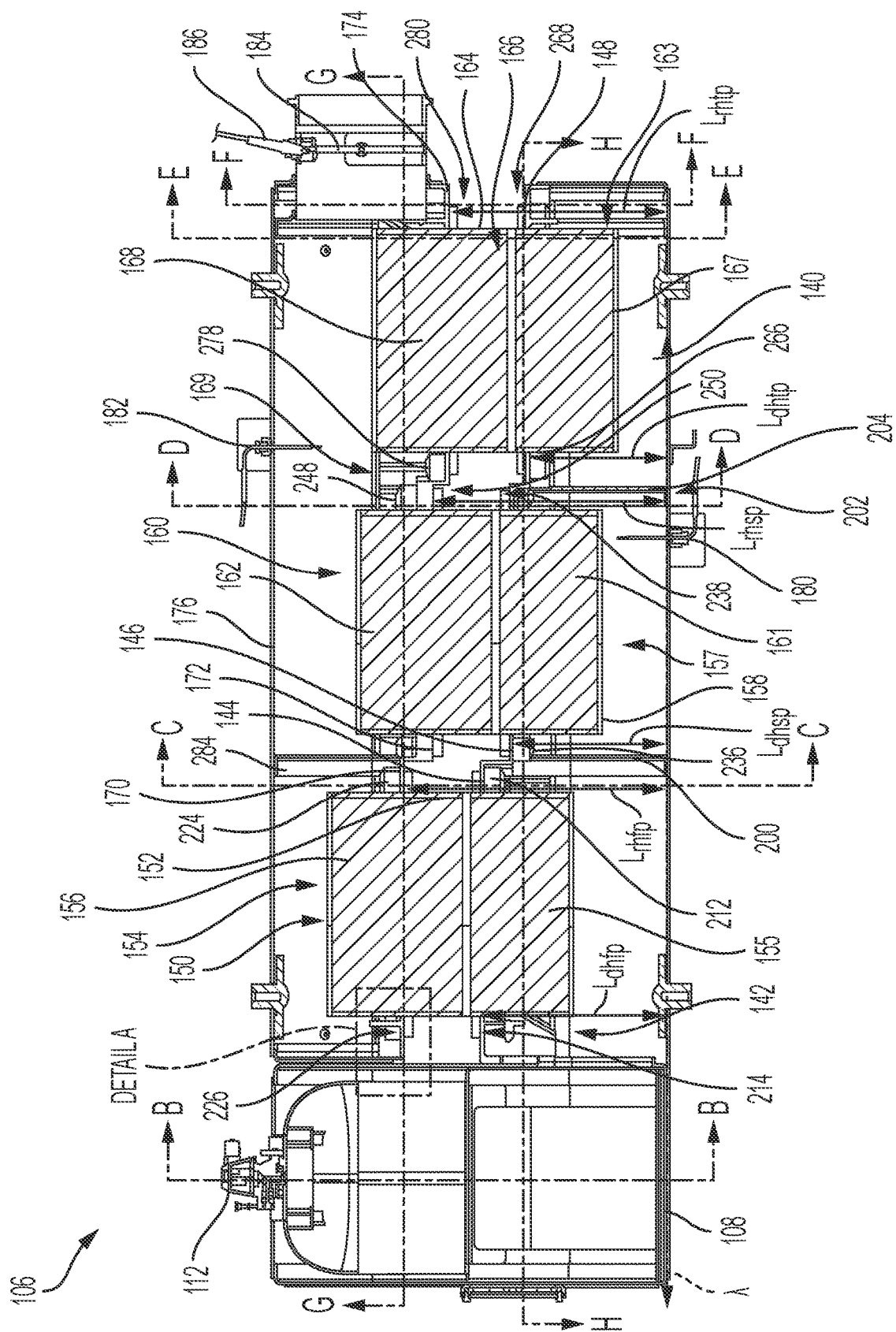
FIG. 6 is a front cross-sectional view of the housing assembly shown in FIG. 5 taken along plane A-A.
Figure 7:
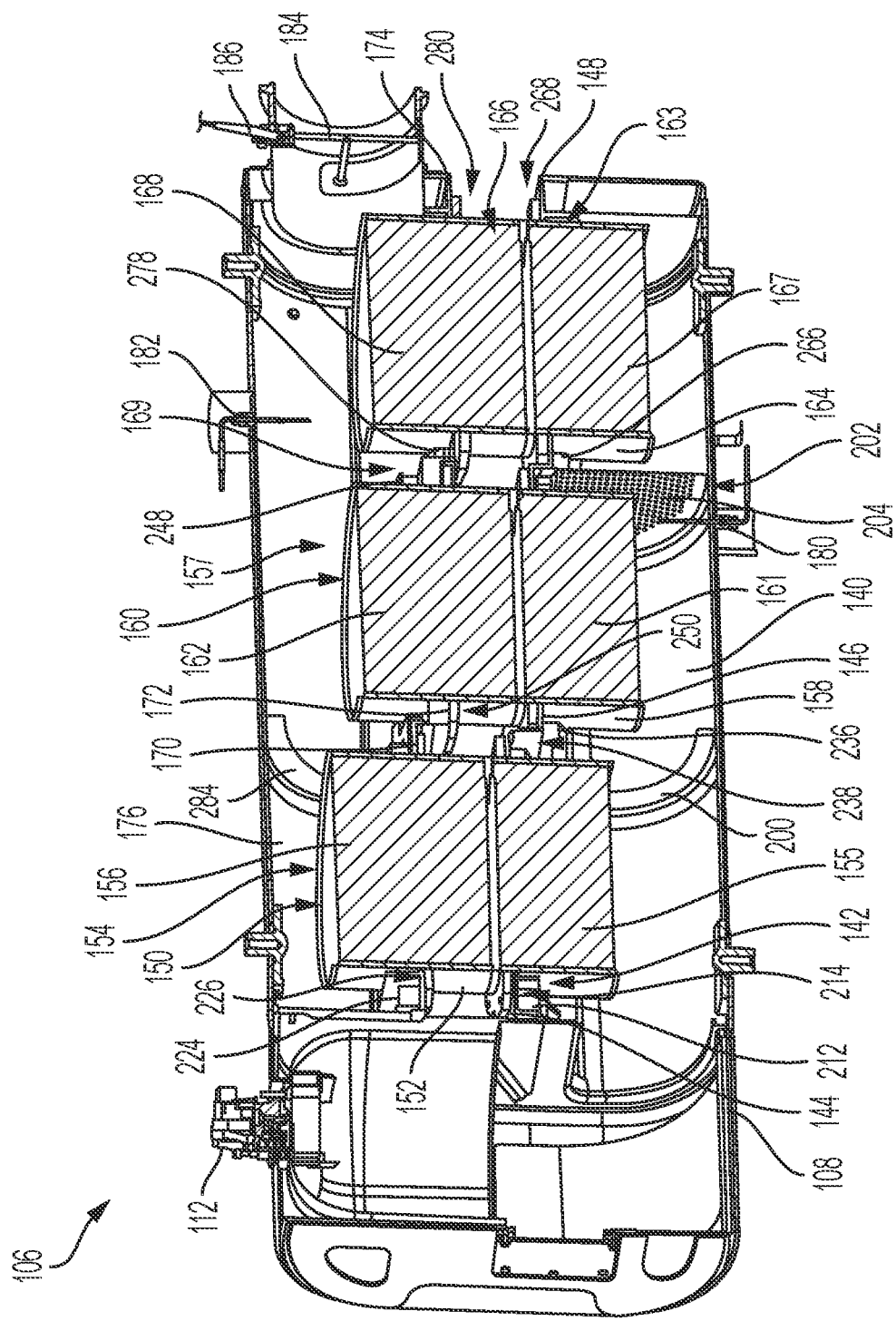
FIG. 7 is a perspective cross-sectional view of the housing assembly shown in FIG. 5 taken along plane A-A.
Figure 8:
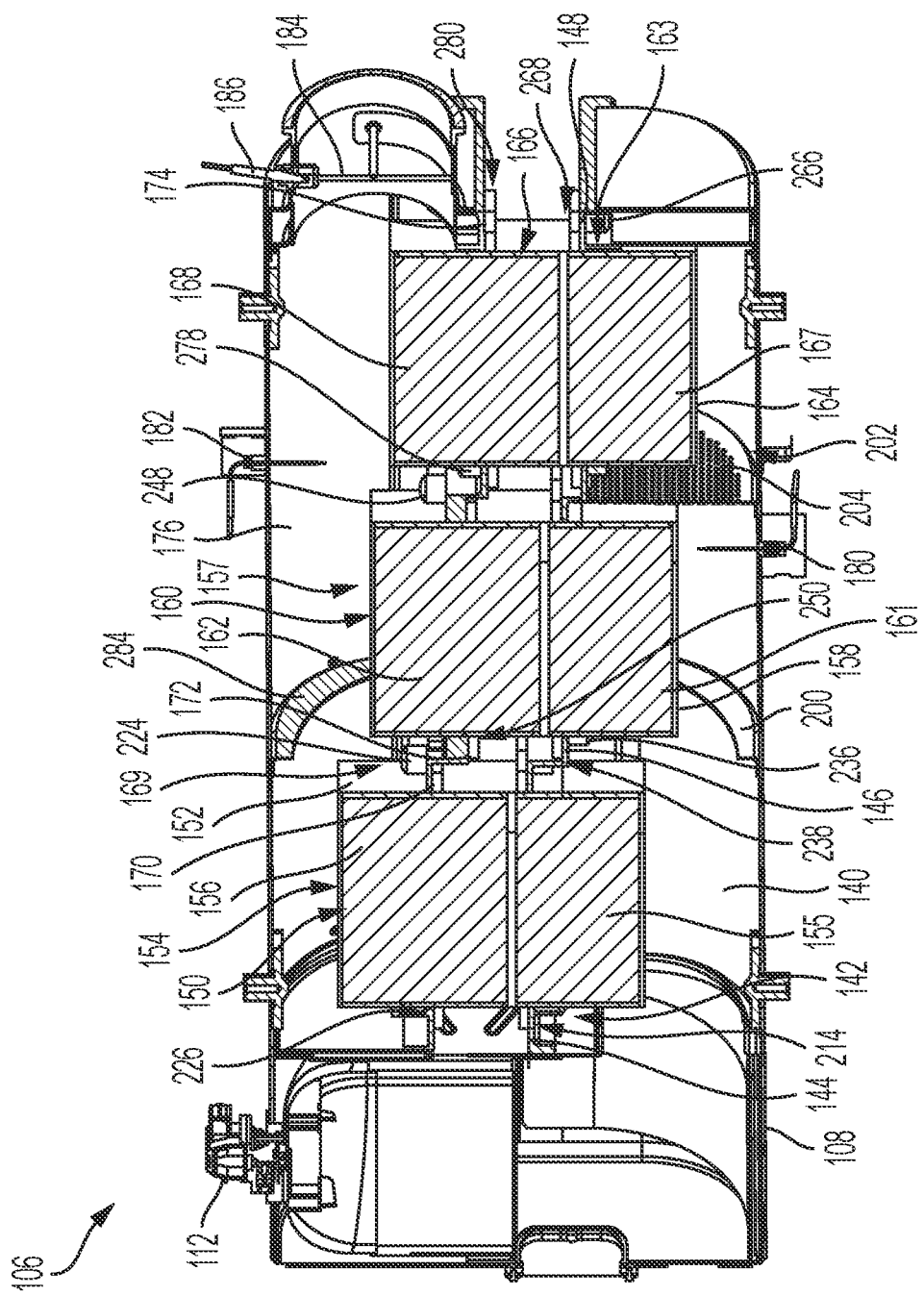
FIG. 8 is a perspective cross-sectional view of the housing assembly shown in FIG. 5 taken along plane A-A.
Figure 9:
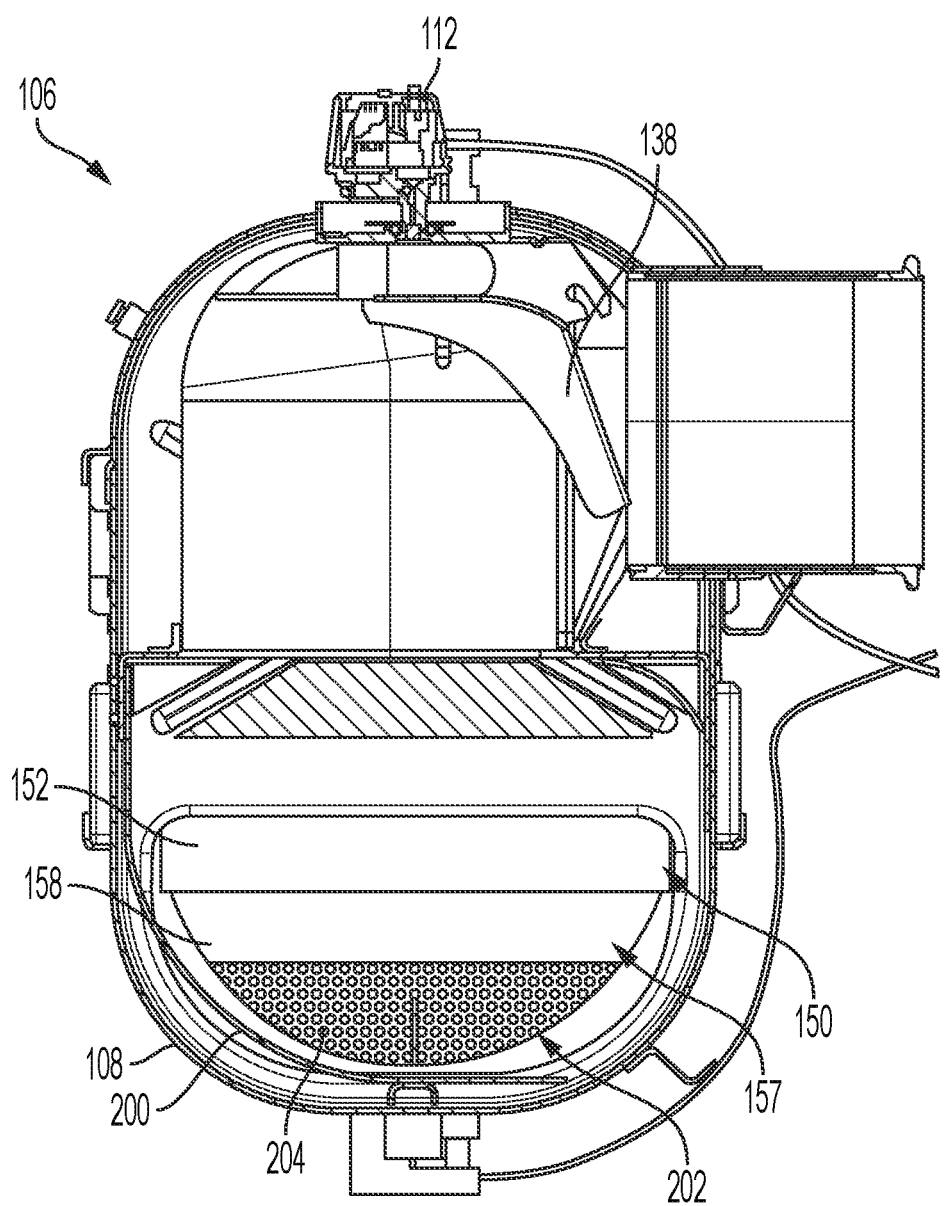
FIG. 9 is a side cross-sectional view of the housing assembly shown in FIG. 6 taken along plane B-B.
Figure 10:
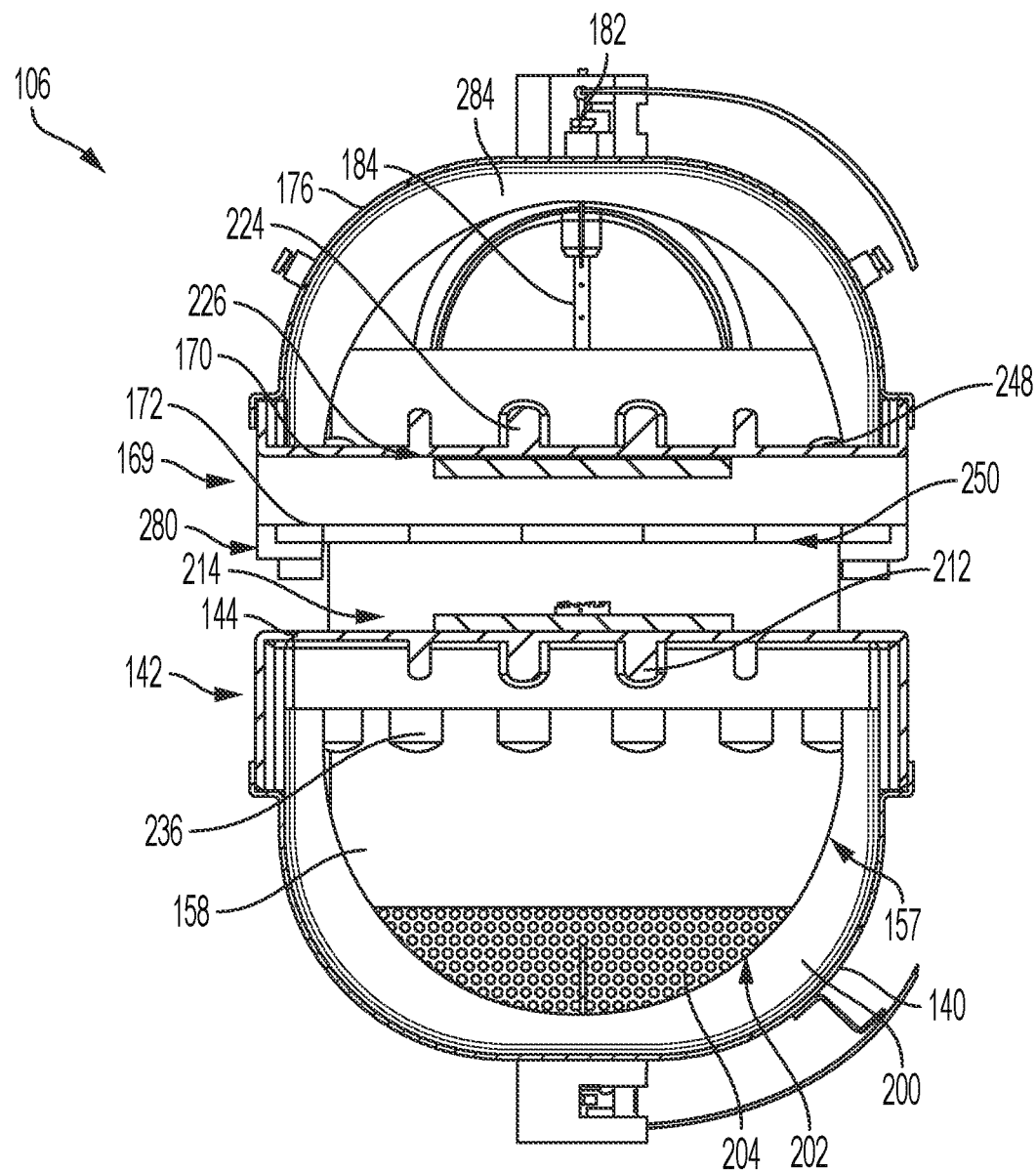
FIG. 10 is a side cross-sectional view of the housing assembly shown in FIG. 6 taken along plane C-C.
Figure 11:
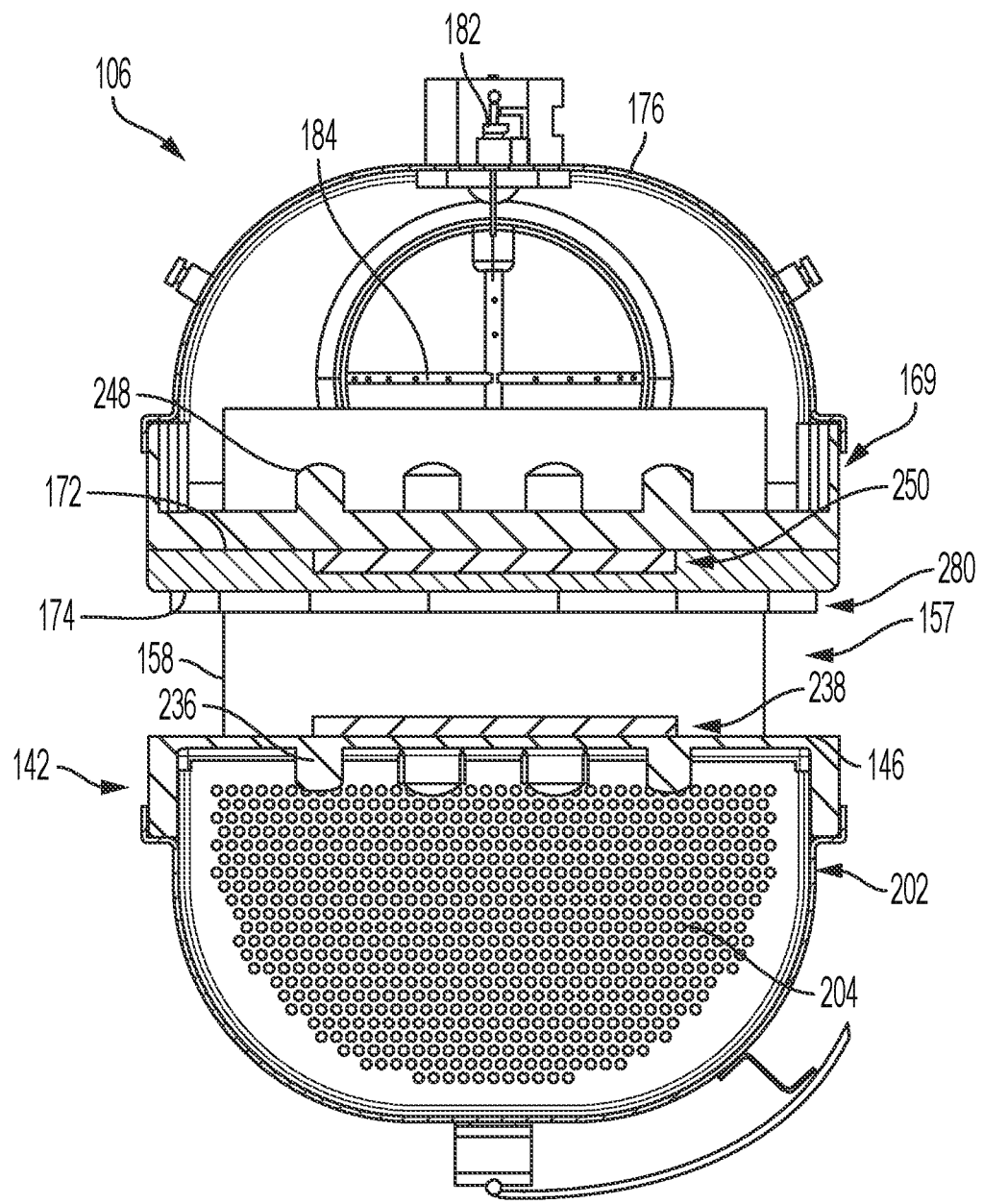
FIG. 11 is a side cross-sectional view of the housing assembly shown in FIG. 6 taken along plane D-D.
Figure 12:
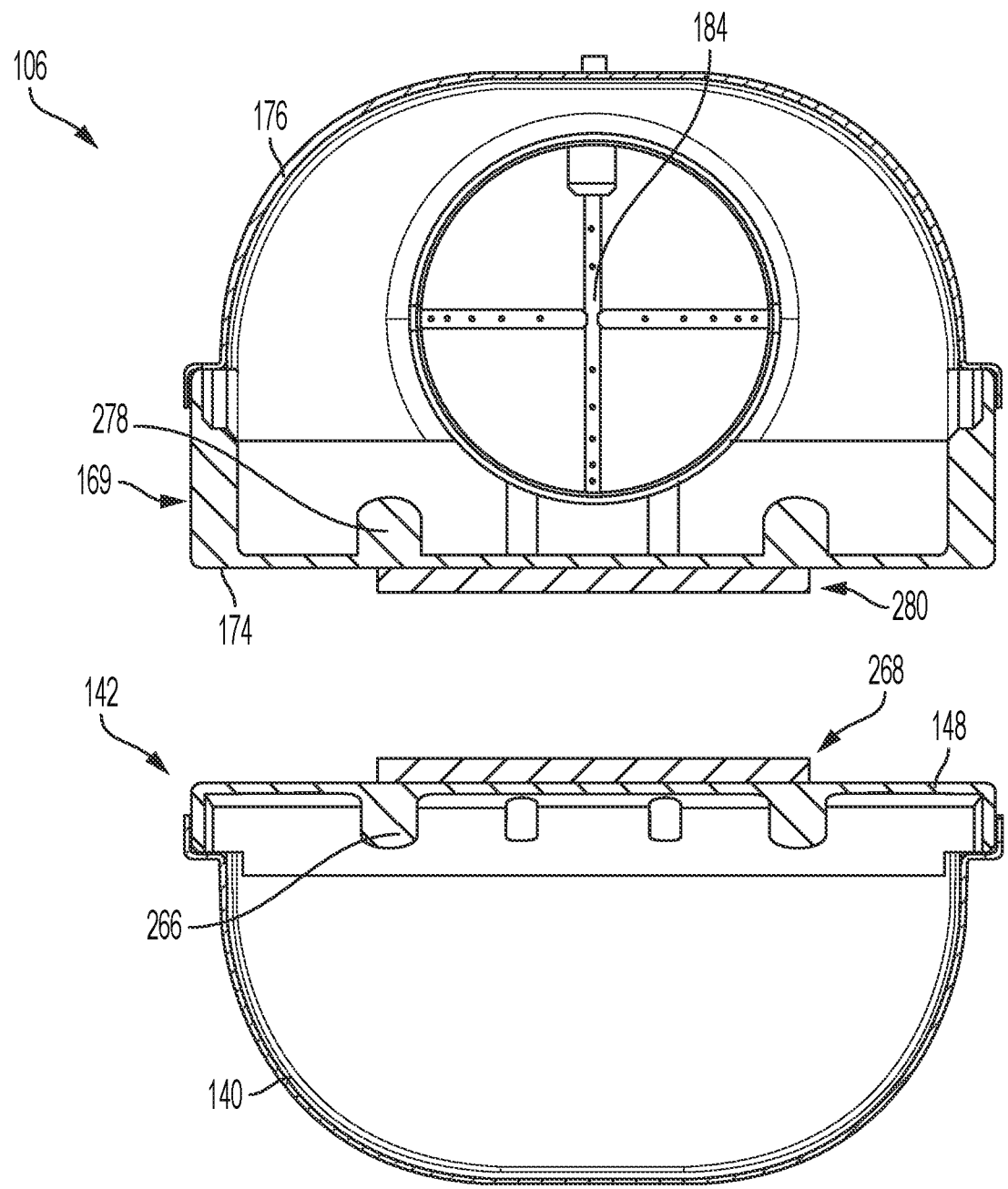
FIG. 12 is a side cross-sectional view of the housing assembly shown in FIG. 6 taken along plane E-E.
Figure 13:
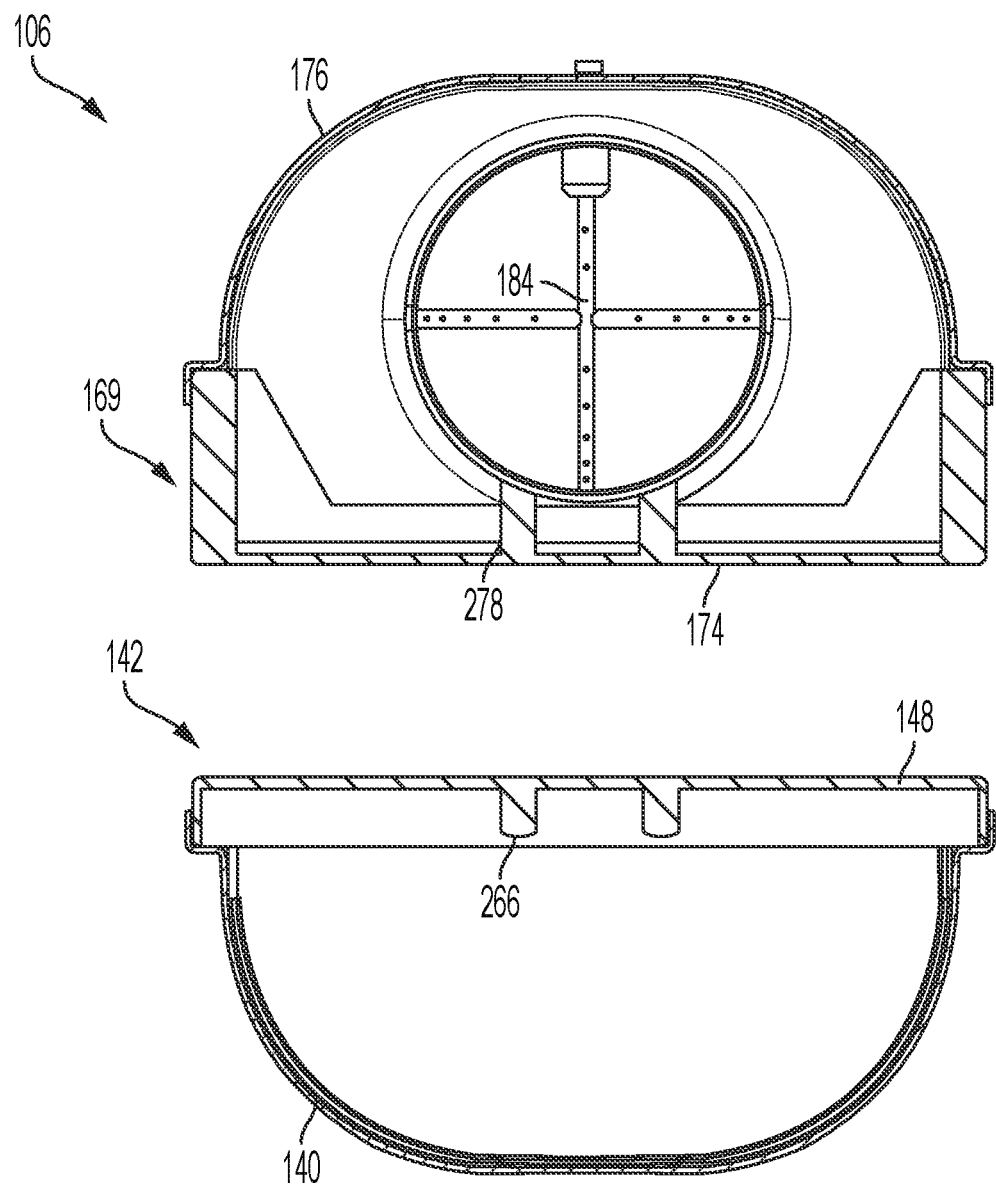
FIG. 13 is a side cross-sectional view of the housing assembly shown in FIG. 6 taken along plane F-F.
Figure 14:
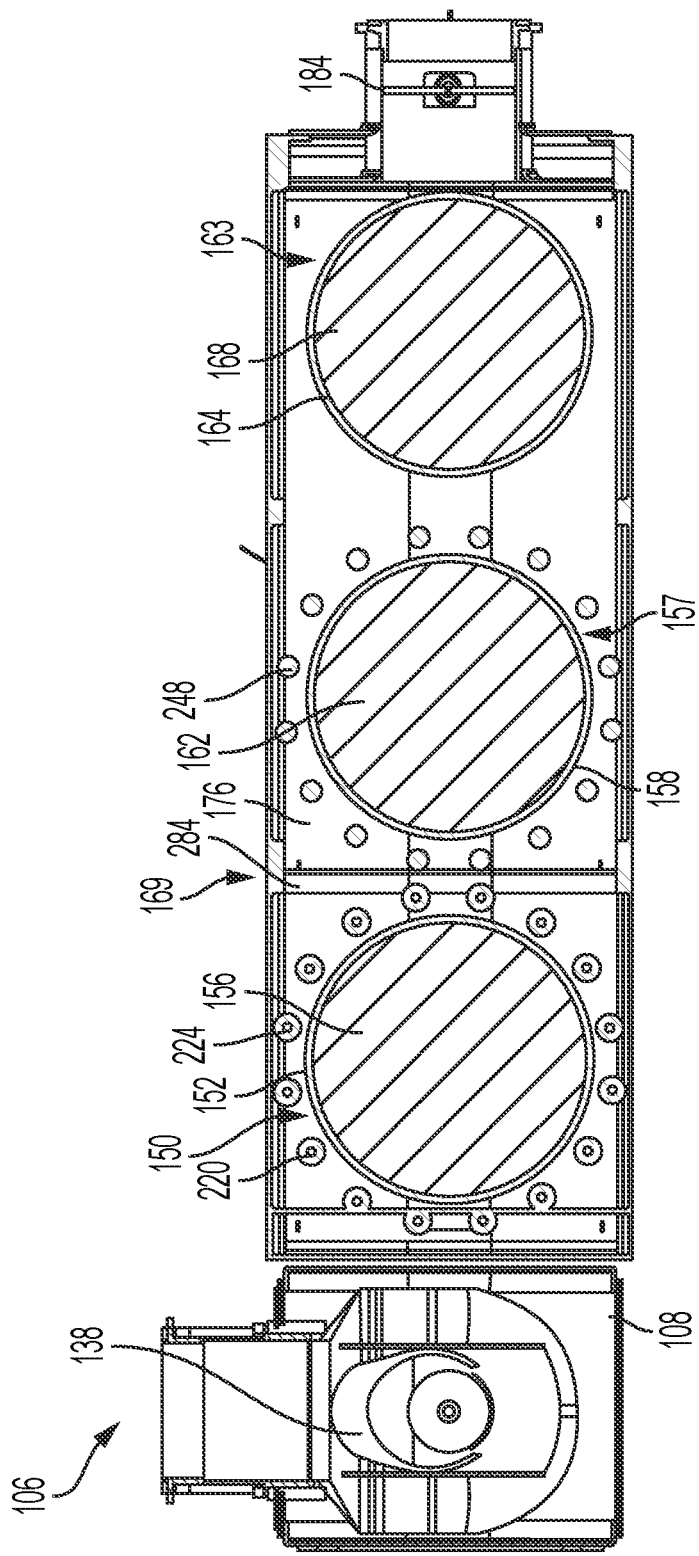
FIG. 14 is a bottom cross-sectional view of the housing assembly shown in FIG. 6 taken along plane G-G.
Figure 15:
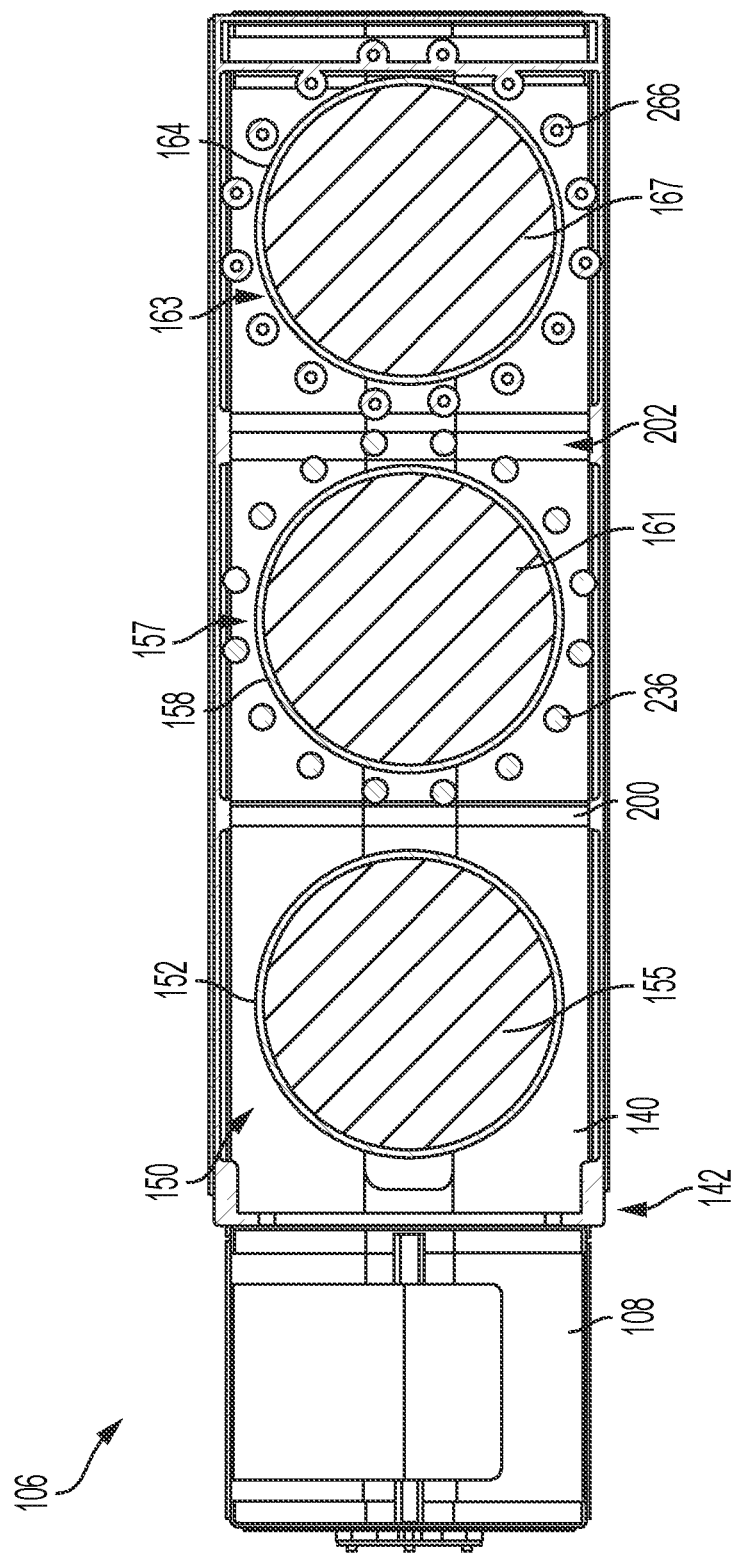
FIG. 15 is a bottom cross-sectional view of the housing assembly shown in FIG. 6 taken along plane H-H.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a housing assembly for an exhaust gas aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

In order to reduce emissions, it may be desirable to treat exhaust gas using an aftertreatment system that includes at least one aftertreatment component. After the aftertreatment component has treated a certain amount of exhaust gas, the aftertreatment component may need to be serviced or replaced. Additionally, it may occasionally be desired to remove the aftertreatment component and replace the aftertreatment component with a different aftertreatment component, thereby repurposing the aftertreatment system from one application to another. Removing, servicing, and replacing the aftertreatment component may be difficult or impossible in many aftertreatment systems because the aftertreatment component is not removable and/or not easily accessible by a user. Furthermore, it may be desirable to treat exhaust gas using an aftertreatment system that includes two or more aftertreatment components in parallel. In these aftertreatment systems, a backpressure created by the aftertreatment components may make operation of the aftertreatment system undesirable.

Implementations herein are related to an exhaust gas aftertreatment system that includes a housing assembly with at least one aftertreatment component that is configured to be removed, serviced, and replaced through use of flanges and fasteners. Each aftertreatment component is configured to be inserted into a receiving housing and a distributing housing, and includes a first flange that is configured to be fastened to the receiving housing and a second flange that is configured to be fastened to the distributing housing. Through these flanges and fasteners, the exhaust gas aftertreatment system described herein may facilitate simple and rapid removal, servicing, and replacement of the aftertreatment components. As a result, servicing of the exhaust gas aftertreatment system described herein may be significantly less expensive than other aftertreatment systems. Additionally, the flanges and fasteners facilitate rapid repurposing of the exhaust gas aftertreatment system described here (e.g., by changing a type of one or more of the aftertreatment components, etc.), thereby making the exhaust gas aftertreatment system significantly more desirable than other aftertreatment systems which cannot be readily repurposed.

The receiving housing and distributing housing described herein may each include panels that are staggered so as to facilitate different separation lengths for each aftertreatment component. By variously configuring the receiving housing and the distributing housing so as to select the separation lengths, a first parameter of a first portion of the exhaust gas flowing into the first aftertreatment component may be balanced with a second parameter of a second portion of the exhaust gas flowing into the second aftertreatment component. In this way, the exhaust gas aftertreatment system described herein is capable of desirably treating exhaust gas using more than one aftertreatment component.

II. Overview of Example Exhaust Gas Aftertreatment Systems

FIG. 1 depicts an exhaust gas aftertreatment system 100 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). The exhaust gas aftertreatment system 100 includes an exhaust gas conduit system 102 (e.g., line system, pipe system, etc.). The exhaust gas conduit system 102 is configured to facilitate routing of the exhaust gas produced by the internal combustion engine throughout the exhaust gas aftertreatment system 100 and to atmosphere (e.g., ambient environment, etc.).

The exhaust gas conduit system 102 includes an inlet exhaust gas conduit 104 (e.g., line, pipe, etc.). The inlet exhaust gas conduit 104 is fluidly coupled to an upstream component (e.g., header on the internal combustion engine, exhaust manifold on the internal combustion engine, the internal combustion engine, etc.) and is configured to receive exhaust gas from the upstream component. In some embodiments, the inlet exhaust gas conduit 104 is coupled (e.g., attached, fixed, welded, fastened, riveted, adhesively attached, bonded, pinned, etc.) to the upstream component. In other embodiments, the inlet exhaust gas conduit 104 is integrally formed with the upstream component.

The exhaust gas aftertreatment system 100 also includes a housing assembly 106 (e.g., body assembly, etc.). As is explained in more detail herein, the housing assembly 106 is configured to facilitate treatment of the exhaust gas. This treatment may facilitate reduction of emission of undesirable components (e.g., nitrogen oxides ($NO_x$), etc.) in the exhaust gas. This treatment may also or instead facilitate conversion of various oxidation components (e.g., carbon monoxide (CO), hydrocarbons, etc.) of the exhaust gas into other components (e.g., carbon dioxide ($CO_2$), water vapor, etc.). This treatment may also or instead facilitate removal of particulates (e.g., soot, particulate matter, etc.) from the exhaust gas.

The housing assembly 106 includes an introduction housing 108 (e.g., decomposition housing, decomposition reactor, decomposition chamber, reactor pipe, decomposition tube, reactor tube, hydrocarbon introduction housing, etc.).

The introduction housing 108 is fluidly coupled to the inlet exhaust gas conduit 104 and is configured to receive exhaust gas from the inlet exhaust gas conduit 104. In various embodiments, the introduction housing 108 is coupled to the inlet exhaust gas conduit 104. For example, the introduction housing 108 may be fastened (e.g., using a band, using bolts, using twist-lock fasteners, threaded, etc.), welded, riveted, or otherwise attached to the inlet exhaust gas conduit 104. In other embodiments, the introduction housing 108 is integrally formed with the inlet exhaust gas conduit 104. As utilized herein, the terms "fastened," "fastening," and the like describe attachment (e.g., joining, etc.) of two structures in such a way that detachment (e.g., separation, etc.) of the two structures remains possible while "fastened" or after the "fastening" is completed, without destroying or damaging either or both of the two structures.

As is explained in more detail herein, the introduction housing 108 is configured to facilitate introduction of a treatment fluid, such as a reductant (e.g., diesel exhaust fluid (DEF), Adblue®, a urea-water solution (UWS), an aqueous urea solution, AUS32, etc.) or a hydrocarbon (e.g., fuel, oil, additive, etc.), into the exhaust gas. When the reductant is introduced into the exhaust gas, reduction of emission of undesirable components (e.g., nitrogen oxides ($NO_x$), etc.) in the exhaust gas may be facilitated. When the hydrocarbon is introduced into the exhaust gas, the temperature of the exhaust gas may be increased (e.g., to facilitate regeneration of components of the exhaust gas aftertreatment system 100, etc.). For example, the temperature of the exhaust gas may be increased by combusting the hydrocarbon within the exhaust gas (e.g., using a spark plug, etc.).

The exhaust gas aftertreatment system 100 also includes a treatment fluid delivery system 110. As is explained in more detail herein, the treatment fluid delivery system 110 is configured to facilitate the introduction of the treatment fluid into the exhaust gas. The treatment fluid delivery system 110 includes a dosing module 112 (e.g., doser, reductant doser, hydrocarbon doser, etc.). The dosing module 112 is configured to facilitate passage of the treatment fluid through the introduction housing 108 and into the introduction housing 108. The dosing module 112 may include an insulator interposed between a portion of the dosing module 112 and the portion of the introduction housing 108 on which the dosing module 112 is mounted. In various embodiments, the dosing module 112 is coupled to the introduction housing 108.

The treatment fluid delivery system 110 also includes a treatment fluid source 114 (e.g., reductant tank, hydrocarbon tank, etc.). The treatment fluid source 114 is configured to contain the treatment fluid. The treatment fluid source 114 is fluidly coupled to the dosing module 112 and configured to provide the treatment fluid to the dosing module 112. The treatment fluid source 114 may include multiple treatment fluid sources 114 (e.g., multiple tanks connected in series or in parallel, etc.). The treatment fluid source 114 may be, for example, a diesel exhaust fluid tank containing Adblue® or a fuel tank containing fuel.

The treatment fluid delivery system 110 also includes a treatment fluid pump 116 (e.g., supply unit, etc.). The treatment fluid pump 116 is fluidly coupled to the treatment fluid source 114 and the dosing module 112 and configured to receive the treatment fluid from the treatment fluid source 114 and to provide the treatment fluid to the dosing module 112. The treatment fluid pump 116 is used to pressurize the treatment fluid from the treatment fluid source 114 for delivery to the dosing module 112. In some embodiments, the treatment fluid pump 116 is pressure controlled. In some embodiments, the treatment fluid pump 116 is coupled to a chassis of a vehicle associated with the exhaust gas aftertreatment system 100.

In some embodiments, the treatment fluid delivery system 110 also includes a treatment fluid filter 118. The treatment fluid filter 118 is fluidly coupled to the treatment fluid source 114 and the treatment fluid pump 116 and is configured to receive the treatment fluid from the treatment fluid source 114 and to provide the treatment fluid to the treatment fluid pump 116. The treatment fluid filter 118 filters the treatment fluid prior to the treatment fluid being provided to internal components of the treatment fluid pump 116. For example, the treatment fluid filter 118 may inhibit or prevent the transmission of solids to the internal components of the treatment fluid pump 116. In this way, the treatment fluid filter 118 may facilitate prolonged desirable operation of the treatment fluid pump 116.

The dosing module 112 includes at least one injector 120 (e.g., insertion device, etc.). The injector 120 is fluidly coupled to the treatment fluid pump 116 and configured to receive the treatment fluid from the treatment fluid pump 116. The injector 120 is configured to dose (e.g., inject, insert, etc.) the treatment fluid received by the dosing module 112 into the exhaust gas within the introduction housing 108.

In some embodiments, the treatment fluid delivery system 110 also includes an air pump 122 and an air source 124 (e.g., air intake, etc.). The air pump 122 is fluidly coupled to the air source 124 and is configured to receive air from the air source 124. The air pump 122 is fluidly coupled to the dosing module 112 and is configured to provide the air to the dosing module 112. In some applications, the dosing module 112 is configured to mix the air and the treatment fluid into an air-treatment fluid mixture and to provide the air-treatment fluid mixture to the injector 120 (e.g., for dosing into the exhaust gas within the introduction housing 108, etc.). The injector 120 is fluidly coupled to the air pump 122 and configured to receive the air from the air pump 122. The injector 120 is configured to dose the air-treatment fluid mixture into the exhaust gas within the introduction housing 108. In some of these embodiments, the treatment fluid delivery system 110 also includes an air filter 126. The air filter 126 is fluidly coupled to the air source 124 and the air pump 122 and is configured to receive the air from the air source 124 and to provide the air to the air pump 122. The air filter 126 is configured to filter the air prior to the air being provided to the air pump 122. In other embodiments, the treatment fluid delivery system 110 does not include the air pump 122 and/or the treatment fluid delivery system 110 does not include the air source 124. In such embodiments, the dosing module 112 is not configured to mix the treatment fluid with the air.

In various embodiments, the dosing module 112 is configured to receive air and fluid, and doses the air-treatment fluid mixture into the introduction housing 108. In various embodiments, the dosing module 112 is configured to receive treatment fluid (and does not receive air), and doses the treatment fluid into the introduction housing 108. In various embodiments, the dosing module 112 is configured to receive treatment fluid, and doses the treatment fluid into the introduction housing 108. In various embodiments, the dosing module 112 is configured to receive air and treatment fluid, and doses the air-treatment fluid mixture into the introduction housing 108.

The exhaust gas aftertreatment system 100 also includes a controller 128 (e.g., control circuit, driver, etc.). The dosing module 112, the treatment fluid pump 116, and the air pump 122 are also electrically or communicatively coupled to the controller 128. The controller 128 is configured to control the dosing module 112 to dose the treatment fluid or the air-treatment fluid mixture into the introduction housing 108. The controller 128 may also be configured to control the treatment fluid pump 116 and/or the air pump 122 in order to control the treatment fluid or the air-treatment fluid mixture that is dosed into the introduction housing 108.

The controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the controller 128 can read instructions. The instructions may include code from any suitable programming language. The memory 134 may include various modules that include instructions which are configured to be implemented by the processor 132.

In various embodiments, the controller 128 is configured to communicate with a central controller 136 (e.g., engine control unit (ECU), engine control module (ECM), etc.) of an internal combustion engine having the exhaust gas aftertreatment system 100. In some embodiments, the central controller 136 and the controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state and an alarm state based on a communication from the central controller 136. By changing state, the display device may provide an indication to a user of a status of the treatment fluid delivery system 110.

In various embodiments, the exhaust gas aftertreatment system 100 also includes a mixer 138 (e.g., a swirl generating device, a vaned plate, inlet plate, deflector plate, etc.). At least a portion of the mixer 138 is positioned within the introduction housing 108. The mixer 138 is configured to receive the exhaust gas from the inlet exhaust gas conduit 104. The mixer 138 is also configured to mix the treatment fluid or the air-treatment fluid mixture received from the injector 120. The mixer 138 is configured to facilitate swirling (e.g., tumbling, rotation, etc.) of the exhaust gas and mixing (e.g., combination, etc.) of the exhaust gas and the treatment fluid or the air-treatment fluid mixture so as to disperse the treatment fluid within the exhaust gas downstream of the mixer 138. By dispersing the treatment fluid within the exhaust gas (e.g., to obtain an increased uniformity index, etc.) using the mixer 138, reduction of emission of undesirable components in the exhaust gas is enhanced or a temperature of the exhaust gas may be increased.

The housing assembly 106 also includes a transfer housing 140 (e.g., chamber, body, etc.). The transfer housing 140 is fluidly coupled to the introduction housing 108 and is configured to receive exhaust gas from the introduction housing 108. In various embodiments, the transfer housing 140 is coupled to the introduction housing 108. For example, the transfer housing 140 may be fastened, welded, riveted, or otherwise attached to the introduction housing 108. In other embodiments, the transfer housing 140 is integrally formed with (e.g., unitarily formed with, formed as a one-piece construction with, inseparable from, etc.) the introduction housing 108.

In various embodiments, such as is shown in FIG. 1, a lowermost portion (e.g., relative to a direction of gravity, etc.) of the transfer housing 140 extends along a transfer housing axis λ. In this way, the transfer housing axis λ provides a reference point for configuring dimensions of various components of the housing assembly 106. The exhaust gas may be provided (e.g., outputted, etc.) through the transfer housing 140 in a direction that is parallel to, or coincident with, the transfer housing axis λ.

The housing assembly 106 also includes a distributing housing 142 (e.g., pressure regulator, flow plenum, flow balancer, flow balancing system, etc.). The distributing housing 142 is fluidly coupled to the introduction housing 108 and is configured to receive exhaust gas from the introduction housing 108 (e.g., after the treatment fluid has been provided into the exhaust gas by the injector 120 and the treatment fluid and the exhaust gas have been mixed by the mixer 138, etc.). In various embodiments, the distributing housing 142 is coupled to the introduction housing 108. For example, the distributing housing 142 may be fastened, welded, riveted, or otherwise attached to the introduction housing 108. In other embodiments, the distributing housing 142 is integrally formed with the introduction housing 108.

The distributing housing 142 includes a distributing housing first panel 144 (e.g., platform, plate, flange, etc.). The distributing housing 142 is configured such that the distributing housing first panel 144 is separated from the transfer housing axis λ by a distribution housing first panel separation length $L_{dhfp}$ (e.g., distance, etc.). In various embodiments, the distribution housing first panel separation length $L_{dhfp}$ is approximately equal to between 280 millimeters (mm) and 320 mm, inclusive. In some embodiments, the distribution housing first panel separation length $L_{dhfp}$ is approximately equal to 291.19 mm.

The distributing housing 142 also includes a distributing housing second panel 146 (e.g., platform, plate, flange, etc.). The distributing housing second panel 146 is separated from, and downstream of, the distributing housing first panel 144. The distributing housing 142 is configured such that the distributing housing second panel 146 is separated from the transfer housing axis λ by a distribution housing second panel separation length $L_{dhsp}$ (e.g., distance, etc.). The distribution housing second panel separation length $L_{dhsp}$ is less than the distribution housing first panel separation length $L_{dhfp}$.

In various embodiments, the distribution housing second panel separation length $L_{dhsp}$ is approximately equal to between 220 mm and 270 mm, inclusive. In some embodiments, the distribution housing second panel separation length $L_{dhsp}$ is approximately equal to 246.19 mm. In various embodiments, the distribution housing second panel separation length $L_{dhsp}$ is approximately equal to between a product of 0.60 and the distributing housing first panel separation length $L_{dhfp}$ and a product of 0.99 and the distributing housing first panel separation length $L_{dhfp}$, inclusive. In some embodiments, the distribution housing second panel separation length $L_{dhsp}$ is approximately equal to a product of 0.85 and the distributing housing first panel separation length $L_{dhfp}$.

The distributing housing 142 also includes a distributing housing third panel 148 (e.g., platform, plate, flange, etc.).

The distributing housing third panel 148 is separated from, and downstream of, the distributing housing second panel 146. The distributing housing 142 is configured such that the distributing housing third panel 148 is separated from the transfer housing axis λ by a distribution housing third panel separation length $L_{dhtp}$ (e.g., distance, etc.). The distribution housing third panel separation length $L_{dhtp}$ is less than the distribution housing first panel separation length $L_{dhfp}$ and is less than the distribution housing second panel separation length $L_{dhsp}$.

In various embodiments, the distribution housing third panel separation length $L_{dhtp}$ is approximately equal to between 190 mm and 250 mm, inclusive. In some embodiments, the distribution housing third panel separation length $L_{dhtp}$ is approximately equal to 221.19 mm. In various embodiments, the distribution housing third panel separation length $L_{dhtp}$ is approximately equal to between a product of 0.50 and the distributing housing first panel separation length $L_{dhfp}$ and a product of 0.96 and the distributing housing first panel separation length $L_{dhfp}$, inclusive. In some embodiments, the distribution housing third panel separation length $L_{dhtp}$ is approximately equal to a product of 0.76 and the distributing housing first panel separation length $L_{dhfp}$.

In some embodiments, the distributing housing 142 does not include the distributing housing second panel 146. In these embodiments, the distributing housing 142 only includes the distributing housing first panel 144 and the distributing housing third panel 148.

In some embodiments, the distributing housing 142 does not include the distributing housing third panel 148. In these embodiments, the distributing housing 142 only includes the distributing housing first panel 144 and the distributing housing second panel 146.

In other embodiments, the distributing housing 142 only includes the distributing housing first panel 144 and does not include the distributing housing second panel 146 or the distributing housing third panel 148.

The exhaust gas aftertreatment system 100 also includes a first aftertreatment component 150 (e.g., exhaust gas aftertreatment component, aftertreatment module, etc.). The first aftertreatment component 150 includes a first casing 152 (e.g., housing, shell, body, etc.). The first casing 152 is fastened to the distributing housing first panel 144. As a result, the first casing 152 can be selectively attached to the distributing housing first panel 144 and selectively detached from the distributing housing first panel 144. This enables the first aftertreatment component 150 to be removed from the housing assembly 106 for servicing and/or replacement. For example, a user may detach the first casing 152 from the distributing housing first panel 144, remove the first aftertreatment component 150 from the housing assembly 106, insert a new first aftertreatment component 150 into the housing assembly 106, and attach the first casing 152 to the distributing housing first panel 144. In this way, a capability of the exhaust gas aftertreatment system 100 to treat the exhaust gas may be maintained or modified.

Additionally, the first casing 152 is fastened to the distributing housing first panel 144 such that a portion of the first casing 152 is positioned within the distributing housing 142 (e.g., using a gasket, using a spacer, using a seal, etc.) such that flow of the exhaust gas between the first casing 152 and the distributing housing first panel 144 is substantially prevented (e.g., less than 1% of the exhaust gas flow received by the first casing 152 flows between the first casing 152 and the distributing housing first panel 144, etc.). The distributing housing 142 is configured to facilitate flow of a first portion of the exhaust gas from the distributing housing 142 into the first casing 152.

The first aftertreatment component 150 also includes a first substrate 154 (e.g., working member, etc.). The first substrate 154 is coupled to the first casing 152. For example, the first substrate 154 may be fastened to the first casing 152.

The first substrate 154 receives the first portion of the exhaust gas from the first casing 152 (e.g., from an inlet of the first casing 152, etc.) and provides the first portion of the exhaust gas to the first casing 152 (e.g., to an outlet of the first casing 152, etc.). The first substrate 154 is configured to facilitate treatment of the first portion of the exhaust gas from the distributing housing 142. This treatment may facilitate reduction of emission of undesirable components in the first portion of the exhaust gas. This treatment may also or instead facilitate conversion of various oxidation components of the first portion of the exhaust gas into other components. This treatment may also or instead facilitate removal of particulates from the first portion of the exhaust gas.

In some embodiments, the first casing 152 and/or the first substrate 154 is centered on a first component axis Ω. In some embodiments, the first component axis Ω is approximately (e.g., within 5% of, etc.) orthogonal to the transfer housing axis λ (e.g., when measured on a plane along which the first component axis Ω and the transfer housing axis λ both extend, etc.). The first portion of the exhaust gas may be provided through the first casing 152 in a direction that is approximately parallel to, or coincident with, the first component axis Ω. Additionally or alternatively, the first portion of the exhaust gas may be provided through the first substrate 154 in a direction that is approximately parallel to, or coincident with, the first component axis Ω.

In various embodiments, the first substrate 154 includes a conversion catalyst member (e.g., selective catalytic reduction (SCR) conversion catalyst member, catalyst metals etc.). In these embodiments, the treatment fluid provided by the dosing module 112 may be reductant and the first substrate 154 may be configured to cause decomposition of components of the first portion of the exhaust gas using the reductant (e.g., via catalytic reactions, etc.). Specifically, the reductant that has been provided into the first portion of the exhaust gas by the injector 120 undergoes the processes of evaporation, thermolysis, and hydrolysis to form non-$NO_x$ emissions within the first casing 152 and/or the first substrate 154. In this way, the first substrate 154 is configured to assist in the reduction of $NO_x$ emissions by accelerating a $NO_x$ reduction process between the reductant and the $NO_x$ of the first portion of the exhaust gas into diatomic nitrogen, water, and/or carbon dioxide. The conversion catalyst member included in the first substrate 154 may include, for example, platinum, rhodium, palladium, or other similar materials. In some embodiments, the conversion catalyst member included in the first substrate 154 is a ceramic conversion catalyst member.

The conversion catalyst member included in the first substrate 154 may be directional, meaning that it is desired for the exhaust gas to flow through the first substrate 154 in a single direction, or non-directional, meaning that it is desired for the exhaust gas to flow through the first substrate 154 in any direction. In applications where the conversion catalyst member included in the first substrate 154 is directional, the first casing 152 may include structures or features that facilitate (e.g., in a poka-yoke manner, etc.) fastening of the first casing 152 to the distributing housing first panel 144 in only one orientation of the first casing 152 relative to the distributing housing first panel 144.

In various embodiments, the first substrate 154 includes an oxidation catalyst member (e.g., a diesel oxidation catalyst (DOC), etc.). In these embodiments, the first substrate 154 is configured to oxidize a hydrocarbon and/or carbon monoxide in the first portion of the exhaust gas. In this way, the first substrate 154 may oxidize a hydrocarbon and/or carbon monoxide from the first portion of the exhaust gas prior to the exhaust gas being provided from the first casing 152. For example, the first substrate 154 may be an oxidation catalyst member that is configured to facilitate conversion of carbon monoxide in the first portion of the exhaust gas into carbon dioxide. In this example, the first casing 152 may receive the carbon monoxide and provide the carbon dioxide.

The oxidation catalyst member included in the first substrate 154 may be directional, meaning that it is desired for the exhaust gas to flow through the first substrate 154 in a single direction, or non-directional, meaning that it is desired for the exhaust gas to flow through the first substrate 154 in any direction. In applications where the oxidation catalyst member included in the first substrate 154 is directional, the first casing 152 may include structures or features that facilitate (e.g., in a poka-yoke manner, etc.) fastening of the first casing 152 to the distributing housing first panel 144 in only one orientation of the first casing 152 relative to the distributing housing first panel 144.

In various embodiments, the first substrate 154 includes an exhaust gas filtration member (e.g., a diesel particulate filter (DPF), etc.). In these embodiments, the first substrate 154 is configured to remove particulates from the first portion of the exhaust gas prior to the first portion of the exhaust gas being provided from the first casing 152. For example, the first portion of the exhaust gas received by the first casing 152 may have a first concentration of the particulates, the first substrate 154 may remove at least some of the particulates from the first portion of the exhaust gas, and the first casing 152 may provide the first portion of the exhaust gas with a second concentration of the particulates that is less than the first concentration.

The exhaust gas filtration member included in the first substrate 154 may be directional, meaning that it is desired for the exhaust gas to flow through the first substrate 154 in a single direction, or non-directional, meaning that it is desired for the exhaust gas to flow through the first substrate 154 in any direction. In applications where the exhaust gas filtration member included in the first substrate 154 is directional, the first casing 152 may include structures or features that facilitate (e.g., in a poka-yoke manner, etc.) fastening of the first casing 152 to the distributing housing first panel 144 in only one orientation of the first casing 152 relative to the distributing housing first panel 144.

In various embodiments, the first substrate 154 includes a first substrate first portion 155 (e.g., catalyst metals, etc.). The first substrate first portion 155 may include, for example, platinum, rhodium, palladium, or other similar materials. In some embodiments, the first substrate first portion 155 is a ceramic catalyst material. In some embodiments, the first substrate first portion 155 is an extruded catalyst material. In some embodiments, the first substrate first portion 155 is a metallic catalyst material (e.g., a metallic partial-flow filter, etc.).

In these embodiments, the first substrate 154 also includes a first substrate second portion 156 (e.g., catalyst metals, etc.). The first substrate second portion 156 may include, for example, platinum, rhodium, palladium, or other similar materials. In some embodiments, the first substrate second portion 156 is a ceramic catalyst material. In some embodiments, the first substrate second portion 156 is an extruded catalyst material. In some embodiments, the first substrate second portion 156 is a metallic catalyst material.

In some of these embodiments, the first substrate second portion 156 includes different materials than the first substrate first portion 155. For example, the first substrate second portion 156 may include platinum and the first substrate first portion 155 may include rhodium or palladium. In another example, the first substrate second portion 156 may include platinum, rhodium, or palladium and the first substrate first portion 155 may include a ceramic material. By including different materials in the first substrate first portion 155 and the first substrate second portion 156, an ability of the first aftertreatment component 150 to facilitate treatment of the first portion of the exhaust gas from the distributing housing 142 may be tailored for a target application.

In some of these embodiments, the first substrate second portion 156 is separated from the first substrate first portion 155 by a first gap $G_1$ (e.g., separation, etc.). The first gap $G_1$ may provide a mechanism for the exhaust gas to redistribute after exiting the first substrate first portion 155 and prior to entering the first substrate second portion 156. By selecting the first gap $G_1$, an ability of the first aftertreatment component 150 to facilitate treatment of the first portion of the exhaust gas from the distributing housing 142 may be tailored for a target application.

In various embodiments, the exhaust gas aftertreatment system 100 also includes a second aftertreatment component 157 (e.g., exhaust gas aftertreatment component, aftertreatment module, etc.). The second aftertreatment component 157 includes a second casing 158 (e.g., housing, shell, body, etc.). The second casing 158 is fastened to the distributing housing second panel 146. As a result, the second casing 158 can be selectively attached to the distributing housing second panel 146 and selectively detached from the distributing housing second panel 146. This enables the second aftertreatment component 157 to be removed from the housing assembly 106 for servicing and/or replacement. For example, a user may detach the second casing 158 from the distributing housing second panel 146, remove the second aftertreatment component 157 from the housing assembly 106, insert a new second aftertreatment component 157 into the housing assembly 106, and attach the second casing 158 to the distributing housing second panel 146. In this way, a capability of the exhaust gas aftertreatment system 100 to treat the exhaust gas may be maintained or modified.

Additionally, the second casing 158 is fastened to the distributing housing second panel 146 such that a portion of the second casing 158 is positioned within the distributing housing 142 (e.g., using a gasket, using a spacer, using a seal, etc.) such that flow of the exhaust gas between the second casing 158 and the distributing housing second panel 146 is substantially prevented (e.g., less than 1% of the exhaust gas flow received by the second casing 158 flows between the second casing 158 and the distributing housing second panel 146, etc.).

The distributing housing 142 is configured to facilitate flow of a second portion of the exhaust gas from the distributing housing 142 into the second casing 158. The second portion of the exhaust gas that flows from the distributing housing 142 into the second casing 158 is different from the first portion of the exhaust gas that flows into the first casing 152.

The second portion of the exhaust gas is routed through the second casing 158 in parallel with the first portion of the exhaust gas which is routed through the first casing 152. By routing the second portion of the exhaust gas through the second casing 158 in parallel with the first portion of the exhaust gas which is routed through the first casing 152, treating the exhaust gas is more desirable than in other systems that do not facilitate routing of exhaust gas into two aftertreatment components in parallel. For example, the parallel routing of the exhaust gas through the first casing 152 and the second casing 158 may provide an increased capacity of the exhaust gas aftertreatment system 100 to treat exhaust gas and/or an increased efficiency of the exhaust gas aftertreatment system 100 in treating exhaust gas, when compared to other aftertreatment systems that do not facilitate routing of exhaust gas into two aftertreatment components in parallel.

The second aftertreatment component 157 also includes a second substrate 160 (e.g., working member, etc.). The second substrate 160 is coupled to the second casing 158. For example, the second substrate 160 may be fastened to the second casing 158.

The second substrate 160 receives the second portion of the exhaust gas from the second casing 158 (e.g., from an inlet of the second casing 158, etc.) and provides the second portion of the exhaust gas to the second casing 158 (e.g., to an outlet of the second casing 158, etc.). The second substrate 160 is configured to facilitate treatment of the second portion of the exhaust gas from the distributing housing 142 (e.g., independent of the treatment of the first portion of the exhaust gas by the first substrate 154, etc.). This treatment may facilitate reduction of emission of undesirable components in the second portion of the exhaust gas. This treatment may also or instead facilitate conversion of various oxidation components of the second portion of the exhaust gas into other components. This treatment may also or instead facilitate removal of particulates from the second portion of the exhaust gas.

In some embodiments, the second casing 158 and/or the second substrate 160 is centered on a second component axis $\sigma$. In some embodiments, the second component axis $\sigma$ is approximately orthogonal to the transfer housing axis $\lambda$ (e.g., when measured on a plane along which the second component axis $\sigma$ and the transfer housing axis $\lambda$ both extend, etc.). In some embodiments, the second component axis $\sigma$ is approximately parallel to the first component axis $\Omega$ (e.g., when measured on a plane along which the second component axis $\sigma$ and the first component axis $\Omega$ both extend, etc.). The second portion of the exhaust gas may be provided through the second casing 158 in a direction that is approximately parallel to, or coincident with, the second component axis $\sigma$. Additionally or alternatively, the second portion of the exhaust gas may be provided through the second substrate 160 in a direction that is approximately parallel to, or coincident with, the second component axis $\sigma$.

In various embodiments, the second substrate 160 includes a conversion catalyst member (e.g., SCR conversion catalyst member, catalyst metals, etc.). In these embodiments, the treatment fluid provided by the dosing module 112 may be reductant and the second substrate 160 may be configured to cause decomposition of components of the second portion of the exhaust gas using the reductant (e.g., via catalytic reactions, etc.). Specifically, the reductant that has been provided into the second portion of the exhaust gas by the injector 120 undergoes the processes of evaporation, thermolysis, and hydrolysis to form non-$NO_x$ emissions within the second casing 158 and/or the second substrate 160. In this way, the second substrate 160 is configured to assist in the reduction of $NO_x$ emissions by accelerating a $NO_x$ reduction process between the reductant and the $NO_x$ of the second portion of the exhaust gas into diatomic nitrogen, water, and/or carbon dioxide. The conversion catalyst member included in the second substrate 160 may include, for example, platinum, rhodium, palladium, or other similar materials. In some embodiments, the conversion catalyst member included in the second substrate 160 is a ceramic conversion catalyst member.

The conversion catalyst member included in the second substrate 160 may be directional, meaning that it is desired for the exhaust gas to flow through the second substrate 160 in a single direction, or non-directional, meaning that it is desired for the exhaust gas to flow through the second substrate 160 in any direction. In applications where the conversion catalyst member included in the second substrate 160 is directional, the second casing 158 may include structures or features that facilitate (e.g., in a poka-yoke manner, etc.) fastening of the second casing 158 to the distributing housing second panel 146 in only one orientation of the second casing 158 relative to the distributing housing second panel 146.

In various embodiments, the second substrate 160 includes an oxidation catalyst member (e.g., a DOC, etc.). In these embodiments, the second substrate 160 is configured to oxidize a hydrocarbon and/or carbon monoxide in the second portion of the exhaust gas. In this way, the second substrate 160 may oxidize a hydrocarbon and/or carbon monoxide from the second portion of the exhaust gas prior to the exhaust gas being provided from the second casing 158. For example, the second substrate 160 may be an oxidation catalyst member that is configured to facilitate conversion of carbon monoxide in the second portion of the exhaust gas into carbon dioxide. In this example, the second casing 158 may receive the carbon monoxide and provide the carbon dioxide.

The oxidation catalyst member included in the second substrate 160 may be directional, meaning that it is desired for the exhaust gas to flow through the second substrate 160 in a single direction, or non-directional, meaning that it is desired for the exhaust gas to flow through the second substrate 160 in any direction. In applications where the oxidation catalyst member included in the second substrate 160 is directional, the second casing 158 may include structures or features that facilitate (e.g., in a poka-yoke manner, etc.) fastening of the second casing 158 to the distributing housing second panel 146 in only one orientation of the second casing 158 relative to the distributing housing second panel 146.

In various embodiments, the second substrate 160 includes an exhaust gas filtration member (e.g., a DPF, etc.). In these embodiments, the second substrate 160 is configured to remove particulates from the second portion of the exhaust gas prior to the second portion of the exhaust gas being provided from the second casing 158. For example, the second portion of the exhaust gas received by the second casing 158 may have a first concentration of the particulates, the second substrate 160 may remove at least some of the particulates from the second portion of the exhaust gas, and the second casing 158 may provide the second portion of the exhaust gas with a second concentration of the particulates that is less than the first concentration.

The exhaust gas filtration member included in the second substrate 160 may be directional, meaning that it is desired for the exhaust gas to flow through the second substrate 160 in a single direction, or non-directional, meaning that it is desired for the exhaust gas to flow through the second substrate 160 in any direction. In applications where the exhaust gas filtration member included in the second substrate 160 is directional, the second casing 158 may include structures or features that facilitate (e.g., in a poka-yoke manner, etc.) fastening of the second casing 158 to the distributing housing second panel 146 in only one orientation of the second casing 158 relative to the distributing housing second panel 146.

In various embodiments, the second substrate 160 includes the same type of components as the first substrate 154. For example, in some embodiments, the first substrate 154 includes a conversion catalyst member and the second substrate 160 also includes a conversion catalyst member. The conversion catalyst member included in the first substrate 154 may be the same as, or different from (e.g., complementary to, etc.), the conversion catalyst member included in the second substrate 160. In some embodiments, the first substrate 154 includes an oxidation catalyst member and the second substrate 160 also includes an oxidation catalyst member. The oxidation catalyst member included in the first substrate 154 may be the same as, or different from (e.g., complementary to, etc.), the oxidation catalyst member included in the second substrate 160. In some embodiments, the first substrate 154 includes an exhaust gas filtration member and the second substrate 160 also includes an exhaust gas filtration member. The exhaust gas filtration member included in the first substrate 154 may be the same as, or different from (e.g., complementary to, etc.), the exhaust gas filtration member included in the second substrate 160.

In various embodiments, the second substrate 160 includes a second substrate first portion 161 (e.g., catalyst metals, etc.). The second substrate first portion 161 may include, for example, platinum, rhodium, palladium, or other similar materials. In some embodiments, the second substrate first portion 161 is a ceramic catalyst material. In some embodiments, the second substrate first portion 161 is an extruded catalyst material. In some embodiments, the second substrate first portion 161 is a metallic catalyst material.

In these embodiments, the second substrate 160 also includes a second substrate second portion 162 (e.g., catalyst metals, etc.). The second substrate second portion 162 may include, for example, platinum, rhodium, palladium, or other similar materials. In some embodiments, the second substrate second portion 162 is a ceramic catalyst material. In some embodiments, the second substrate second portion 162 is an extruded catalyst material. In some embodiments, the second substrate second portion 162 is a metallic catalyst material.

In some of these embodiments, the second substrate second portion 162 includes different materials than the second substrate first portion 161. For example, the second substrate second portion 162 may include platinum and the second substrate first portion 161 may include rhodium or palladium. In another example, the second substrate second portion 162 may include platinum, rhodium, or palladium and the second substrate first portion 161 may include a ceramic material. By including different materials in the second substrate first portion 161 and the second substrate second portion 162, an ability of the second aftertreatment component 157 to facilitate treatment of the second portion of the exhaust gas from the distributing housing 142 may be tailored for a target application.

In some of these embodiments, the second substrate second portion 162 is separated from the second substrate first portion 161 by a second gap $G_2$ (e.g., separation, etc.). The second gap $G_2$ may provide a mechanism for the exhaust gas to redistribute after exiting the second substrate first portion 161 and prior to entering the second substrate second portion 162. By selecting the second gap $G_2$, an ability of the second aftertreatment component 157 to facilitate treatment of the second portion of the exhaust gas from the distributing housing 142 may be tailored for a target application.

In various embodiments, the exhaust gas aftertreatment system 100 also includes a third aftertreatment component 163 (e.g., exhaust gas aftertreatment component, aftertreatment module, etc.). The third aftertreatment component 163 includes a third casing 164 (e.g., housing, shell, body, etc.). The third casing 164 is fastened to the distributing housing third panel 148. As a result, the third casing 164 can be selectively attached to the distributing housing third panel 148 and selectively detached from the distributing housing third panel 148. This enables the third aftertreatment component 163 to be removed from the housing assembly 106 for servicing and/or replacement. For example, a user may detach the third casing 164 from the distributing housing third panel 148, remove the third aftertreatment component 163 from the housing assembly 106, insert a new third aftertreatment component 163 into the housing assembly 106, and attach the third casing 164 to the distributing housing third panel 148. In this way, a capability of the exhaust gas aftertreatment system 100 to treat the exhaust gas may be maintained or modified.

Additionally, the third casing 164 is fastened to the distributing housing third panel 148 such that a portion of the third casing 164 is positioned within the distributing housing 142 (e.g., using a gasket, using a spacer, using a seal, etc.) such that flow of the exhaust gas between the third casing 164 and the distributing housing third panel 148 is substantially prevented (e.g., less than 1% of the exhaust gas flow received by the third casing 164 flows between the third casing 164 and the distributing housing third panel 148, etc.).

The distributing housing 142 is configured to facilitate flow of a third portion of the exhaust gas from the distributing housing 142 into the third casing 164. The third portion of the exhaust gas that flows from the distributing housing 142 into the third casing 164 is different from the first portion of the exhaust gas that flows into the first casing 152 and is different from the second portion of the exhaust gas that flows into the second casing 158.

The third portion of the exhaust gas is routed through the third casing 164 in parallel with the second portion of the exhaust gas which is routed through the second casing 158, and the third portion of the exhaust gas is routed through the third casing 164 in parallel with the first portion of the exhaust gas which is routed through the first casing 152. By routing the third portion of the exhaust gas through the third casing 164 in parallel with the second portion of the exhaust gas which is routed through the second casing 158 and routing the third portion of the exhaust gas through the third casing 164 in parallel with the first portion of the exhaust gas which is routed through the first casing 152, treating the exhaust gas is more desirable than in other systems that do not facilitate routing of exhaust gas into three aftertreatment components in parallel. For example, the parallel routing of the exhaust gas through the first casing 152, the second casing 158, and the third casing 164 may provide an increased capacity of the exhaust gas aftertreatment system 100 to treat exhaust gas and/or an increased efficiency of the exhaust gas aftertreatment system 100 in treating exhaust gas, when compared to other aftertreatment systems that do not facilitate routing of exhaust gas into three aftertreatment components in parallel.

The distributing housing 142 is configured to balance (e.g., equalize, evenly divide, etc.) the first portion of the exhaust gas which is routed through the first casing 152, the second portion of the exhaust gas which is routed through the second casing 158, and the third portion of the exhaust gas which is routed through the third casing 164. For example, the first portion of the exhaust gas, the second portion of the exhaust gas, and the third portion of the exhaust gas may be balanced when a first parameter (e.g., flow rate, mass flow rate, volumetric flow rate, velocity, pressure, temperature, hydrocarbon concentration, $NO_x$ concentration, CO concentration, $CO_2$ concentration, $O_2$ concentration, particulate concentration, nitrogen concentration, etc.) of the first portion of the exhaust gas, a second parameter (e.g., flow rate, mass flow rate, volumetric flow rate, velocity, pressure, temperature, hydrocarbon concentration, $NO_x$ concentration, CO concentration, $CO_2$ concentration, $O_2$ concentration, particulate concentration, nitrogen concentration, etc.) of the second portion of the exhaust gas, and a third parameter (e.g., flow rate, mass flow rate, volumetric flow rate, velocity, pressure, temperature, hydrocarbon concentration, $NO_x$ concentration, CO concentration, $CO_2$ concentration, $O_2$ concentration, particulate concentration, nitrogen concentration, etc.) of the third portion of the exhaust gas are approximately equal. By balancing the first portion of the exhaust gas, the second portion of the exhaust gas, and the third portion of the exhaust gas, treatment of the exhaust gas is more desirable. For example, balancing the first portion of the exhaust gas, the second portion of the exhaust gas, and the third portion of the exhaust gas may decrease a backpressure of the exhaust gas aftertreatment system 100, thereby increasing an efficiency and/or output of an internal combustion engine having the exhaust gas aftertreatment system 100.

The third aftertreatment component 163 also includes a third substrate 166 (e.g., working member, etc.). The third substrate 166 is coupled to the third casing 164. For example, the third substrate 166 may be fastened to the third casing 164.

The third substrate 166 receives the third portion of the exhaust gas from the third casing 164 (e.g., from an inlet of the third casing 164, etc.) and provides the third portion of the exhaust gas to the third casing 164 (e.g., to an outlet of the third casing 164, etc.). The third substrate 166 is configured to facilitate treatment of the third portion of the exhaust gas from the distributing housing 142 (e.g., independent of the treatment of the first portion of the exhaust gas by the first substrate 154, independent of the treatment of the second portion of the exhaust gas by the second substrate 160). This treatment may facilitate reduction of emission of undesirable components in the third portion of the exhaust gas. This treatment may also or instead facilitate conversion of various oxidation components of the third portion of the exhaust gas into other components. This treatment may also or instead facilitate removal of particulates from the third portion of the exhaust gas.

In some embodiments, the third casing 164 and/or the third substrate 166 is centered on an third component axis τ. In some embodiments, the third component axis τ is approximately orthogonal to the transfer housing axis λ (e.g., when measured on a plane along which the third component axis τ and the transfer housing axis λ both extend, etc.). In some embodiments, the third component axis τ is approximately parallel to the first component axis Ω (e.g., when measured on a plane along which the third component axis τ and the first component axis Ω both extend, etc.) and/or the second component axis σ (e.g., when measured on a plane along which the third component axis τ and the second component axis σ both extend, etc.). The third portion of the exhaust gas may be provided through the third casing 164 in a direction that is approximately parallel to, or coincident with, the third component axis τ. Additionally or alternatively, the third portion of the exhaust gas may be provided through the third substrate 166 in a direction that is approximately parallel to, or coincident with, the third component axis τ.

In various embodiments, the third substrate 166 includes a conversion catalyst member (e.g., SCR conversion catalyst member, catalyst metals, etc.). In these embodiments, the treatment fluid provided by the dosing module 112 may be reductant and the third substrate 166 may be configured to cause decomposition of components of the third portion of the exhaust gas using the reductant (e.g., via catalytic reactions, etc.). Specifically, the reductant that has been provided into the third portion of the exhaust gas by the injector 120 undergoes the processes of evaporation, thermolysis, and hydrolysis to form non-$NO_x$ emissions within the third casing 164 and/or the third substrate 166. In this way, the third substrate 166 is configured to assist in the reduction of $NO_x$ emissions by accelerating a $NO_x$ reduction process between the reductant and the $NO_x$ of the third portion of the exhaust gas into diatomic nitrogen, water, and/or carbon dioxide. The conversion catalyst member included in the third substrate 166 may include, for example, platinum, rhodium, palladium, or other similar materials. In some embodiments, the conversion catalyst member included in the third substrate 166 is a ceramic conversion catalyst member.

The conversion catalyst member included in the third substrate 166 may be directional, meaning that it is desired for the exhaust gas to flow through the third substrate 166 in a single direction, or non-directional, meaning that it is desired for the exhaust gas to flow through the third substrate 166 in any direction. In applications where the conversion catalyst member included in the third substrate 166 is directional, the third casing 164 may include structures or features that facilitate (e.g., in a poka-yoke manner, etc.) fastening of the third casing 164 to the distributing housing third panel 148 in only one orientation of the third casing 164 relative to the distributing housing third panel 148.

In various embodiments, the third substrate 166 includes an oxidation catalyst member (e.g., a DOC, etc.). In these embodiments, the third substrate 166 is configured to oxidize a hydrocarbon and/or carbon monoxide in the third portion of the exhaust gas. In this way, the third substrate 166 may oxidize a hydrocarbon and/or carbon monoxide from the third portion of the exhaust gas prior to the exhaust gas being provided from the third casing 164. For example, the third substrate 166 may be an oxidation catalyst member that is configured to facilitate conversion of carbon monoxide in the third portion of the exhaust gas into carbon dioxide. In this example, the third casing 164 may receive the carbon monoxide and provide the carbon dioxide.

The oxidation catalyst member included in the third substrate 166 may be directional, meaning that it is desired for the exhaust gas to flow through the third substrate 166 in a single direction, or non-directional, meaning that it is desired for the exhaust gas to flow through the third substrate 166 in any direction. In applications where the oxidation catalyst member included in the third substrate 166 is directional, the third casing 164 may include structures or features that facilitate (e.g., in a poka-yoke manner, etc.) fastening of the third casing 164 to the distributing housing third panel 148 in only one orientation of the third casing 164 relative to the distributing housing third panel 148.

In various embodiments, the third substrate 166 includes an exhaust gas filtration member (e.g., a DPF, etc.). In these embodiments, the third substrate 166 is configured to remove particulates from the third portion of the exhaust gas prior to the third portion of the exhaust gas being provided from the third casing 164. For example, the third portion of the exhaust gas received by the third casing 164 may have a first concentration of the particulates, the third substrate 166 may remove at least some of the particulates from the third portion of the exhaust gas, and the third casing 164 may provide the third portion of the exhaust gas with a second concentration of the particulates that is less than the first concentration.

The exhaust gas filtration member included in the third substrate 166 may be directional, meaning that it is desired for the exhaust gas to flow through the third substrate 166 in a single direction, or non-directional, meaning that it is desired for the exhaust gas to flow through the third substrate 166 in any direction. In applications where the exhaust gas filtration member included in the third substrate 166 is directional, the third casing 164 may include structures or features that facilitate (e.g., in a poka-yoke manner, etc.) fastening of the third casing 164 to the distributing housing third panel 148 in only one orientation of the third casing 164 relative to the distributing housing third panel 148.

In various embodiments, the third substrate 166 includes the same type of components as the first substrate 154 and/or the second substrate 160. For example, in some embodiments, the first substrate 154 includes a conversion catalyst member, the second substrate 160 includes a conversion catalyst member, and the third substrate 166 also includes a conversion catalyst member. The conversion catalyst member included in the first substrate 154 may be the same as, or different from (e.g., complementary to, etc.) the conversion catalyst member included in the third substrate 166. The conversion catalyst member included in the second substrate 160 may be the same as, or different from (e.g., complementary to, etc.) the conversion catalyst member included in the third substrate 166. In some embodiments, the first substrate 154 includes an oxidation catalyst member, the second substrate 160 includes an oxidation catalyst member, and the third substrate 166 also includes an oxidation catalyst member. The oxidation catalyst member included in the first substrate 154 may be the same as, or different from (e.g., complementary to, etc.), the oxidation catalyst member included in the third substrate 166. The oxidation catalyst member included in the second substrate 160 may be the same as, or different from (e.g., complementary to, etc.), the oxidation catalyst member included in the third substrate 166. In some embodiments, the first substrate 154 includes an exhaust gas filtration member, the second substrate 160 includes an exhaust gas filtration member, and the third substrate 166 also includes an exhaust gas filtration member. The exhaust gas filtration member included in the first substrate 154 may be the same as, or different from (e.g., complementary to, etc.), the exhaust gas filtration member included in the third substrate 166. The exhaust gas filtration member included in the second substrate 160 may be the same as, or different from (e.g., complementary to, etc.), the exhaust gas filtration member included in the third substrate 166.

In various embodiments, the third substrate 166 includes a third substrate first portion 167 (e.g., catalyst metals, etc.). The third substrate first portion 167 may include, for example, platinum, rhodium, palladium, or other similar materials. In some embodiments, the third substrate first portion 167 is a ceramic catalyst material. In some embodiments, the third substrate first portion 167 is an extruded catalyst material. In some embodiments, the third substrate first portion 167 is a metallic catalyst material.

In these embodiments, the third substrate 166 also includes a third substrate second portion 168 (e.g., catalyst metals, etc.). The third substrate second portion 168 may include, for example, platinum, rhodium, palladium, or other similar materials. In some embodiments, the third substrate second portion 168 is a ceramic catalyst material. In some embodiments, the third substrate second portion 168 is an extruded catalyst material. In some embodiments, the third substrate second portion 168 is a metallic catalyst material.

In some of these embodiments, the third substrate second portion 168 includes different materials than the third substrate first portion 167. For example, the third substrate second portion 168 may include platinum and the third substrate first portion 167 may include rhodium or palladium. In another example, the third substrate second portion 168 may include platinum, rhodium, or palladium and the third substrate first portion 167 may include a ceramic material. By including different materials in the third substrate first portion 167 and the third substrate second portion 168, an ability of the third aftertreatment component 163 to facilitate treatment of the third portion of the exhaust gas from the distributing housing 142 may be tailored for a target application.

In some of these embodiments, the third substrate second portion 168 is separated from the third substrate first portion 167 by a third gap $G_3$ (e.g., separation, etc.). The third gap $G_3$ may provide a mechanism for the exhaust gas to redistribute after exiting the third substrate first portion 167 and prior to entering the third substrate second portion 168. By selecting the third gap $G_3$, an ability of the third aftertreatment component 163 to facilitate treatment of the third portion of the exhaust gas from the distributing housing 142 may be tailored for a target application.

In various embodiments, the housing assembly 106 includes only the first aftertreatment component 150 and does not include the second aftertreatment component 157 or the third aftertreatment component 163. In these embodiments, the distributing housing 142 does not divide the exhaust gas into multiple portions, and the distributing housing 142 does not include the distributing housing second panel 146 and the distributing housing third panel 148.

In various embodiments, the housing assembly 106 includes only the first aftertreatment component 150 and the second aftertreatment component 157, or the housing assembly 106 includes only the first aftertreatment component 150 and the third aftertreatment component 163. In these embodiments, the distributing housing 142 does not divide the exhaust gas into three portion, but rather divides the exhaust gas into only two portions, and the distributing housing 142 does not include the distributing housing second panel 146 or the distributing housing third panel 148.

The housing assembly 106 also includes a receiving housing 169 (e.g., pressure regulator, flow plenum, flow balancer, flow balancing system, etc.). The receiving housing 169 is fluidly coupled to the first aftertreatment component 150, the second aftertreatment component 157, and the third aftertreatment component 163 and is configured to receive the first portion of the exhaust gas from the first aftertreatment component 150 (e.g., after the first portion of the exhaust gas has been treated by the first substrate 154, etc.), the second portion of the exhaust gas from the second aftertreatment component 157 (e.g., after the second portion of the exhaust gas has been treated by the second substrate 160, etc.), and the third portion of the exhaust gas from the third aftertreatment component 163 (e.g., after the third portion of the exhaust gas has been treated by the third substrate 166, etc.).

The receiving housing 169 includes a receiving housing first panel 170 (e.g., platform, plate, flange, etc.). The receiving housing 169 is configured such that the receiving housing first panel 170 is separated from the transfer housing axis λ by a receiving housing first panel separation length $L_{rhfp}$ (e.g., distance, etc.). The receiving housing first panel separation length $L_{rhfp}$ is greater than the distributing housing first panel separation length $L_{dhfp}$ such that the receiving housing first panel 170 is separated from the distributing housing first panel 144 by a gap. The first aftertreatment component 150 extends within this gap between the distributing housing 142 and the receiving housing 169. In various embodiments, the receiving housing first panel separation length $L_{rhfp}$ is approximately equal to between 390 mm and 430 mm, inclusive. In some embodiments, the receiving housing first panel separation length $L_{rhfp}$ is approximately equal to 409.63 mm. In various embodiments, the receiving housing first panel separation length $L_{rhfp}$ is approximately equal to between a product of 1.20 and the distributing housing first panel separation length $L_{dhfp}$ and a product of 1.60 and the distributing housing first panel separation length $L_{dhfp}$, inclusive. In some embodiments, the receiving housing first panel separation length $L_{rhfp}$ is approximately equal to a product of 1.41 and the distributing housing first panel separation length $L_{dhfp}$.

The first casing 152 is fastened to the receiving housing first panel 170. As a result, the first casing 152 can be selectively attached to the receiving housing first panel 170 and selectively detached from the receiving housing first panel 170. This enables the first aftertreatment component 150 to be removed from the housing assembly 106 for servicing and/or replacement. For example, a user may detach the first casing 152 from the receiving housing first panel 170, remove the first aftertreatment component 150 from the housing assembly 106, insert a new first aftertreatment component 150 into the housing assembly 106, and attach the first casing 152 to the receiving housing first panel 170. In this way, a capability of the exhaust gas aftertreatment system 100 to treat the exhaust gas may be maintained or modified.

Additionally, the first casing 152 is fastened to the receiving housing first panel 170 such that a portion of the first casing 152 is positioned within the receiving housing 169 (e.g., using a gasket, using a spacer, using a seal, etc.) such that flow of the exhaust gas between the first casing 152 and the receiving housing first panel 170 is substantially prevented (e.g., less than 1% of the exhaust gas flow received by the first casing 152 flows between the first casing 152 and the receiving housing first panel 170, etc.). The receiving housing 169 is configured to facilitate flow of the first portion of the exhaust gas from the first casing 152 into the receiving housing 169.

The receiving housing 169 also includes a receiving housing second panel 172 (e.g., platform, plate, flange, etc.). The receiving housing second panel 172 is separated from, and downstream of, the receiving housing first panel 170. The receiving housing 169 is configured such that the receiving housing second panel 172 is separated from the transfer housing axis λ by a receiving housing second panel separation length $L_{rhsp}$ (e.g., distance, etc.). The receiving housing second panel separation length $L_{rhsp}$ is less than the receiving housing first panel separation length $L_{rhfp}$. The receiving housing second panel separation length $L_{rhsp}$ is greater than the distributing housing second panel separation length $L_{dhsp}$ such that the receiving housing second panel 172 is separated from the distributing housing second panel 146 by a gap. The second aftertreatment component 157 extends within this gap between the distributing housing 142 and the receiving housing 169.

In various embodiments, the receiving housing second panel separation length $L_{rhsp}$ is approximately equal to between 390 mm and 340 mm, inclusive. In some embodiments, the receiving housing second panel separation length $L_{rhsp}$ is approximately equal to 364.63 mm. In various embodiments, the receiving housing second panel separation length $L_{rhsp}$ is approximately equal to between a product of 1.01 and the distributing housing first panel separation length $L_{dhfp}$ and a product of 1.45 and the distributing housing first panel separation length $L_{dhfp}$, inclusive. In some embodiments, the receiving housing second panel separation length $L_{rhsp}$ is approximately equal to a product of 1.25 and the distributing housing first panel separation length $L_{dhfp}$.

The second casing 158 is fastened to the receiving housing second panel 172. As a result, the second casing 158 can be selectively attached to the receiving housing second panel 172 and selectively detached from the receiving housing second panel 172. This enables the second aftertreatment component 157 to be removed from the housing assembly 106 for servicing and/or replacement. For example, a user may detach the second casing 158 from the receiving housing second panel 172, remove the second aftertreatment component 157 from the housing assembly 106, insert a new second aftertreatment component 157 into the housing assembly 106, and attach the second casing 158 to the receiving housing second panel 172. In this way, a capability of the exhaust gas aftertreatment system 100 to treat the exhaust gas may be maintained or modified.

Additionally, the second casing 158 is fastened to the receiving housing second panel 172 such that a portion of the second casing 158 is positioned within the receiving housing 169 (e.g., using a gasket, using a spacer, using a seal, etc.) such that flow of the exhaust gas between the second casing 158 and the receiving housing second panel 172 is substantially prevented (e.g., less than 1% of the exhaust gas flow received by the second casing 158 flows between the second casing 158 and the receiving housing second panel 172, etc.). The receiving housing 169 is configured to facilitate flow of the second portion of the exhaust gas from the second casing 158 into the receiving housing 169.

The receiving housing 169 also includes a receiving housing third panel 174 (e.g., platform, plate, flange, etc.). The receiving housing third panel 174 is separated from, and downstream of, the receiving housing second panel 172. The receiving housing 169 is configured such that the receiving housing third panel 174 is separated from the transfer housing axis λ by a receiving housing third panel separation length $L_{rhtp}$. The receiving housing third panel separation length $L_{rhtp}$ is less than the receiving housing first panel separation length $L_{rhfp}$ and is less than the receiving housing second panel separation length $L_{rhsp}$. The receiving housing third panel separation length $L_{rhtp}$ is greater than the distributing housing third panel separation length $L_{dhtp}$ such that the receiving housing third panel 174 is separated from the distributing housing third panel 148 by a gap. The third aftertreatment component 163 extends within this gap between the distributing housing 142 and the receiving housing 169.

In various embodiments, the receiving housing third panel separation length $L_{rhtp}$ is approximately equal to between 310 mm and 360 mm, inclusive. In some embodiments, the receiving housing third panel separation length $L_{rhtp}$ is approximately equal to 339.63 mm. In various embodiments, the receiving housing third panel separation length $L_{rhtp}$ is approximately equal to between a product of 0.95 and the distributing housing first panel separation length $L_{dhfp}$ and a product of 1.40 and the distributing housing first panel separation length $L_{dhfp}$, inclusive. In some embodiments, the receiving housing third panel separation length $L_{rhtp}$ is approximately equal to a product of 1.17 and the distributing housing first panel separation length $L_{dhfp}$.

The third casing 164 is fastened to the receiving housing third panel 174. As a result, the third casing 164 can be selectively attached to the receiving housing third panel 174 and selectively detached from the receiving housing third panel 174. This enables the third aftertreatment component 163 to be removed from the housing assembly 106 for servicing and/or replacement. For example, a user may detach the third casing 164 from the receiving housing third panel 174, remove the third aftertreatment component 163 from the housing assembly 106, insert a new third aftertreatment component 163 into the housing assembly 106, and attach the third casing 164 to the receiving housing third panel 174. In this way, a capability of the exhaust gas aftertreatment system 100 to treat the exhaust gas may be maintained or modified.

Additionally, the third casing 164 is fastened to the receiving housing third panel 174 such that a portion of the third casing 164 is positioned within the receiving housing 169 (e.g., using a gasket, using a spacer, using a seal, etc.) such that flow of the exhaust gas between the third casing 164 and the receiving housing third panel 174 is substantially prevented (e.g., less than 1% of the exhaust gas flow received by the third casing 164 flows between the third casing 164 and the receiving housing third panel 174, etc.). The receiving housing 169 is configured to facilitate flow of the third portion of the exhaust gas from the third casing 164 into the receiving housing 169.

In some embodiments, the receiving housing 169 does not include the receiving housing second panel 172. In these embodiments, the receiving housing 169 only includes the receiving housing first panel 170 and the receiving housing third panel 174.

In some embodiments, the receiving housing 169 does not include the receiving housing third panel 174. In these embodiments, the receiving housing 169 only includes the receiving housing first panel 170 and the receiving housing second panel 172.

In other embodiments, the receiving housing 169 only includes the receiving housing first panel 170 and does not include the receiving housing second panel 172 or the receiving housing third panel 174.

The housing assembly 106 also includes an outlet housing 176 (e.g., collection housing, etc.). The outlet housing 176 is fluidly coupled to the receiving housing 169 and is configured to receive the exhaust gas from the receiving housing 169. In various embodiments, the outlet housing 176 is coupled to the receiving housing 169. For example, the outlet housing 176 may be fastened, welded, riveted, or otherwise attached to the receiving housing 169. In other embodiments, the outlet housing 176 is integrally formed with the receiving housing 169.

In various embodiments, such as is shown in FIG. 1, an outlet housing axis μ extends along an uppermost point (e.g., relative to a direction of gravity, etc.) of the outlet housing 176. In this way, the outlet housing axis μ provides a reference point for configuring dimensions of various components of the housing assembly 106. The exhaust gas may be provided (e.g., outputted, etc.) through the outlet housing 176 in a direction that is parallel to, or coincident with, the outlet housing axis μ.

The exhaust gas conduit system 102 also includes an outlet exhaust gas conduit 178 (e.g., line, pipe, etc.). The outlet exhaust gas conduit 178 is fluidly coupled to the outlet housing 176 and is configured to receive the exhaust gas from the outlet housing 176. In some embodiments, the outlet exhaust gas conduit 178 is coupled to the outlet housing 176. In other embodiments, the outlet exhaust gas conduit 178 is integrally formed with the outlet housing 176. The outlet exhaust gas conduit 178 is configured to provide the exhaust gas out of the exhaust gas aftertreatment system 100 (e.g., to atmosphere, etc.).

In various embodiments, the exhaust gas aftertreatment system 100 also includes a transfer housing sensor 180 (e.g., sensing unit, detector, flow rate sensor, mass flow rate sensor, volumetric flow rate sensor, velocity sensor, pressure sensor, temperature sensor, thermocouple, hydrocarbon sensor, $NO_x$ sensor, CO sensor, $CO_2$ sensor, $O_2$ sensor, particulate sensor, nitrogen sensor, etc.). The transfer housing sensor 180 is coupled to the transfer housing 140 and is configured to measure (e.g., sense, detect, etc.) a parameter (e.g., flow rate, mass flow rate, volumetric flow rate, velocity, pressure, temperature, hydrocarbon concentration, $NO_x$ concentration, CO concentration, $CO_2$ concentration, $O_2$ concentration, particulate concentration, nitrogen concentration, etc.) of the exhaust gas within the transfer housing 140. The transfer housing sensor 180 is electrically or communicatively coupled to the controller 128 and is configured to provide a signal associated with the parameter to the controller 128. The controller 128 (e.g., via the processing circuit 130, etc.) is configured to determine the parameter based on the signal. The controller 128 may be configured to control the dosing module 112, the treatment fluid pump 116, and/or the air pump 122 based on the signal. Furthermore, the controller 128 may be configured to communicate the signal to the central controller 136.

In various embodiments, the exhaust gas aftertreatment system 100 also includes an outlet housing sensor 182 (e.g., sensing unit, detector, flow rate sensor, mass flow rate sensor, volumetric flow rate sensor, velocity sensor, pressure sensor, temperature sensor, thermocouple, hydrocarbon sensor, $NO_x$ sensor, CO sensor, $CO_2$ sensor, $O_2$ sensor, particulate sensor, nitrogen sensor, etc.). The outlet housing sensor 182 is coupled to the outlet housing 176 and is configured to measure a parameter of the exhaust gas within the outlet housing 176. The outlet housing sensor 182 is electrically or communicatively coupled to the controller 128 and is configured to provide a signal associated with the parameter to the controller 128. The controller 128 (e.g., via the processing circuit 130, etc.) is configured to determine the parameter based on the signal. The controller 128 may be configured to control the dosing module 112, the treatment fluid pump 116, and/or the air pump 122 based on the signal. Furthermore, the controller 128 may be configured to communicate the signal to the central controller 136.

In various embodiments, the housing assembly 106 also includes an exhaust gas sampling assembly 184 (e.g., sampler, body, chamber, etc.). At least a portion of the exhaust gas sampling assembly 184 is positioned within the outlet housing 176. The exhaust gas sampling assembly 184 is configured to receive a portion of the exhaust gas from within the outlet housing 176 and facilitate measuring of a parameter of the exhaust gas within the outlet housing 176. In these embodiments, the exhaust gas aftertreatment system 100 also includes a sampling assembly sensor 186 (e.g., sensing unit, detector, flow rate sensor, mass flow rate sensor, volumetric flow rate sensor, velocity sensor, pressure sensor, temperature sensor, thermocouple, hydrocarbon sensor, $NO_x$ sensor, CO sensor, $CO_2$ sensor, $O_2$ sensor, particulate sensor, nitrogen sensor, etc.). The sampling assembly sensor 186 is coupled to the exhaust gas sampling assembly 184 and is configured to measure a parameter of the exhaust gas within the exhaust gas sampling assembly 184. The sampling assembly sensor 186 is electrically or communicatively coupled to the controller 128 and is configured to provide a signal associated with the parameter to the controller 128. The controller 128 (e.g., via the processing circuit 130, etc.) is configured to determine the parameter based on the signal. The controller 128 may be configured to control the dosing module 112, the treatment fluid pump 116, and/or the air pump 122 based on the signal. Furthermore, the controller 128 may be configured to communicate the signal to the central controller 136.

While the exhaust gas aftertreatment system 100 has been shown and described in the context of use with a diesel internal combustion engine, it is understood that the exhaust gas aftertreatment system 100 may be used with other internal combustion engines, such as gasoline internal combustion engines, hybrid internal combustion engines, propane internal combustion engines, dual-fuel internal combustion engines, and other similar internal combustion engines.

III. Overview of Example Housing Assemblies

FIGS. 2-16 illustrate the housing assembly 106 according to various embodiments. The housing assembly 106 includes a transfer housing support flange 200 (e.g., ring, rib, body, member, etc.). A portion of the transfer housing support flange 200 is positioned within the transfer housing 140 and a portion of the transfer housing support flange 200 is positioned within the distributing housing 142. The transfer housing support flange 200 interfaces with the transfer housing 140 and the distributing housing 142 to support the distributing housing 142 on the transfer housing 140. In various embodiments, the transfer housing support flange 200 interfaces with the distributing housing second panel 146.

The transfer housing support flange 200 is disposed along a plane that extends between the first aftertreatment component 150 and the second aftertreatment component 157. As a result, the transfer housing support flange 200 is separated from and does not interface with the first aftertreatment component 150 or the second aftertreatment component 157. In this way, the transfer housing support flange 200 does not interfere with installation of the first aftertreatment component 150 or the second aftertreatment component 157 in the distributing housing 142 and the transfer housing 140, and the transfer housing support flange 200 does not interfere with removal of the first aftertreatment component 150 or the second aftertreatment component 157 from the distributing housing 142 and the transfer housing 140.

The transfer housing support flange 200 facilitates flow of the exhaust gas through the transfer housing 140 to the second aftertreatment component 157 and the third aftertreatment component 163. Rather than including a plurality of relatively small apertures through which the exhaust gas must pass to flow to the second aftertreatment component 157 and the third aftertreatment component 163, the transfer housing support flange 200 is substantially arcuate in shape and does not substantially impede flow of the exhaust gas through the transfer housing 140.

The housing assembly 106 also includes a perforated flange 202 (e.g., ring, rib, body, member, etc.). A portion of the perforated flange 202 is positioned within the transfer housing 140 and a portion of the perforated flange 202 is positioned within the distributing housing 142. The perforated flange 202 interfaces with the transfer housing 140 and the distributing housing 142 to support the distributing housing 142 on the transfer housing 140 and to limit (e.g., restrict, etc.) flow of the exhaust gas through the transfer housing 140. In various embodiments, the perforated flange 202 interfaces with the distributing housing second panel 146.

The perforated flange 202 is disposed along a plane that extends between the second aftertreatment component 157 and the third aftertreatment component 163. As a result, the perforated flange 202 is separated from and does not interface with the second aftertreatment component 157 or the third aftertreatment component 163. In this way, the perforated flange 202 does not interfere with installation of the second aftertreatment component 157 or the third aftertreatment component 163 in the distributing housing 142 and the transfer housing 140, and the perforated flange 202 does not interfere with removal of the second aftertreatment component 157 or the third aftertreatment component 163 from the distributing housing 142 and the transfer housing 140.

The perforated flange 202 includes a plurality of perforated flange apertures 204 (e.g., openings, windows, holes, etc.). Each of the perforated flange apertures 204 is configured to facilitate flow of the exhaust gas through the perforated flange 202. The perforated flange 202 is configured such that exhaust gas that does not flow through the perforated flange apertures 204 does not flow into the third aftertreatment component 163. An arrangement, a number, and a size of the perforated flange apertures 204 are selected such that a target amount of the exhaust gas flows into the third aftertreatment component 163. In this way, the third portion of the exhaust gas (e.g., that flows into the third aftertreatment component 163, etc.) may be balanced with the second portion of the exhaust gas (e.g., that flows into the second aftertreatment component 157, etc.) and the first portion of the exhaust gas (e.g., that flows into the first aftertreatment component 150, etc.).

In some embodiments, the transfer housing support flange 200 includes a plurality of apertures, similar to how the perforated flange 202 includes the perforated flange apertures 204. Each of the apertures in the transfer housing support flange 200 is configured to facilitate flow of the exhaust gas through the transfer housing support flange 200. The transfer housing support flange 200 is configured such that exhaust gas that does not flow through the apertures does not flow into the second aftertreatment component 157 or the third aftertreatment component 163. An arrangement, a number, and a size of the apertures are selected such that a target amount of the exhaust gas flows into the second aftertreatment component 157 and the third aftertreatment component 163. In this way, the second portion of the exhaust gas (e.g., that flows into the second aftertreatment component 157, etc.) and the third portion of the exhaust gas (e.g., that flows into the third aftertreatment component 163, etc.) may be balanced with the first portion of the exhaust gas (e.g., that flows into the first aftertreatment component 150, etc.). These embodiments may be implemented where, for example, the housing assembly 106 does not include the third aftertreatment component 163 and instead only includes the first aftertreatment component 150 and the second aftertreatment component 157.

The distributing housing 142 also includes a distributing housing first panel opening 206 (e.g., window, hole, etc.) extending through the distributing housing first panel 144. The distributing housing first panel opening 206 is configured to receive the first casing 152 such that the first aftertreatment component 150 may be positioned in the distributing housing 142 and the transfer housing 140. In some embodiments, the distributing housing first panel opening 206 is circular and has a first diameter and the first casing 152 is cylindrical and has a second diameter that is approximately equal to the first diameter.

The distributing housing 142 also includes a plurality of distributing housing first panel apertures 208 (e.g., apertures, openings, holes, etc.) extending through the distributing housing first panel 144. The distributing housing first panel apertures 208 are disposed at least partially around the distributing housing first panel opening 206. Each of the distributing housing first panel apertures 208 is configured to receive a distributing housing first panel fastener 210 (e.g., bolts, screws, threaded fasteners, etc.). As is explained in more detail herein, the distributing housing first panel fasteners 210 are configured to facilitate attachment of the first aftertreatment component 150 to the distributing housing first panel 144 and detachment of the first aftertreatment component 150 from the distributing housing first panel 144. In some embodiments, the distributing housing first panel apertures 208 are threaded and are configured to be threadably engaged with one of the distributing housing first panel fasteners 210.

In various embodiments, the distributing housing 142 also includes a plurality of distributing housing first panel bosses 212 (e.g., lugs, etc.) extending from the distributing housing first panel 144. Each of the distributing housing first panel bosses 212 is aligned with, and extends at least partially around, one of the distributing housing first panel apertures 208. In some embodiments, the distributing housing first panel bosses 212 are threaded and are configured to be threadably engaged with one of the distributing housing first panel fasteners 210.

The first aftertreatment component 150 also includes a first aftertreatment component first flange 214 (e.g., ring, etc.). The first aftertreatment component first flange 214 is configured to facilitate attachment of the first aftertreatment component 150 to the distributing housing first panel 144 and detachment of the first aftertreatment component 150 from the distributing housing first panel 144. In some embodiments, the first aftertreatment component first flange 214 is coupled to the first casing 152. In other embodiments, first aftertreatment component first flange 214 is integrally formed with the first casing 152.

The first aftertreatment component first flange 214 also includes a plurality of first aftertreatment component first flange apertures 216 (e.g., apertures, openings, holes, etc.). The first aftertreatment component first flange apertures 216 are disposed at least partially around the first casing 152. Each of the first aftertreatment component first flange apertures 216 is configured to receive one of the distributing housing first panel fasteners 210 and to be aligned with one of the distributing housing first panel apertures 208. In some embodiments, the first aftertreatment component first flange apertures 216 are threaded and are configured to be threadably engaged with one of the distributing housing first panel fasteners 210.

The first aftertreatment component 150 is attached to the distributing housing first panel 144 by first inserting the first casing 152 into the distributing housing first panel opening 206. The first aftertreatment component first flange 214 is then rotated (e.g., by grasping and rotating the first casing 152, etc.) such that the first aftertreatment component first flange apertures 216 are each aligned with one of the distributing housing first panel apertures 208. Then the distributing housing first panel fasteners 210 are each inserted into one of the first aftertreatment component first flange apertures 216 and one of the distributing housing first panel apertures 208 and are threadably engaged with at least one of the first aftertreatment component first flange aperture 216, the distributing housing first panel aperture 208, and/or the distributing housing first panel boss 212. The first aftertreatment component 150 may be detached from the distributing housing first panel 144 by reversing this process.

The housing assembly 106 also includes a first aftertreatment component first gasket (e.g., seal, etc.). The first aftertreatment component first gasket is configured to be disposed between the first aftertreatment component first flange 214 and the distributing housing first panel 144 and to establish a seal between the first aftertreatment component first flange 214 and the distributing housing first panel 144. As a result, flow of the exhaust gas between the first aftertreatment component first flange 214 and the distributing housing first panel 144 is substantially prevented (e.g., less than 1% of the exhaust gas flowing within the distributing housing 142 flows between the first aftertreatment component first flange 214 and the distributing housing first panel 144, etc.). In some embodiments, the first aftertreatment component first gasket is configured to establish the seal at temperatures of up to 550 degrees Celsius (° C.). The first aftertreatment component first gasket may be creep resistant so that joint preload does not substantially decrease over prolonged attachment of the first aftertreatment component first flange 214 and the distributing housing first panel 144. The first aftertreatment component first gasket may provide a stiff load path for transferring load across the first aftertreatment component first flange 214 and the distributing housing first panel 144 without decreasing a natural frequency of the housing assembly 106 (e.g., based on elastic modulus near the first aftertreatment component first flange 214 and the distributing housing first panel 144, based on a material of the distributing housing first panel fasteners 210, etc.). The first aftertreatment component first gasket may have a linear coefficient of thermal expansion that is approximately equal to a linear coefficient of thermal expansion of the distributing housing first panel fasteners 210 (e.g., to maintain integrity of the seal across operating and storage temperature ranges, etc.).

In various embodiments, the first aftertreatment component first gasket is a layered metal gasket. In some embodiments, the first aftertreatment component first gasket has an elastic modulus that is approximately equal to 193,000 megapascals (MPa). In some embodiments, the first aftertreatment component first gasket has a coefficient of thermal expansion of 18.40 micrometers per meter per degree Kelvin (μm/m/° K).

In various embodiments, the first aftertreatment component first gasket includes a plurality of first aftertreatment component first gasket apertures (e.g., apertures, openings, holes, etc.). The first aftertreatment component first gasket apertures are configured to be disposed at least partially around the first casing 152. Each of the first aftertreatment component first gasket apertures is configured to receive one of the distributing housing first panel fasteners 210 and to be aligned with one of the distributing housing first panel apertures 208 and one of the first aftertreatment component first flange apertures 216. In some embodiments, the first aftertreatment component first gasket apertures are threaded and are configured to be threadably engaged with one of the distributing housing first panel fasteners 210.

The receiving housing 169 also includes a receiving housing first panel opening 218 (e.g., window, hole, etc.) extending through the receiving housing first panel 170. The receiving housing first panel opening 218 is configured to receive the first casing 152 such that the first aftertreatment component 150 may be positioned in the receiving housing 169 and the outlet housing 176. In some embodiments, the receiving housing first panel opening 218 is circular and has a first diameter and the first casing 152 is cylindrical and has a second diameter that is approximately equal to the first diameter.

The receiving housing 169 also includes a plurality of receiving housing first panel apertures 220 (e.g., apertures, openings, holes, etc.) extending through the receiving housing first panel 170. The receiving housing first panel apertures 220 are disposed at least partially around the receiving housing first panel opening 218. Each of the receiving housing first panel apertures 220 is configured to receive a receiving housing first panel fastener 222 (e.g., bolts, screws, threaded fasteners, etc.). As is explained in more detail herein, the receiving housing first panel fasteners 222 are configured to facilitate attachment of the first aftertreatment component 150 to the receiving housing first panel 170 and detachment of the first aftertreatment component 150 from the receiving housing first panel 170. In some embodiments, the receiving housing first panel apertures 220 are threaded and are configured to be threadably engaged with one of the receiving housing first panel fasteners 222.

In various embodiments, the receiving housing 169 also includes a plurality of receiving housing first panel bosses 224 (e.g., lugs, etc.) extending from the receiving housing first panel 170. Each of the receiving housing first panel bosses 224 is aligned with, and extends at least partially around, one of the receiving housing first panel apertures 220. In some embodiments, the receiving housing first panel bosses 224 are threaded and are configured to be threadably engaged with one of the receiving housing first panel fasteners 222.

The first aftertreatment component 150 also includes a first aftertreatment component second flange 226 (e.g., ring, etc.). The first aftertreatment component second flange 226 is configured to facilitate attachment of the first aftertreatment component 150 to the receiving housing first panel 170 and detachment of the first aftertreatment component 150 from the receiving housing first panel 170. In some embodiments, the first aftertreatment component second flange 226 is coupled to the first casing 152. In other embodiments, first aftertreatment component second flange 226 is integrally formed with the first casing 152.

The first aftertreatment component second flange 226 also includes a plurality of first aftertreatment component second flange apertures 228 (e.g., apertures, openings, holes, etc.). The first aftertreatment component second flange apertures 228 are disposed at least partially around the first casing 152. Each of the first aftertreatment component second flange apertures 228 is configured to receive one of the receiving housing first panel fasteners 222 and to be aligned with one of the receiving housing first panel apertures 220. In some embodiments, the first aftertreatment component second flange apertures 228 are threaded and are configured to be threadably engaged with one of the receiving housing first panel fasteners 222.

The first aftertreatment component 150 is attached to the receiving housing first panel 170 by first inserting the first casing 152 into the receiving housing first panel opening 218. The first aftertreatment component second flange 226 is then rotated (e.g., by grasping and rotating the first casing 152, etc.) such that the first aftertreatment component second flange apertures 228 are each aligned with one of the receiving housing first panel apertures 220. Then the receiving housing first panel fasteners 222 are each inserted into one of the first aftertreatment component second flange apertures 228 and one of the receiving housing first panel apertures 220 and are threadably engaged with at least one of the first aftertreatment component second flange aperture 228, the receiving housing first panel aperture 220, and/or the receiving housing first panel boss 224. The first aftertreatment component 150 may be detached from the receiving housing first panel 170 by reversing this process.

The first aftertreatment component 150 is configured such that the first aftertreatment component second flange 226 is separated from the first aftertreatment component first flange 214 by a gap. This gap facilitates interaction with the distributing housing first panel fasteners 210 and the receiving housing first panel fasteners 222 using a tool (e.g., wrench, socket, etc.).

Figure 16:
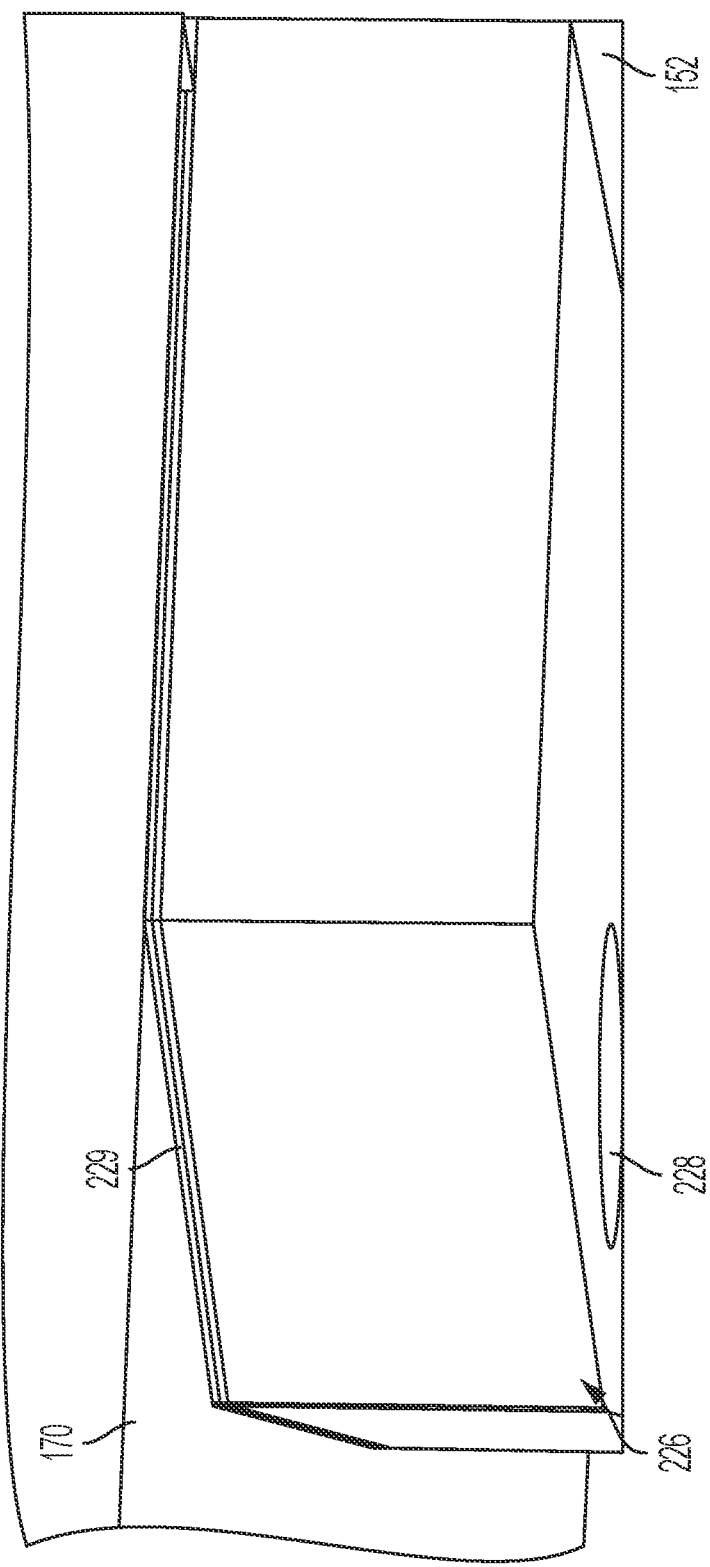
FIG. 16 is a detailed view of Detail A in FIG. 6.

The housing assembly 106 also includes a first aftertreatment component second gasket 229 (e.g., seal, etc.). As shown in FIG. 16, the first aftertreatment component second gasket 229 is configured to be disposed between the first aftertreatment component second flange 226 and the receiving housing first panel 170 and to establish a seal between the first aftertreatment component second flange 226 and the receiving housing first panel 170. As a result, flow of the exhaust gas between the first aftertreatment component second flange 226 and the receiving housing first panel 170 is substantially prevented (e.g., less than 1% of the exhaust gas flowing within the receiving housing 169 flows between the first aftertreatment component second flange 226 and the receiving housing first panel 170, etc.). In some embodiments, the first aftertreatment component second gasket 229 is configured to establish the seal at temperatures of up to 550° C. The first aftertreatment component second gasket 229 may be creep resistant so that joint preload does not substantially decrease over prolonged attachment of the first aftertreatment component second flange 226 and the receiving housing first panel 170. The first aftertreatment component second gasket 229 may provide a stiff load path for transferring load across the first aftertreatment component second flange 226 and the receiving housing first panel 170 without decreasing a natural frequency of the housing assembly 106 (e.g., based on elastic modulus near the first aftertreatment component second flange 226 and the receiving housing first panel 170, based on a material of the receiving housing first panel fasteners 222, etc.). The first aftertreatment component second gasket 229 may have a linear coefficient of thermal expansion that is approximately equal to a linear coefficient of thermal expansion of the receiving housing first panel fasteners 222 (e.g., to maintain integrity of the seal across operating and storage temperature ranges, etc.).

In various embodiments, the first aftertreatment component second gasket 229 is a layered metal gasket. In some embodiments, the first aftertreatment component second gasket 229 has an elastic modulus that is approximately equal to 193,000 MPa. In some embodiments, the first aftertreatment component second gasket 229 has a coefficient of thermal expansion of 18.40 μm/m/° K.

In various embodiments, the first aftertreatment component second gasket 229 includes a plurality of first aftertreatment component second gasket apertures (e.g., apertures, openings, holes, etc.). The first aftertreatment component second gasket apertures are configured to be disposed at least partially around the first casing 152. Each of the first aftertreatment component second gasket apertures is configured to receive one of the receiving housing first panel fasteners 222 and to be aligned with one of the receiving housing first panel apertures 220 and one of the first aftertreatment component second flange apertures 228. In some embodiments, the first aftertreatment component second gasket apertures are threaded and are configured to be threadably engaged with one of the receiving housing first panel fasteners 222.

In some embodiments, such as where the first substrate 154 is directional, the first aftertreatment component first flange 214 is configured to only be coupled to the distributing housing first panel 144 (e.g., and is configured to not be coupled to the receiving housing first panel 170, etc.) and the first aftertreatment component second flange 226 is configured to only be coupled to the receiving housing first panel 170 (e.g., and is configured to not be coupled to the distributing housing first panel 144, etc.). In this way, the first aftertreatment component 150 is configured in a poka-yoke manner to facilitate repeated and consistent installation of the first aftertreatment component 150 according to the directionality of the first substrate 154.

The distributing housing 142 also includes a distributing housing second panel opening 230 (e.g., window, hole, etc.) extending through the distributing housing second panel 146. The distributing housing second panel opening 230 is configured to receive the second casing 158 such that the second aftertreatment component 157 may be positioned in the distributing housing 142 and the transfer housing 140. In some embodiments, the distributing housing second panel opening 230 is circular and has a first diameter and the second casing 158 is cylindrical and has a second diameter that is approximately equal to the first diameter.

The distributing housing 142 also includes a plurality of distributing housing second panel apertures 232 (e.g., apertures, openings, holes, etc.) extending through the distributing housing second panel 146. The distributing housing second panel apertures 232 are disposed at least partially around the distributing housing second panel opening 230. Each of the distributing housing second panel apertures 232 is configured to receive a distributing housing second panel fastener 234 (e.g., bolts, screws, threaded fasteners, etc.). As is explained in more detail herein, the distributing housing second panel fasteners 234 are configured to facilitate attachment of the second aftertreatment component 157 to the distributing housing second panel 146 and detachment of the second aftertreatment component 157 from the distributing housing second panel 146. In some embodiments, the distributing housing second panel apertures 232 are threaded and are configured to be threadably engaged with one of the distributing housing second panel fasteners 234.

In various embodiments, the distributing housing 142 also includes a plurality of distributing housing second panel bosses 236 (e.g., lugs, etc.) extending from the distributing housing second panel 146. Each of the distributing housing second panel bosses 236 is aligned with, and extends at least partially around, one of the distributing housing second panel apertures 232. In some embodiments, the distributing housing second panel bosses 236 are threaded and are configured to be threadably engaged with one of the distributing housing second panel fasteners 234.

The second aftertreatment component 157 also includes a second aftertreatment component first flange 238 (e.g., ring, etc.). The second aftertreatment component first flange 238 is configured to facilitate attachment of the second aftertreatment component 157 to the distributing housing second panel 146 and detachment of the second aftertreatment component 157 from the distributing housing second panel 146. In some embodiments, the second aftertreatment component first flange 238 is coupled to the second casing 158. In other embodiments, second aftertreatment component first flange 238 is integrally formed with the second casing 158.

The second aftertreatment component first flange 238 also includes a plurality of second aftertreatment component first flange apertures 240 (e.g., apertures, openings, holes, etc.). The second aftertreatment component first flange apertures 240 are disposed at least partially around the second casing 158. Each of the second aftertreatment component first flange apertures 240 is configured to receive one of the distributing housing second panel fasteners 234 and to be aligned with one of the distributing housing second panel apertures 232. In some embodiments, the second aftertreatment component first flange apertures 240 are threaded and are configured to be threadably engaged with one of the distributing housing second panel fasteners 234.

The second aftertreatment component 157 is attached to the distributing housing second panel 146 by first inserting the second casing 158 into the distributing housing second panel opening 230. The second aftertreatment component first flange 238 is then rotated (e.g., by grasping and rotating the second casing 158, etc.) such that the second aftertreatment component first flange apertures 240 are each aligned with one of the distributing housing second panel apertures 232. Then the distributing housing second panel fasteners 234 are each inserted into one of the second aftertreatment component first flange apertures 240 and one of the distributing housing second panel apertures 232 and are threadably engaged with at least one of the second aftertreatment component first flange aperture 240, the distributing housing second panel aperture 232, and/or the distributing housing second panel boss 236. The second aftertreatment component 157 may be detached from the distributing housing second panel 146 by reversing this process.

The housing assembly 106 also includes a second aftertreatment component first gasket (e.g., seal, etc.). The second aftertreatment component first gasket is configured to be disposed between the second aftertreatment component first flange 238 and the distributing housing second panel 146 and to establish a seal between the second aftertreatment component first flange 238 and the distributing housing second panel 146. As a result, flow of the exhaust gas between the second aftertreatment component first flange 238 and the distributing housing second panel 146 is substantially prevented (e.g., less than 1% of the exhaust gas flowing within the distributing housing 142 flows between the second aftertreatment component first flange 238 and the distributing housing second panel 146, etc.). In some embodiments, the second aftertreatment component first gasket is configured to establish the seal at temperatures of up to 550° C. The second aftertreatment component first gasket may be creep resistant so that joint preload does not substantially decrease over prolonged attachment of the second aftertreatment component first flange 238 and the distributing housing second panel 146. The second aftertreatment component first gasket may provide a stiff load path for transferring load across the second aftertreatment component first flange 238 and the distributing housing second panel 146 without decreasing a natural frequency of the housing assembly 106 (e.g., based on elastic modulus near the second aftertreatment component first flange 238 and the distributing housing second panel 146, based on a material of the distributing housing second panel fasteners 234, etc.). The second aftertreatment component first gasket may have a linear coefficient of thermal expansion that is approximately equal to a linear coefficient of thermal expansion of the distributing housing second panel fasteners 234 (e.g., to maintain integrity of the seal across operating and storage temperature ranges, etc.).

In various embodiments, the second aftertreatment component first gasket is a layered metal gasket. In some embodiments, the second aftertreatment component first gasket has an elastic modulus that is approximately equal to 193,000 MPa. In some embodiments, the second aftertreatment component first gasket has a coefficient of thermal expansion of 18.40 μm/m/° K.

In various embodiments, the second aftertreatment component first gasket includes a plurality of second aftertreatment component first gasket apertures (e.g., apertures, openings, holes, etc.). The second aftertreatment component first gasket apertures are configured to be disposed at least partially around the second casing 158. Each of the second aftertreatment component first gasket apertures is configured to receive one of the distributing housing second panel fasteners 234 and to be aligned with one of the distributing housing second panel apertures 232 and one of the second aftertreatment component first flange apertures 240. In some embodiments, the second aftertreatment component first gasket apertures are threaded and are configured to be threadably engaged with one of the distributing housing second panel fasteners 234.

The receiving housing 169 also includes a receiving housing second panel opening 242 (e.g., window, hole, etc.) extending through the receiving housing second panel 172. The receiving housing second panel opening 242 is configured to receive the second casing 158 such that the second aftertreatment component 157 may be positioned in the receiving housing 169 and the outlet housing 176. In some embodiments, the receiving housing second panel opening 242 is circular and has a first diameter and the second casing 158 is cylindrical and has a second diameter that is approximately equal to the first diameter.

The receiving housing 169 also includes a plurality of receiving housing second panel apertures 244 (e.g., apertures, openings, holes, etc.) extending through the receiving housing second panel 172. The receiving housing second panel apertures 244 are disposed at least partially around the receiving housing second panel opening 242. Each of the receiving housing second panel apertures 244 is configured to receive a receiving housing second panel fastener 246 (e.g., bolts, screws, threaded fasteners, etc.). As is explained in more detail herein, the receiving housing second panel fasteners 246 are configured to facilitate attachment of the second aftertreatment component 157 to the receiving housing second panel 172 and detachment of the second aftertreatment component 157 from the receiving housing second panel 172. In some embodiments, the receiving housing second panel apertures 244 are threaded and are configured to be threadably engaged with one of the receiving housing second panel fasteners 246.

In various embodiments, the receiving housing 169 also includes a plurality of receiving housing second panel bosses 248 (e.g., lugs, etc.) extending from the receiving housing second panel 172. Each of the receiving housing second panel bosses 248 is aligned with, and extends at least partially around, one of the receiving housing second panel apertures 244. In some embodiments, the receiving housing second panel bosses 248 are threaded and are configured to be threadably engaged with one of the receiving housing second panel fasteners 246.

The second aftertreatment component 157 also includes a second aftertreatment component second flange 250 (e.g., ring, etc.). The second aftertreatment component second flange 250 is configured to facilitate attachment of the second aftertreatment component 157 to the receiving housing second panel 172 and detachment of the second aftertreatment component 157 from the receiving housing second panel 172. In some embodiments, the second aftertreatment component second flange 250 is coupled to the second casing 158. In other embodiments, second aftertreatment component second flange 250 is integrally formed with the second casing 158.

The second aftertreatment component second flange 250 also includes a plurality of second aftertreatment component second flange apertures 252 (e.g., apertures, openings, holes, etc.). The second aftertreatment component second flange apertures 252 are disposed at least partially around the second casing 158. Each of the second aftertreatment component second flange apertures 252 is configured to receive one of the receiving housing second panel fasteners 246 and to be aligned with one of the receiving housing second panel apertures 244. In some embodiments, the second aftertreatment component second flange apertures 252 are threaded and are configured to be threadably engaged with one of the receiving housing second panel fasteners 246.

The second aftertreatment component 157 is attached to the receiving housing second panel 172 by first inserting the second casing 158 into the receiving housing second panel opening 242. The second aftertreatment component second flange 250 is then rotated (e.g., by grasping and rotating the second casing 158, etc.) such that the second aftertreatment component second flange apertures 252 are each aligned with one of the receiving housing second panel apertures 244. Then the receiving housing second panel fasteners 246 are each inserted into one of the second aftertreatment component second flange apertures 252 and one of the receiving housing second panel apertures 244 and are threadably engaged with at least one of the second aftertreatment component second flange aperture 252, the receiving housing second panel aperture 244, and/or the receiving housing second panel boss 248. The second aftertreatment component 157 may be detached from the receiving housing second panel 172 by reversing this process.

The second aftertreatment component 157 is configured such that the second aftertreatment component second flange 250 is separated from the second aftertreatment component first flange 238 by a gap. This gap facilitates interaction with the distributing housing second panel fasteners 234 and the receiving housing second panel fasteners 246 using a tool.

The housing assembly 106 also includes a second aftertreatment component second gasket (e.g., seal, etc.). The second aftertreatment component second gasket is configured to be disposed between the second aftertreatment component second flange 250 and the receiving housing second panel 172 and to establish a seal between the second aftertreatment component second flange 250 and the receiving housing second panel 172. As a result, flow of the exhaust gas between the second aftertreatment component second flange 250 and the receiving housing second panel 172 is substantially prevented (e.g., less than 1% of the exhaust gas flowing within the receiving housing 169 flows between the second aftertreatment component second flange 250 and the receiving housing second panel 172, etc.). In some embodiments, the second aftertreatment component second gasket is configured to establish the seal at temperatures of up to 550° C. The second aftertreatment component second gasket may be creep resistant so that joint preload does not substantially decrease over prolonged attachment of the second aftertreatment component second flange 250 and the receiving housing second panel 172. The second aftertreatment component second gasket may provide a stiff load path for transferring load across the second aftertreatment component second flange 250 and the receiving housing second panel 172 without decreasing a natural frequency of the housing assembly 106 (e.g., based on elastic modulus near the second aftertreatment component second flange 250 and the receiving housing second panel 172, based on a material of the receiving housing second panel fasteners 246, etc.). The second aftertreatment component second gasket may have a linear coefficient of thermal expansion that is approximately equal to a linear coefficient of thermal expansion of the receiving housing second panel fasteners 246 (e.g., to maintain integrity of the seal across operating and storage temperature ranges, etc.).

In various embodiments, the second aftertreatment component second gasket is a layered metal gasket. In some embodiments, the second aftertreatment component second gasket has an elastic modulus that is approximately equal to 193,000 MPa. In some embodiments, the second aftertreatment component second gasket has a coefficient of thermal expansion of 18.40 μm/m/° K.

In various embodiments, the second aftertreatment component second gasket includes a plurality of second aftertreatment component second gasket apertures (e.g., apertures, openings, holes, etc.). The second aftertreatment component second gasket apertures are configured to be disposed at least partially around the second casing 158. Each of the second aftertreatment component second gasket apertures is configured to receive one of the receiving housing second panel fasteners 246 and to be aligned with one of the receiving housing second panel apertures 244 and one of the second aftertreatment component second flange apertures 252. In some embodiments, the second aftertreatment component second gasket apertures are threaded and are configured to be threadably engaged with one of the receiving housing second panel fasteners 246.

In some embodiments, such as where the second substrate 160 is directional, the second aftertreatment component first flange 238 is configured to only be coupled to the distributing housing second panel 146 (e.g., and is configured to not be coupled to the receiving housing second panel 172, etc.) and the second aftertreatment component second flange 250 is configured to only be coupled to the receiving housing second panel 172 (e.g., and is configured to not be coupled to the distributing housing second panel 146, etc.). In this way, the second aftertreatment component 157 is configured in a poka-yoke manner to facilitate repeated and consistent installation of the second aftertreatment component 157 according to the directionality of the second substrate 160.

The distributing housing 142 also includes a distributing housing third panel opening 260 (e.g., window, hole, etc.) extending through the distributing housing third panel 148. The distributing housing third panel opening 260 is configured to receive the third casing 164 such that the third aftertreatment component 163 may be positioned in the distributing housing 142 and the transfer housing 140. In some embodiments, the distributing housing third panel opening 260 is circular and has a first diameter and the third casing 164 is cylindrical and has a second diameter that is approximately equal to the first diameter.

The distributing housing 142 also includes a plurality of distributing housing third panel apertures 262 (e.g., apertures, openings, holes, etc.) extending through the distributing housing third panel 148. The distributing housing third panel apertures 262 are disposed at least partially around the distributing housing third panel opening 260. Each of the distributing housing third panel apertures 262 is configured to receive a distributing housing third panel fastener 264 (e.g., bolts, screws, threaded fasteners, etc.). As is explained in more detail herein, the distributing housing third panel fasteners 264 are configured to facilitate attachment of the third aftertreatment component 163 to the distributing housing third panel 148 and detachment of the third aftertreatment component 163 from the distributing housing third panel 148. In some embodiments, the distributing housing third panel apertures 262 are threaded and are configured to be threadably engaged with one of the distributing housing third panel fasteners 264.

In various embodiments, the distributing housing 142 also includes a plurality of distributing housing third panel bosses 266 (e.g., lugs, etc.) extending from the distributing housing third panel 148. Each of the distributing housing third panel bosses 266 is aligned with, and extends at least partially around, one of the distributing housing third panel apertures 262. In some embodiments, the distributing housing third panel bosses 266 are threaded and are configured to be threadably engaged with one of the distributing housing third panel fasteners 264.

The third aftertreatment component 163 also includes a third aftertreatment component first flange 268 (e.g., ring, etc.). The third aftertreatment component first flange 268 is configured to facilitate attachment of the third aftertreatment component 163 to the distributing housing third panel 148 and detachment of the third aftertreatment component 163 from the distributing housing third panel 148. In some embodiments, the third aftertreatment component first flange 268 is coupled to the third casing 164. In other embodiments, third aftertreatment component first flange 268 is integrally formed with the third casing 164.

The third aftertreatment component first flange 268 also includes a plurality of third aftertreatment component first flange apertures 270 (e.g., apertures, openings, holes, etc.). The third aftertreatment component first flange apertures 270 are disposed at least partially around the third casing 164. Each of the third aftertreatment component first flange apertures 270 is configured to receive one of the distributing housing third panel fasteners 264 and to be aligned with one of the distributing housing third panel apertures 262. In some embodiments, the third aftertreatment component first flange apertures 270 are threaded and are configured to be threadably engaged with one of the distributing housing third panel fasteners 264.

The third aftertreatment component 163 is attached to the distributing housing third panel 148 by first inserting the third casing 164 into the distributing housing third panel opening 260. The third aftertreatment component first flange 268 is then rotated (e.g., by grasping and rotating the third casing 164, etc.) such that the third aftertreatment component first flange apertures 270 are each aligned with one of the distributing housing third panel apertures 262. Then the distributing housing third panel fasteners 264 are each inserted into one of the third aftertreatment component first flange apertures 270 and one of the distributing housing third panel apertures 262 and are threadably engaged with at least one of the third aftertreatment component first flange aperture 270, the distributing housing third panel aperture 262, and/or the distributing housing third panel boss 266. The third aftertreatment component 163 may be detached from the distributing housing third panel 148 by reversing this process.

The housing assembly 106 also includes a third aftertreatment component first gasket (e.g., seal, etc.). The third aftertreatment component first gasket is configured to be disposed between the third aftertreatment component first flange 268 and the distributing housing third panel 148 and to establish a seal between the third aftertreatment component first flange 268 and the distributing housing third panel 148. As a result, flow of the exhaust gas between the third aftertreatment component first flange 268 and the distributing housing third panel 148 is substantially prevented (e.g., less than 1% of the exhaust gas flowing within the distributing housing 142 flows between the third aftertreatment component first flange 268 and the distributing housing third panel 148, etc.). In some embodiments, the third aftertreatment component first gasket is configured to establish the seal at temperatures of up to 550° C. The third aftertreatment component first gasket may be creep resistant so that joint preload does not substantially decrease over prolonged attachment of the third aftertreatment component first flange 268 and the distributing housing third panel 148. The third aftertreatment component first gasket may provide a stiff load path for transferring load across the third aftertreatment component first flange 268 and the distributing housing third panel 148 without decreasing a natural frequency of the housing assembly 106 (e.g., based on elastic modulus near the third aftertreatment component first flange 268 and the distributing housing third panel 148, based on a material of the distributing housing third panel fasteners 264, etc.). The third aftertreatment component first gasket may have a linear coefficient of thermal expansion that is approximately equal to a linear coefficient of thermal expansion of the distributing housing third panel fasteners 264 (e.g., to maintain integrity of the seal across operating and storage temperature ranges, etc.).

In various embodiments, the third aftertreatment component first gasket is a layered metal gasket. In some embodiments, the third aftertreatment component first gasket has an elastic modulus that is approximately equal to 193,000 MPa. In some embodiments, the third aftertreatment component first gasket has a coefficient of thermal expansion of 18.40 μm/m/° K.

In various embodiments, the third aftertreatment component first gasket includes a plurality of third aftertreatment component first gasket apertures (e.g., apertures, openings, holes, etc.). The third aftertreatment component first gasket apertures are configured to be disposed at least partially around the third casing 164. Each of the third aftertreatment component first gasket apertures is configured to receive one of the distributing housing third panel fasteners 264 and to be aligned with one of the distributing housing third panel apertures 262 and one of the third aftertreatment component first flange apertures 270. In some embodiments, the third aftertreatment component first gasket apertures are threaded and are configured to be threadably engaged with one of the distributing housing third panel fasteners 264.

The receiving housing 169 also includes a receiving housing third panel opening 272 (e.g., window, hole, etc.) extending through the receiving housing third panel 174. The receiving housing third panel opening 272 is configured to receive the third casing 164 such that the third aftertreatment component 163 may be positioned in the receiving housing 169 and the outlet housing 176. In some embodiments, the receiving housing third panel opening 272 is circular and has a first diameter and the third casing 164 is cylindrical and has a second diameter that is approximately equal to the first diameter.

The receiving housing 169 also includes a plurality of receiving housing third panel apertures 274 (e.g., apertures, openings, holes, etc.) extending through the receiving housing third panel 174. The receiving housing third panel apertures 274 are disposed at least partially around the receiving housing third panel opening 272. Each of the receiving housing third panel apertures 274 is configured to receive a receiving housing third panel fastener 276 (e.g., bolts, screws, threaded fasteners, etc.). As is explained in more detail herein, the receiving housing third panel fasteners 276 are configured to facilitate attachment of the third aftertreatment component 163 to the receiving housing third panel 174 and detachment of the third aftertreatment component 163 from the receiving housing third panel 174. In some embodiments, the receiving housing third panel apertures 274 are threaded and are configured to be threadably engaged with one of the receiving housing third panel fasteners 276.

In various embodiments, the receiving housing 169 also includes a plurality of receiving housing third panel bosses 278 (e.g., lugs, etc.) extending from the receiving housing third panel 174. Each of the receiving housing third panel bosses 278 is aligned with, and extends at least partially around, one of the receiving housing third panel apertures 274. In some embodiments, the receiving housing third panel bosses 278 are threaded and are configured to be threadably engaged with one of the receiving housing third panel fasteners 276.

The third aftertreatment component 163 also includes a third aftertreatment component second flange 280 (e.g., ring, etc.). The third aftertreatment component second flange 280 is configured to facilitate attachment of the third aftertreatment component 163 to the receiving housing third panel 174 and detachment of the third aftertreatment component 163 from the receiving housing third panel 174. In some embodiments, the third aftertreatment component second flange 280 is coupled to the third casing 164. In other embodiments, third aftertreatment component second flange 280 is integrally formed with the third casing 164.

The third aftertreatment component second flange 280 also includes a plurality of third aftertreatment component second flange apertures 282 (e.g., apertures, openings, holes, etc.). The third aftertreatment component second flange apertures 282 are disposed at least partially around the third casing 164. Each of the third aftertreatment component second flange apertures 282 is configured to receive one of the receiving housing third panel fasteners 276 and to be aligned with one of the receiving housing third panel apertures 274. In some embodiments, the third aftertreatment component second flange apertures 282 are threaded and are configured to be threadably engaged with one of the receiving housing third panel fasteners 276.

The third aftertreatment component 163 is attached to the receiving housing third panel 174 by first inserting the third casing 164 into the receiving housing third panel opening 272. The third aftertreatment component second flange 280 is then rotated (e.g., by grasping and rotating the third casing 164, etc.) such that the third aftertreatment component second flange apertures 282 are each aligned with one of the receiving housing third panel apertures 274. Then the receiving housing third panel fasteners 276 are each inserted into one of the third aftertreatment component second flange apertures 282 and one of the receiving housing third panel apertures 274 and are threadably engaged with at least one of the third aftertreatment component second flange aperture 282, the receiving housing third panel aperture 274, and/or the receiving housing third panel boss 278. The third aftertreatment component 163 may be detached from the receiving housing third panel 174 by reversing this process.

The third aftertreatment component 163 is configured such that the third aftertreatment component second flange 280 is separated from the third aftertreatment component first flange 268 by a gap. This gap facilitates interaction with the distributing housing third panel fasteners 264 and the receiving housing third panel fasteners 276 using a tool.

The housing assembly 106 also includes a third aftertreatment component second gasket (e.g., seal, etc.). The third aftertreatment component second gasket is configured to be disposed between the third aftertreatment component second flange 280 and the receiving housing third panel 174 and to establish a seal between the third aftertreatment component second flange 280 and the receiving housing third panel 174. As a result, flow of the exhaust gas between the third aftertreatment component second flange 280 and the receiving housing third panel 174 is substantially prevented (e.g., less than 1% of the exhaust gas flowing within the receiving housing 169 flows between the third aftertreatment component second flange 280 and the receiving housing third panel 174, etc.). In some embodiments, the third aftertreatment component second gasket is configured to establish the seal at temperatures of up to 550° C. The third aftertreatment component second gasket may be creep resistant so that joint preload does not substantially decrease over prolonged attachment of the third aftertreatment component second flange 280 and the receiving housing third panel 174. The third aftertreatment component second gasket may provide a stiff load path for transferring load across the third aftertreatment component second flange 280 and the receiving housing third panel 174 without decreasing a natural frequency of the housing assembly 106 (e.g., based on elastic modulus near the third aftertreatment component second flange 280 and the receiving housing third panel 174, based on a material of the receiving housing third panel fasteners 276, etc.). The third aftertreatment component second gasket may have a linear coefficient of thermal expansion that is approximately equal to a linear coefficient of thermal expansion of the receiving housing third panel fasteners 276 (e.g., to maintain integrity of the seal across operating and storage temperature ranges, etc.).

In various embodiments, the third aftertreatment component second gasket is a layered metal gasket. In some embodiments, the third aftertreatment component second gasket has an elastic modulus that is approximately equal to 193,000 MPa. In some embodiments, the third aftertreatment component second gasket has a coefficient of thermal expansion of 18.40 μm/m/° K.

In various embodiments, the third aftertreatment component second gasket includes a plurality of third aftertreatment component second gasket apertures (e.g., apertures, openings, holes, etc.). The third aftertreatment component second gasket apertures are configured to be disposed at least partially around the third casing 164. Each of the third aftertreatment component second gasket apertures is configured to receive one of the receiving housing third panel fasteners 276 and to be aligned with one of the receiving housing third panel apertures 274 and one of the third aftertreatment component second flange apertures 282. In some embodiments, the third aftertreatment component second gasket apertures are threaded and are configured to be threadably engaged with one of the receiving housing third panel fasteners 276.

In some embodiments, such as where the third substrate 166 is directional, the third aftertreatment component first flange 268 is configured to only be coupled to the distributing housing third panel 148 (e.g., and is configured to not be coupled to the receiving housing third panel 174, etc.) and the third aftertreatment component second flange 280 is configured to only be coupled to the receiving housing third panel 174 (e.g., and is configured to not be coupled to the distributing housing third panel 148, etc.). In this way, the third aftertreatment component 163 is configured in a poka-yoke manner to facilitate repeated and consistent installation of the third aftertreatment component 163 according to the directionality of the third substrate 166.

The housing assembly 106 includes a receiving housing support flange 284 (e.g., ring, rib, body, member, etc.). A portion of the receiving housing support flange 284 is positioned within the outlet housing 176 and a portion of the receiving housing support flange 284 is positioned within the receiving housing 169. The receiving housing support flange 284 interfaces with the outlet housing 176 and the receiving housing 169 to support the outlet housing 176 on the receiving housing 169. In various embodiments, the receiving housing support flange 284 interfaces with the receiving housing second panel 172.

The receiving housing support flange 284 is disposed along a plane that extends between the first aftertreatment component 150 and the second aftertreatment component 157. As a result, the receiving housing support flange 284 is separated from and does not interface with the first aftertreatment component 150 or the second aftertreatment component 157. In this way, the receiving housing support flange 284 does not interfere with installation of the first aftertreatment component 150 or the second aftertreatment component 157 in the receiving housing 169 and the outlet housing 176, and the receiving housing support flange 284 does not interfere with removal of the first aftertreatment component 150 or the second aftertreatment component 157 from the receiving housing 169 and the outlet housing 176.

The receiving housing support flange 284 facilitates flow of the exhaust gas through the outlet housing 176 towards the outlet exhaust gas conduit 178. Rather than including a plurality of relatively small apertures through which the exhaust gas must pass to flow to the outlet exhaust gas conduit 178, the receiving housing support flange 284 is substantially arcuate in shape and does not substantially impede flow of the exhaust gas through the outlet housing 176.

Figure 17:
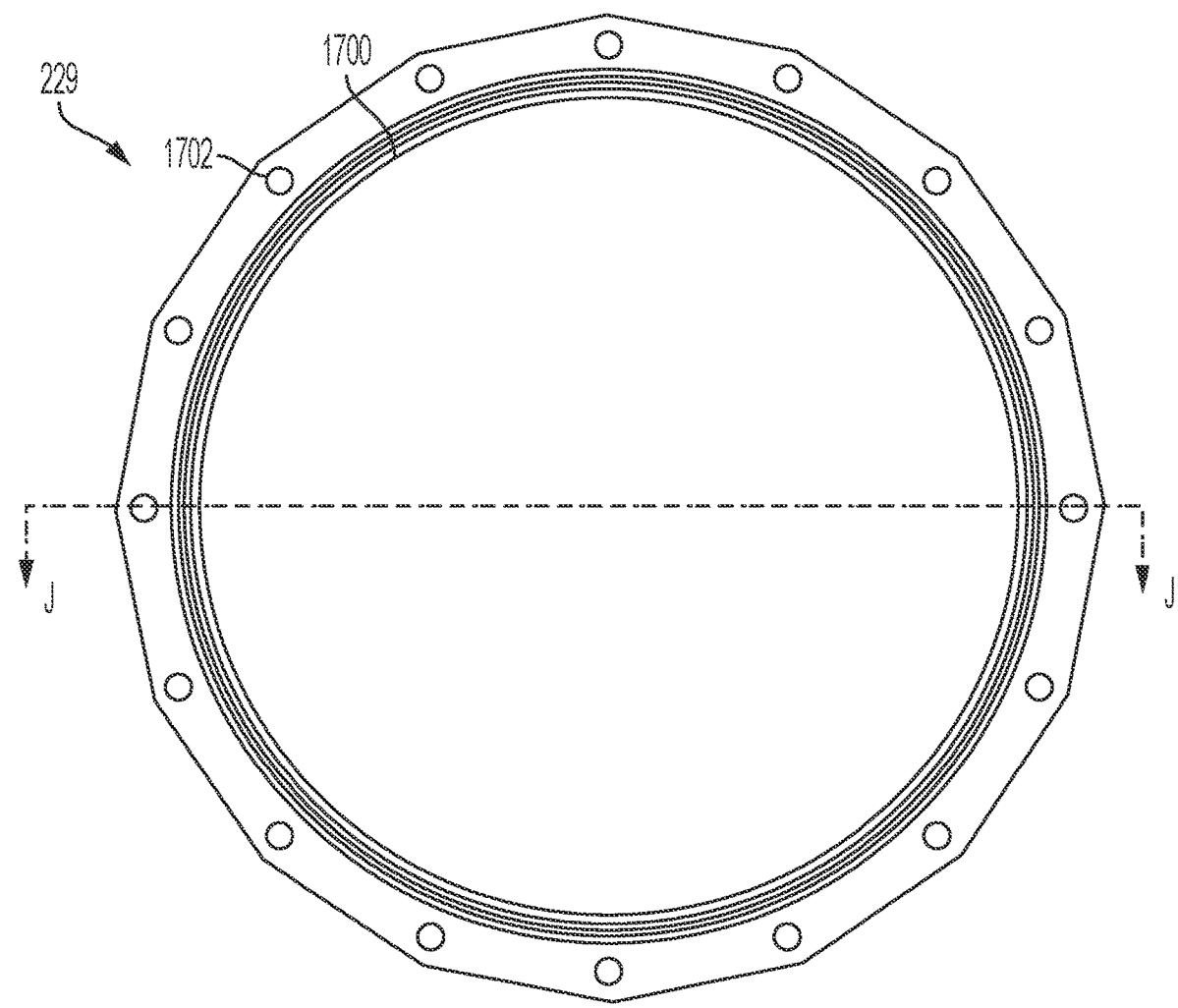
FIG. 17 is a top view of an example aftertreatment component gasket for a housing assembly.
Figure 18:
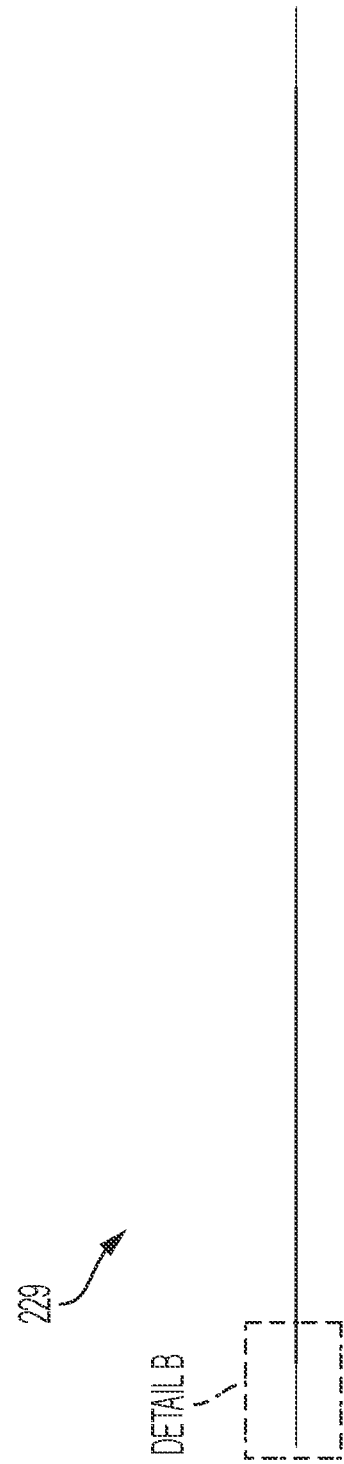
FIG. 18 is a front cross-sectional view of the aftertreatment component gasket shown in FIG. 17 taken along plane J-J.
Figure 19:
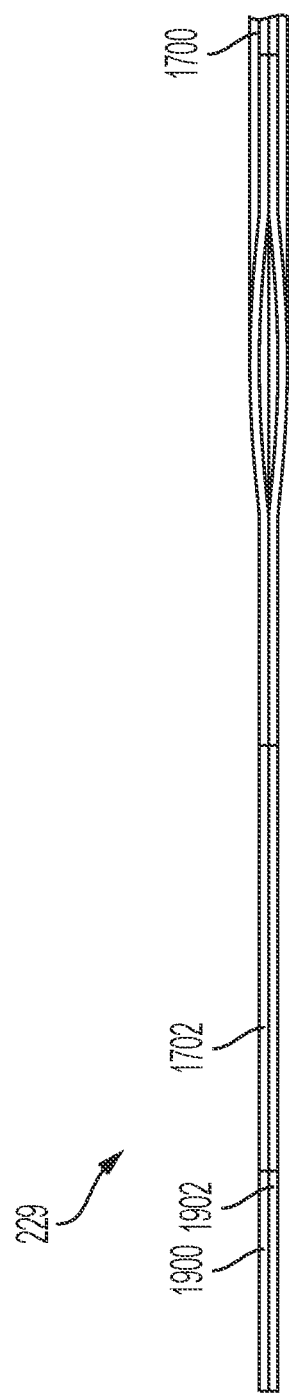
FIG. 19 is a detailed view of Detail B in FIG. 18.

The first aftertreatment component second gasket 229 is shown in greater detail in FIGS. 17-19. It is understood that the first aftertreatment component first gasket, the second aftertreatment component first gasket, the second aftertreatment component second gasket, the third aftertreatment component first gasket, and the third aftertreatment component second gasket may be configured analogously to the first aftertreatment component second gasket 229.

The first aftertreatment component second gasket 229 includes a first aftertreatment component second gasket opening 1700 (e.g., window, hole, etc.). The first aftertreatment component second gasket opening 1700 is configured to receive the first casing 152 such that the first aftertreatment component second gasket 229 extends around the first casing 152. In some embodiments, the first aftertreatment component second gasket opening 1700 is circular and has a first diameter and the first casing 152 is cylindrical and has a second diameter that is approximately equal to the first diameter.

The first aftertreatment component second gasket 229 also includes a plurality of first aftertreatment component second gasket apertures 1702 (e.g., apertures, openings, holes, etc.). The first aftertreatment component second gasket apertures 1702 are disposed at least partially around the first aftertreatment component second gasket opening 1700. Each of the first aftertreatment component second gasket apertures 1702 is configured to receive one of the distributing housing first panel fasteners 210. In some embodiments, the first aftertreatment component second gasket apertures 1702 are threaded and are configured to be threadably engaged with one of the distributing housing first panel fasteners 210.

As shown in FIG. 19, the first aftertreatment component second gasket 229 is a layered metal gasket formed from a first layer 1900 (e.g., sheet, film, etc.) and a second layer 1902 (e.g., sheet, film, etc.). The first layer 1900 and the second layer 1902 are coupled together to form the first aftertreatment component second gasket 229. In various embodiments, the first aftertreatment component second gasket opening 1700 and the first aftertreatment component second gasket apertures 1702 are all formed in each of the first layer 1900 and the second layer 1902. The first layer 1900 and the second layer 1902 may be coupled such that an air gap is formed between the first layer 1900 and the second layer 1902, and such that this air gap is evacuated as the first aftertreatment component second flange 226 is fastened to the receiving housing first panel 170. Evacuation of this air gap may facilitate establishment of the seal between the first aftertreatment component second flange 226 and the receiving housing first panel 170.

Figure 20:
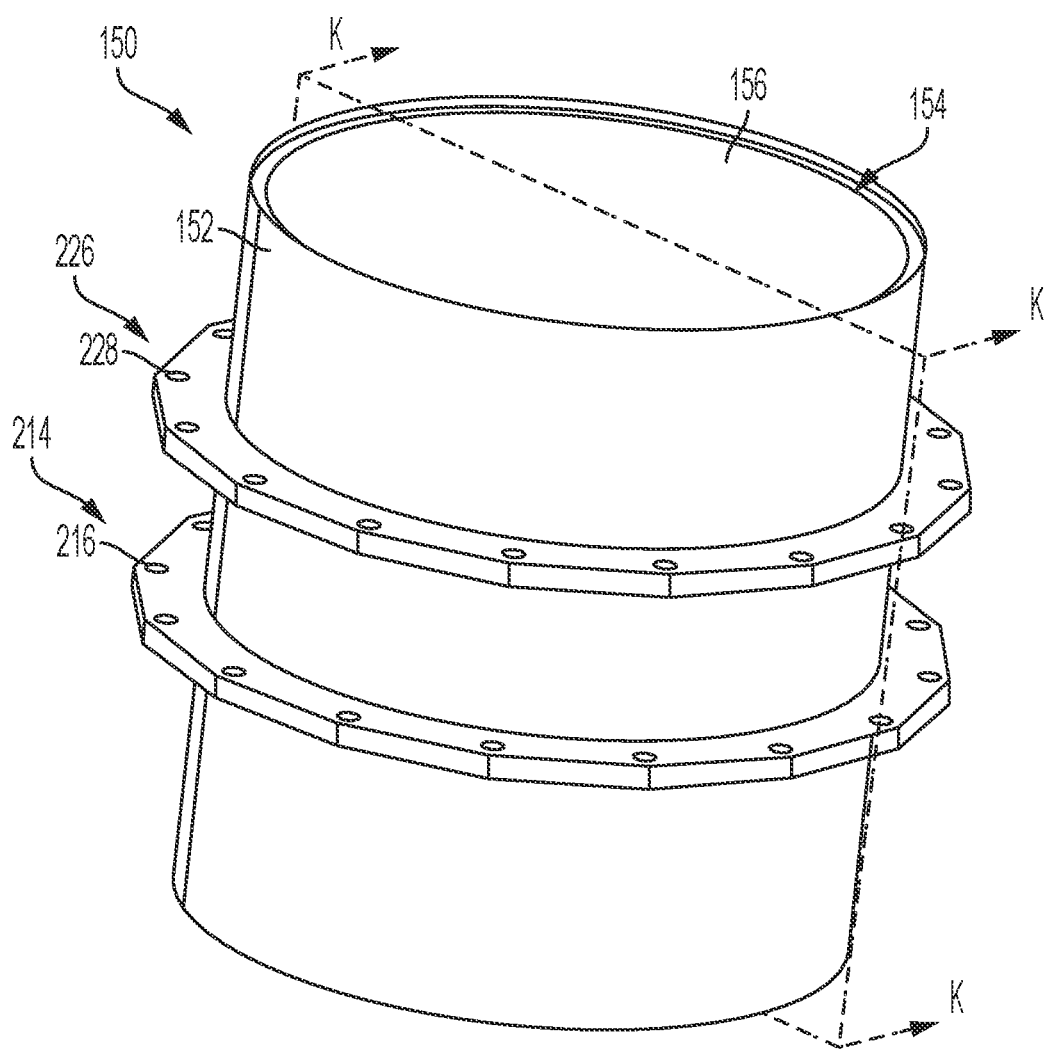
FIG. 20 is a perspective view of an example aftertreatment component for a housing assembly.
Figure 21:
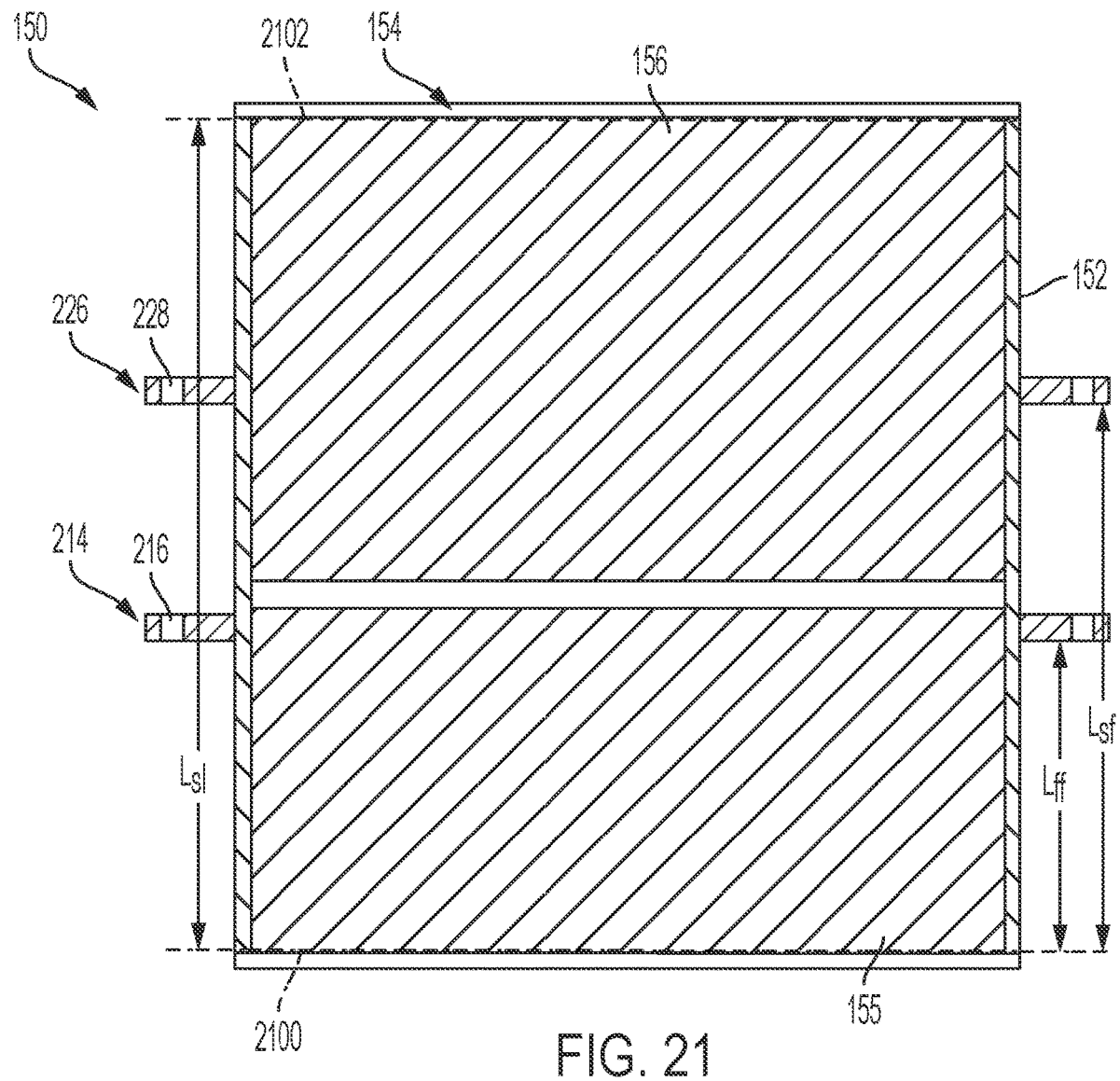
FIG. 21 is a front cross-sectional view of the aftertreatment component shown in FIG. 20 taken along plane K-K.

The first aftertreatment component 150 is shown in greater detail in FIGS. 20 and 21. It is understood that the second aftertreatment component 157 and the third aftertreatment component 163 may be configured analogously to the first aftertreatment component 150.

The first substrate 154 includes a first substrate inlet 2100 (e.g., inlet face, etc.). The first substrate inlet 2100 is an upstream-most edge of the first substrate 154 and provides a reference point for configuring the first aftertreatment component 150. The first casing 152 may extend upstream of the first substrate inlet 2100.

The first substrate 154 is also includes a first substrate outlet 2102 (e.g., inlet face, etc.). The first substrate outlet 2102 is a downstream-most edge of the first substrate 154 and provides a reference point for configuring the first aftertreatment component 150. The first casing 152 may extend downstream of the first substrate outlet 2102.

The first aftertreatment component 150 is configured such that the first aftertreatment component first flange 214 is separated from the first substrate inlet 2100 by a first aftertreatment component first flange length $L_{ff}$. In various embodiments, the first aftertreatment component first flange length $L_{ff}$ is approximately equal to between 120 mm and 165 mm, inclusive. In some embodiments, the first aftertreatment component first flange length $L_{ff}$ is approximately equal to 143.21 mm.

The first aftertreatment component 150 is also configured such that the first aftertreatment component second flange 226 is separated from the first substrate inlet 2100 by a first aftertreatment component second flange length $L_{sf}$. In various embodiments, the first aftertreatment component second flange length $L_{sf}$ is approximately equal to between 220 mm and 270 mm, inclusive. In some embodiments, the first aftertreatment component second flange length $L_{sf}$ is approximately equal to 247.95 mm. In various embodiments, the first aftertreatment component second flange length $L_{sf}$ is approximately equal to between a product of 1.50 and the first aftertreatment component first flange length $L_{ff}$ and a product of 1.95 and the first aftertreatment component first flange length $L_{ff}$, inclusive. In some embodiments, the first aftertreatment component second flange length $L_{sf}$ is approximately equal to a product of 1.73 and the first aftertreatment component first flange length $L_{ff}$.

The first aftertreatment component 150 is also configured such that the first substrate outlet 2102 is separated from the first substrate inlet 2100 by a first substrate length $L_{sl}$. In various embodiments, the first substrate length $L_{sl}$ is approximately equal to between 355 mm and 400 mm, inclusive. In some embodiments, the first substrate length $L_{sl}$ is approximately equal to 379.60 mm. In various embodiments, the first substrate length $L_{sl}$ is approximately equal to between a product of 2.40 and the first aftertreatment component first flange length $L_{ff}$ and a product of 2.90 and the first aftertreatment component first flange length $L_{ff}$, inclusive. In some embodiments, the first substrate length $L_{sl}$ is approximately equal to a product of 2.65 and the first aftertreatment component first flange length $L_{ff}$.

Figure 22:
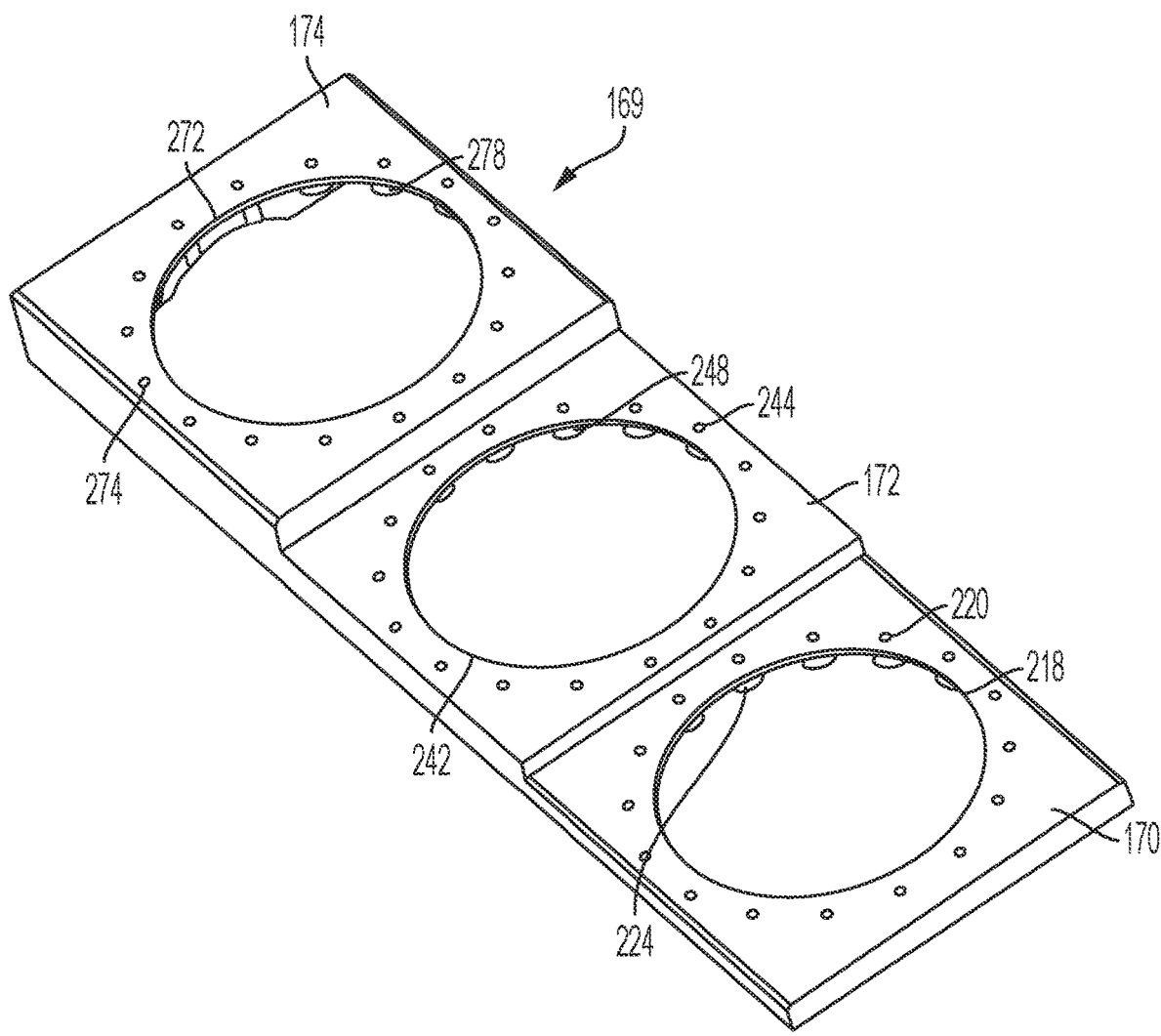
FIG. 22 is a perspective view of an example receiving housing for a housing assembly.
Figure 23:
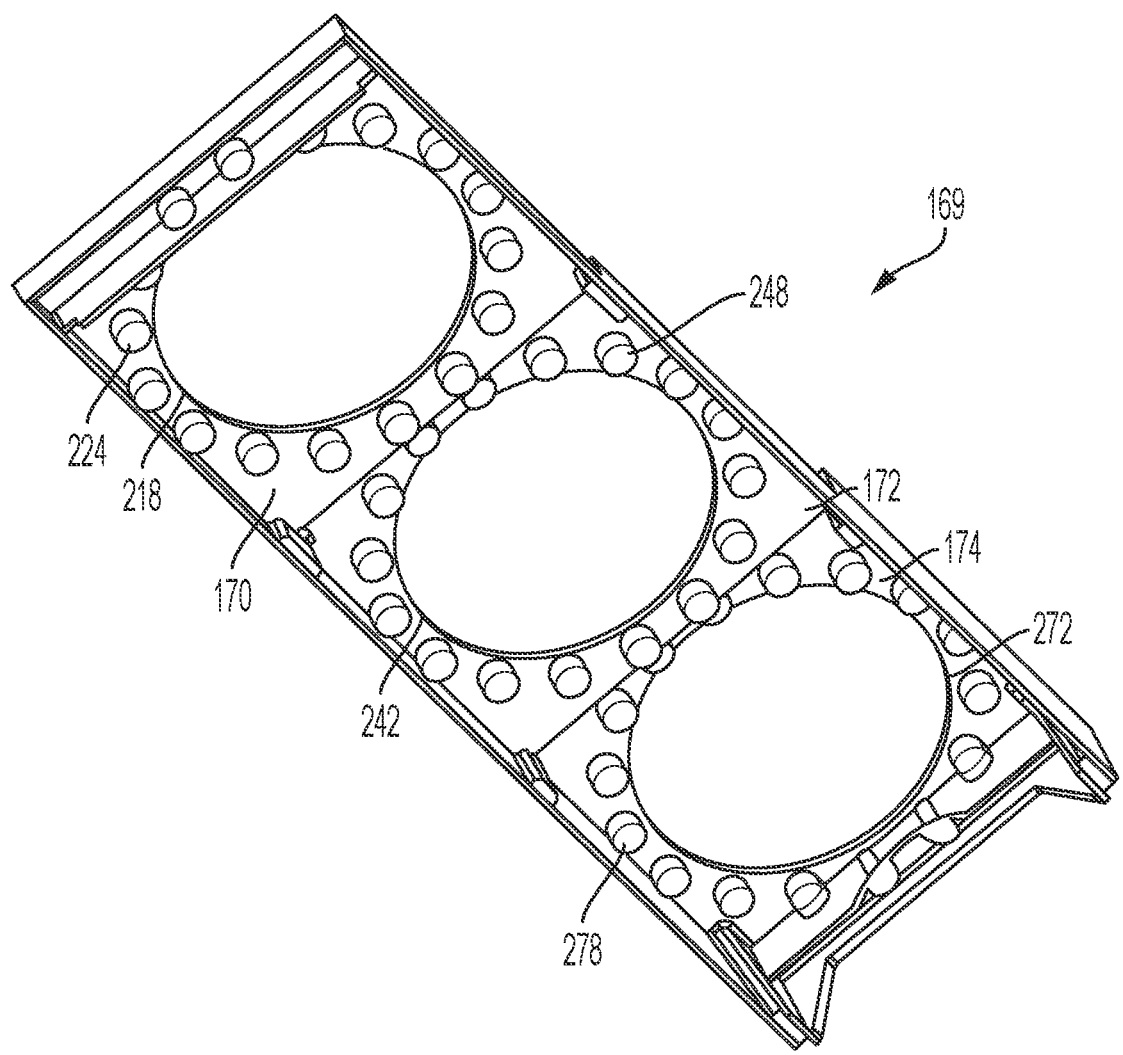
FIG. 23 is another perspective view of the receiving housing shown in FIG. 22.

The receiving housing 169 is shown in greater detail in FIGS. 22 and 23. It is understood that the distributing housing 142 may be configured analogously to the receiving housing 169.

IV. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, exhaust gas, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust gas aftertreatment system comprising:
   an introduction housing configured to receive an exhaust gas and a treatment fluid;
   a transfer housing coupled to the introduction housing and configured to receive the exhaust gas and the treatment fluid from the introduction housing;
   a distributing housing coupled to the transfer housing and configured to receive the exhaust gas and the treatment fluid from the transfer housing, the distributing housing comprising:
      a distributing housing first panel, and
      a distributing housing first panel opening extending through the distributing housing first panel,
      a distributing housing second panel, wherein the distributing housing first panel extends parallel to the distributing housing second panel and is offset from the distributing housing second panel, and
      a distributing housing second panel opening extending through the distributing housing second panel;
   a first aftertreatment component configured to receive at least a portion of the exhaust gas and the treatment fluid from the distributing housing, the first aftertreatment component comprising:
      a first casing extending through the distributing housing first panel opening,
      a first aftertreatment component first flange configured to be fastened to the distributing housing first panel at least partially around the distributing housing first panel opening, and
      a first substrate, wherein at least a portion of the first substrate is positioned within the first casing; and
   a second aftertreatment component configured to receive at least a portion of the exhaust gas and the treatment fluid from the distributing housing, the second aftertreatment component comprising:
      a second casing extending through the distributing housing second panel opening,
      a second aftertreatment component first flange configured to be fastened to the distributing housing second panel at least partially around the distributing housing second panel opening, and
      a second substrate, wherein at least a portion of the second substrate is positioned within the second casing.

2. The exhaust gas aftertreatment system of claim 1, further comprising a receiving housing configured to receive the exhaust gas from the first aftertreatment component, the receiving housing comprising:
   a receiving housing first panel; and
   a receiving housing first panel opening extending through the receiving housing first panel;
   wherein the first casing extends through the receiving housing first panel opening; and
   wherein the first aftertreatment component further comprises a first aftertreatment component second flange that is configured to be fastened to the receiving housing first panel at least partially around the receiving housing first panel opening.

3. The exhaust gas aftertreatment system of claim 2, wherein:
   a first portion of the first casing is positioned within the distributing housing; and
   a second portion of the first casing is positioned within the receiving housing.

4. The exhaust gas aftertreatment system of claim 2, wherein the distributing housing first panel extends parallel to the receiving housing first panel and is offset from the receiving housing first panel.

5. The exhaust gas aftertreatment system of claim 1, wherein:
   the first substrate is centered on a first component axis; and
   the second substrate is centered on a second component axis that is parallel to the first component axis.

6. The exhaust gas aftertreatment system of claim 1, further comprising a perforated flange coupled to the transfer housing and the distributing housing, the perforated flange extending between a portion of the first casing and a portion of the second casing, the perforated flange comprising a plurality of perforated flange apertures.

7. The exhaust gas aftertreatment system of claim 1, further comprising a receiving housing configured to receive the exhaust gas from the first aftertreatment component, the receiving housing comprising:
   a receiving housing first panel;

a receiving housing first panel opening extending through the receiving housing first panel;
a receiving housing second panel; and
a receiving housing second panel opening extending through the receiving housing second panel;
wherein the first casing extends through the receiving housing first panel opening;
wherein the first aftertreatment component further comprises a first aftertreatment component second flange that is configured to be fastened to the receiving housing first panel at least partially around the receiving housing first panel opening;
wherein the second casing extends through the receiving housing second panel opening; and
wherein the second aftertreatment component further comprises a second aftertreatment component second flange that is configured to be fastened to the receiving housing second panel at least partially around the receiving housing second panel opening.

8. The exhaust gas aftertreatment system of claim 7, wherein:
a lowermost portion of the transfer housing extends along a transfer housing axis;
the distributing housing first panel is separated from the transfer housing axis by a first length; and
the distributing housing second panel is separated from the transfer housing axis by a second length that is less than the first length.

9. The exhaust gas aftertreatment system of claim 8, wherein a portion of the first casing is positioned between a portion of the second casing and a portion of the introduction housing.

10. The exhaust gas aftertreatment system of claim 8, wherein:
the receiving housing first panel is separated from the transfer housing axis by a third length; and
the receiving housing second panel is separated from the transfer housing axis by a fourth length that is less than the third length.

11. The exhaust gas aftertreatment system of claim 10, wherein a portion of the first casing is positioned between a portion of the second casing and a portion of the introduction housing.

12. The exhaust gas aftertreatment system of claim 8, wherein the first substrate is centered on a first component axis that is orthogonal to the transfer housing axis.

13. The exhaust gas aftertreatment system of claim 1, further comprising a dosing module coupled to the introduction housing and configured to selectively provide the treatment fluid into the introduction housing.

14. An exhaust gas aftertreatment system comprising:
a distributing housing configured to receive an exhaust gas and a treatment fluid, the distributing housing comprising:
a distributing housing first panel, and
a distributing housing second panel;
a first aftertreatment component configured to receive a first portion of the exhaust gas and the treatment fluid from the distributing housing, the first aftertreatment component comprising:
a first aftertreatment component first flange configured to be fastened to the distributing housing first panel, and
a first substrate configured to facilitate treatment of the first portion of the exhaust gas, the first substrate centered on a first component axis; and
a second aftertreatment component configured to receive a second portion of the exhaust gas and the treatment fluid from the distributing housing, the second aftertreatment component comprising:
a second aftertreatment component first flange configured to be fastened to the distributing housing second panel, and
a second substrate configured to facilitate treatment of the second portion of the exhaust gas, the second substrate centered on a second component axis;
wherein the distributing housing second panel is offset relative to the distributing housing first panel in a direction parallel to the first component axis.

15. The exhaust gas aftertreatment system of claim 14, further comprising a transfer housing coupled to the distributing housing and configured to receive the exhaust gas and the treatment fluid and provide the exhaust gas and the treatment fluid to the distributing housing;
wherein a first distance along the second component axis between the distributing housing second panel and a lowermost portion of the transfer housing is less than a second distance along the first component axis between the distributing housing first panel and the lowermost portion of the transfer housing.

16. The exhaust gas aftertreatment system of claim 15, wherein the transfer housing and the distributing housing are configured such that the first distance is in a range of 0.60 to 0.99 times the second distance.

17. The exhaust gas aftertreatment system of claim 14, wherein the second component axis is parallel to the first component axis.

18. The exhaust gas aftertreatment system of claim 15, wherein an axis along which the transfer housing extends is orthogonal to at least one of the first component axis or the second component axis.

19. An exhaust gas aftertreatment system comprising:
an introduction housing configured to receive an exhaust gas and a treatment fluid;
a transfer housing coupled to the introduction housing and configured to receive the exhaust gas and the treatment fluid from the introduction housing;
a distributing housing coupled to the transfer housing and configured to receive the exhaust gas and the treatment fluid from the transfer housing, the distributing housing comprising:
a distributing housing first panel,
a distributing housing first panel opening extending through the distributing housing first panel,
a distributing housing second panel, and
a distributing housing second panel opening extending through the distributing housing second panel;
a first aftertreatment component configured to receive at least a portion of the exhaust gas and the treatment fluid from the distributing housing, the first aftertreatment component comprising:
a first casing extending through the distributing housing first panel opening,
a first aftertreatment component first flange configured to be fastened to the distributing housing first panel at least partially around the distributing housing first panel opening,
a first aftertreatment component second flange, and
a first substrate, wherein at least a portion of the first substrate is positioned within the first casing;
a second aftertreatment component configured to receive at least a portion of the exhaust gas and the treatment fluid from the distributing housing, the second aftertreatment component comprising:
- a second casing extending through the distributing housing second panel opening,
- a second aftertreatment component first flange configured to be fastened to the distributing housing second panel at least partially around the distributing housing second panel opening,
- a second aftertreatment component second flange, and
- a second substrate wherein at least a portion of the second substrate is positioned within the second casing; and a receiving housing configured to receive the exhaust gas from the first aftertreatment component, the receiving housing comprising:
- a receiving housing first panel,
- a receiving housing first panel opening extending through the receiving housing first panel,
- a receiving housing second panel, and
- a receiving housing second panel opening extending through the receiving housing second panel;

wherein the first casing extends through the receiving housing first panel opening;

wherein the first aftertreatment component second flange is configured to be fastened to the receiving housing first panel at least partially around the receiving housing first panel opening;

wherein the second casing extends through the receiving housing second panel opening; and wherein the second aftertreatment component second flange is configured to be fastened to the receiving housing second panel at least partially around the receiving housing second panel opening.

20. The exhaust gas aftertreatment system of claim 19, wherein:
- a lowermost portion of the transfer housing extends along a transfer housing axis;
- the distributing housing first panel is separated from the transfer housing axis by a first length; and
- the distributing housing second panel is separated from the transfer housing axis by a second length that is less than the first length.

21. The exhaust gas aftertreatment system of claim 20, wherein a portion of the first casing is positioned between a portion of the second casing and a portion of the introduction housing.

22. The exhaust gas aftertreatment system of claim 20, wherein:
- the receiving housing first panel is separated from the transfer housing axis by a third length; and
- the receiving housing second panel is separated from the transfer housing axis by a fourth length that is less than the third length.

23. The exhaust gas aftertreatment system of claim 22, wherein a portion of the first casing is positioned between a portion of the second casing and a portion of the introduction housing.

24. The exhaust gas aftertreatment system of claim 20, wherein the first substrate is centered on a first component axis that is orthogonal to the transfer housing axis.

* * * * *